United States Patent [19]
Hodgson

[11] Patent Number: 5,351,251
[45] Date of Patent: Sep. 27, 1994

[54] LASER APPARATUS

[75] Inventor: Norman Hodgson, Plainsboro, N.J.

[73] Assignee: Carl Zeiss, Inc., Thornwood, N.Y.

[21] Appl. No.: 40,132

[22] Filed: Mar. 30, 1993

[51] Int. Cl.$^5$ .............................................. H01S 3/30
[52] U.S. Cl. ............................................ 372/4; 372/99
[58] Field of Search ....................................... 372/4, 99

[56] References Cited

U.S. PATENT DOCUMENTS

| | | | |
|---|---|---|---|
| 3,863,177 | 1/1975 | Damen et al. | 372/99 |
| 5,033,057 | 7/1991 | Bosenberg et al. | 372/99 |
| 5,048,034 | 9/1991 | Tulip | 372/41 |
| 5,091,911 | 2/1992 | Tulip | 372/4 |

OTHER PUBLICATIONS

Milam and Schlossberg; "Emission Characteristics of a tube-shaped Laser Oscillator", J. Appl. Phys. vol. 44, No. 5, May, 1973, pp. 2297-2299.
J. Marling; "1.05-1.44 μm Tunability and Performance of the CW Nd$^{3+}$:YAG Laser"; IEEE J. Quant. Elect; vol. QE-14, No. 1, Jan. 1978, pp. 56-62.
W. Koechner, "Solid State Laser Engineering", Jan. 1986, Publ. Springer-Verlag pp. 323-327.
H. P. von. Arb; Ch. Lüchinger, et al; "High Average Power Slab Geometry Solid State Lasers", SPIE, vol. 1021 High Power Solid State Lasers, Jan. 1988, pp. 24-30.
Reed and Byer; "Performance of a Conduction Cooled Nd:glass Zigzag Slab Laser" SPIE, vol. 1021 High Power Solid State Lasers, Jan. 1988 pp. 128-125.
N. Hodgson, "Optical Resonators for High Power Lasers", SPIE, vol. 1021 High Power Solid State Lasers, Jan. 1988 pp. 89-100.
Wong Mathieu and Pace; "Eye-safe Nd-YAG laser" Appl. Phys. Lett.; vol. 57, No. 7, Aug. 13, 1990, pp. 650-652.
Marling; "1.05-1044 μm Tunable High-Power Laser Emission on 18 CW Transitions Nd$^{3+}$YAG" IEEE J Quant. Elec. vol. 13, No. 9; pp. 94D-95D, Jan. 1978.

Wong, Pace, Mathieu and Tulip "A Long Wavelength Nd:YAG Laser" Drey Report, Jan. 1990 pp. 501-509.
Dobbins and von Arb "The Slab Laser Shows its Stuff"; Lasers & Optronics; Dec. 1990, pp. 43-46.
Zapata, Manes, et al.; "Performance of a 500 Watt Nd:GGG Zigzag Slab Oscillator"; SPIE vol. 1223 Solid State Lasers, Jan. 1990, pp. 259-273.
Wittrock and Weber; "Inside-pumped Nd:YAG tube laser"; Optics Letters, vol. 16, No. 14, Jul. 15, 1991, pp. 1092-1094.
Wittrock; "High Power Rod, Slab and Tube Lasers" Nato Summer School Elba, Jan. 1992.
Hodgson and Haase; "Beam Parameters, mode structure and diffraction losses of slab lasers with unstable resonators"; Optical and Q. Elect. vol. 24, Jan. 1992, pp. S.903-S.926.
Unternahrer; "Slab lasers: concept and implementation" SPIE vol. 1277 High-Power Solid State Lasers and Applications; pp. 86-89, Jan. 1990.
Comaskey, Beach, et al.; "High Average Power Diode Pumped Slab Laser" IEEE J. Quant. Electr. vol. 28, No. 4, Apr. 1992, pp. 992-996.

Primary Examiner—Rodney B. Bovernick
Assistant Examiner—Robert E. Wise
Attorney, Agent, or Firm—Michael B. Einschlag

[57] ABSTRACT

Apparatus for producing laser radiation substantially at 1,444 μm. Embodiments of the present invention are improved structures for neodymium lasers wherein an active laser material is formed in the shape of a rod, a tube, and a slab, including embodiments of a slab laser wherein the slab is pumped by diode arrays. In particular, the improved designs relate to the reflectivities assigned to reflectors which form the laser resonator; the structure of the pumping apparatus (including the shape and composition of the pumping cavity); the concentration of Nd; the dimensions of the active material; the structure of the laser resonator; and the pumping parameters such as pulse duration, pulse rate, and pump energy.

54 Claims, 25 Drawing Sheets

Operation of 1.444 Nd:YAG Laser at 90% of Fracture Limit

Repetition Rate (Hz)

FIG. 14a
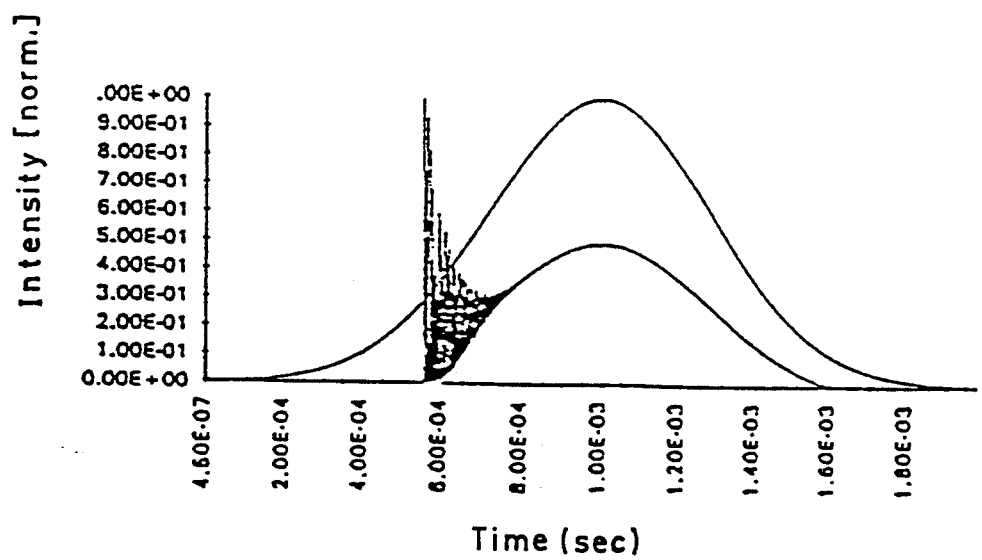
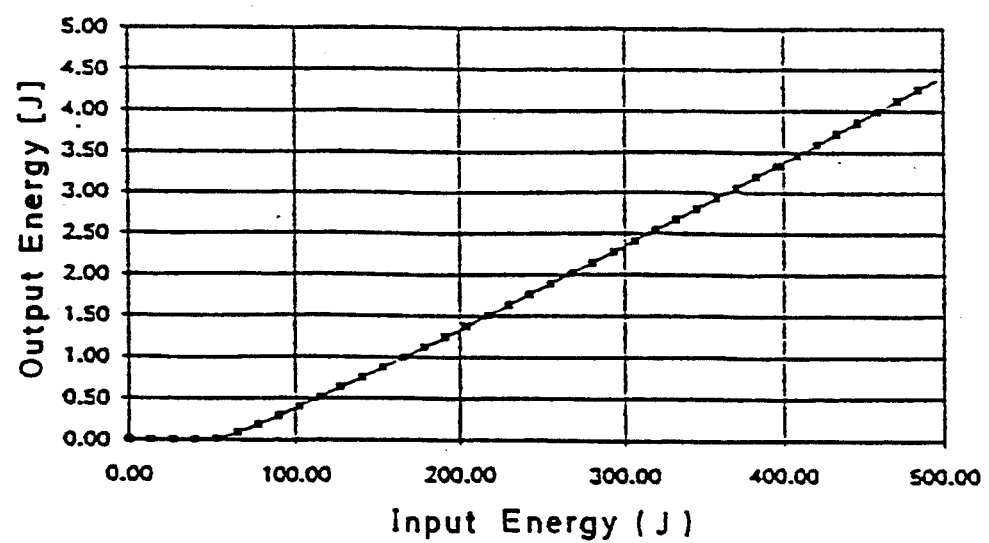

FIG. 14b
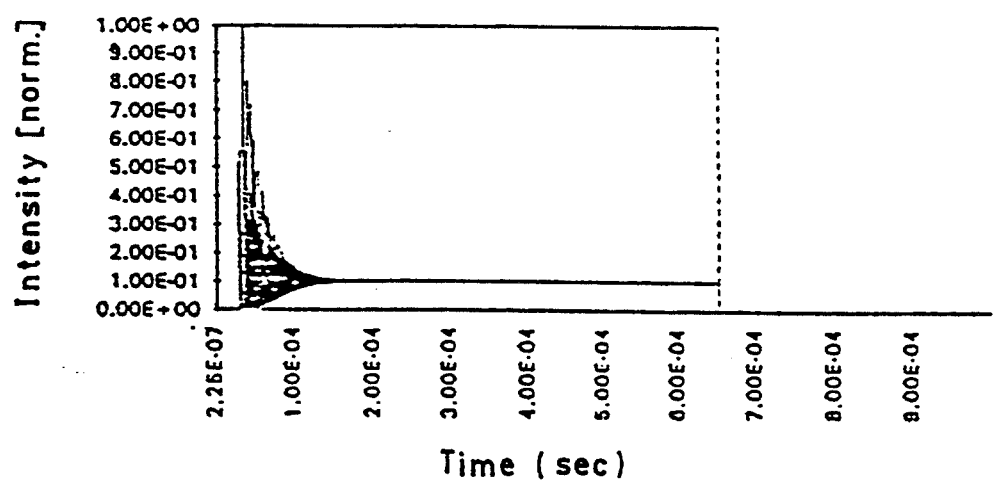
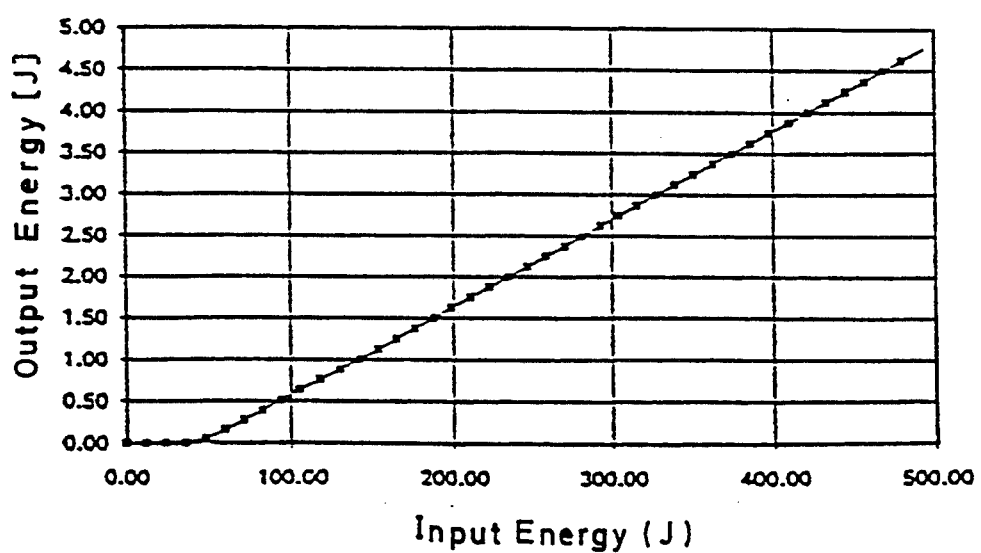

FIG. 27
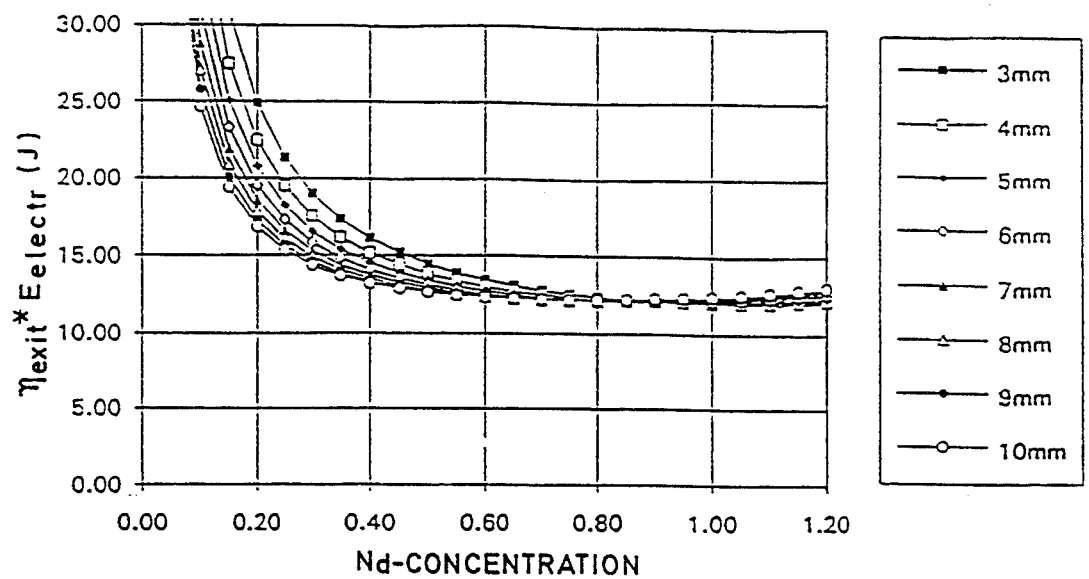
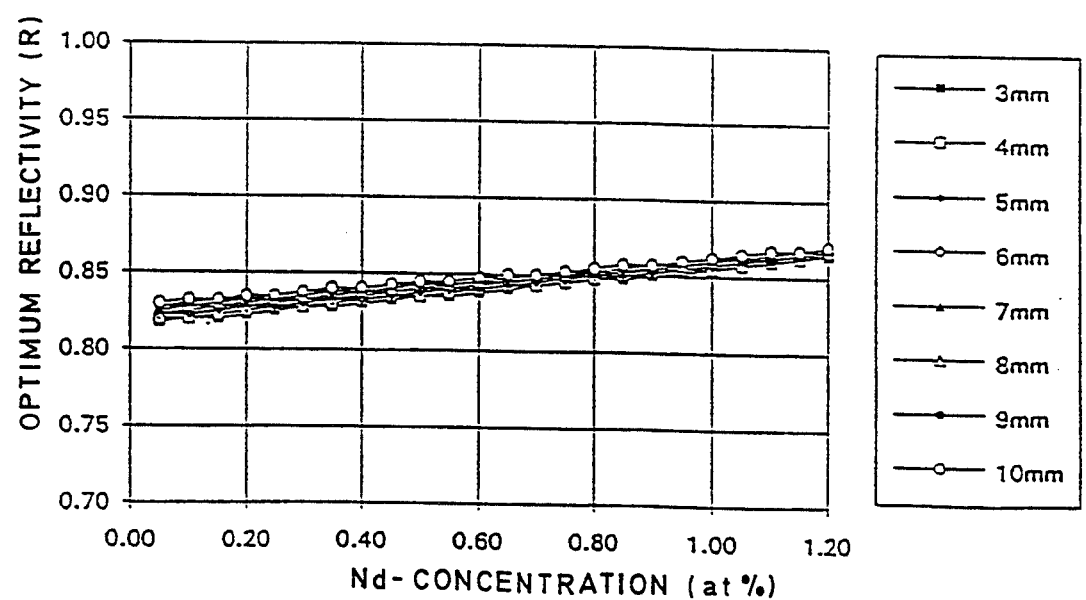

FIG. 28
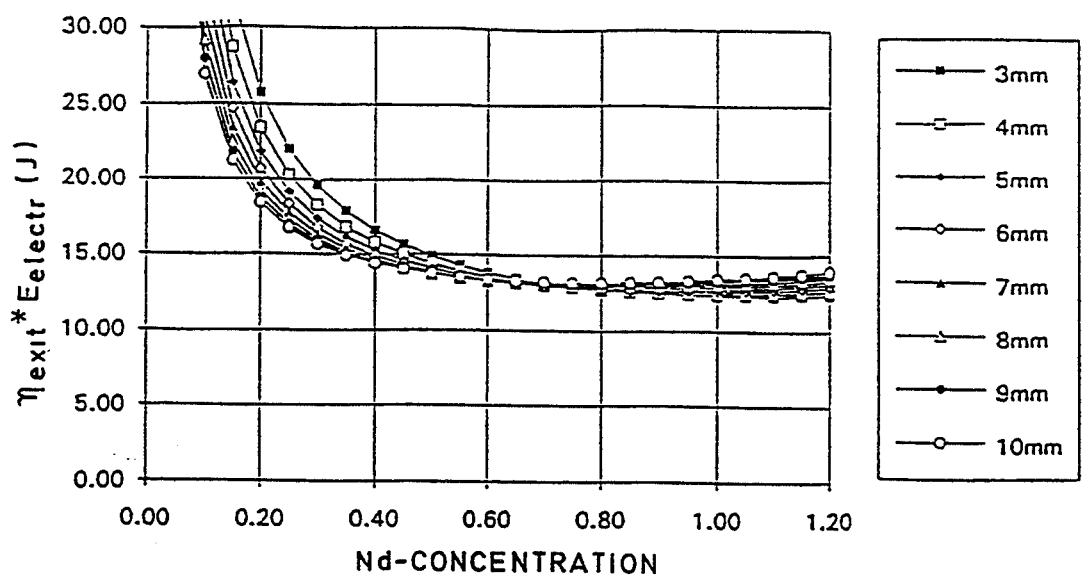
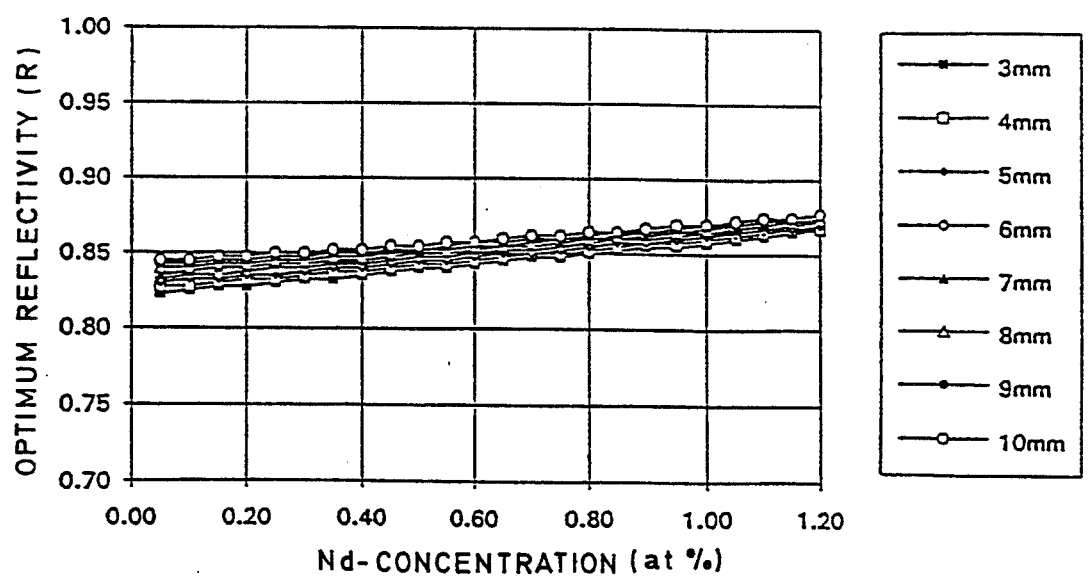

FIG. 29
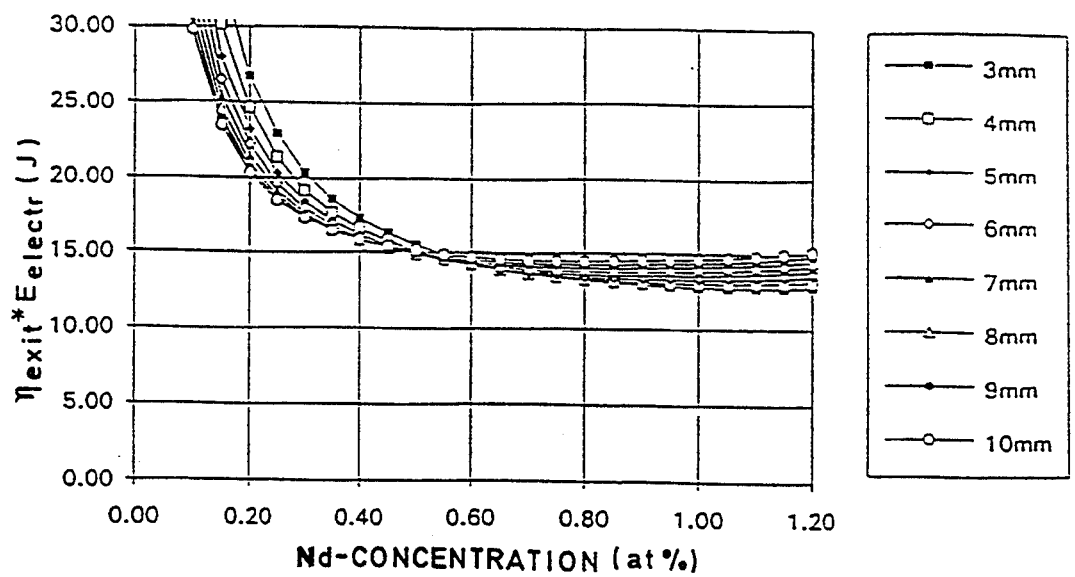
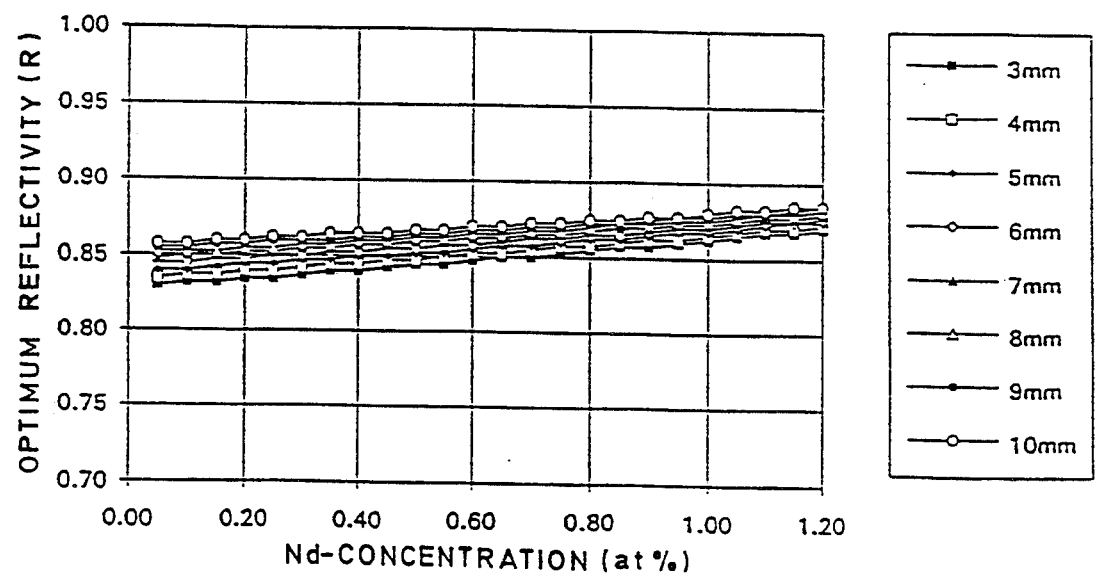

FIG. 35
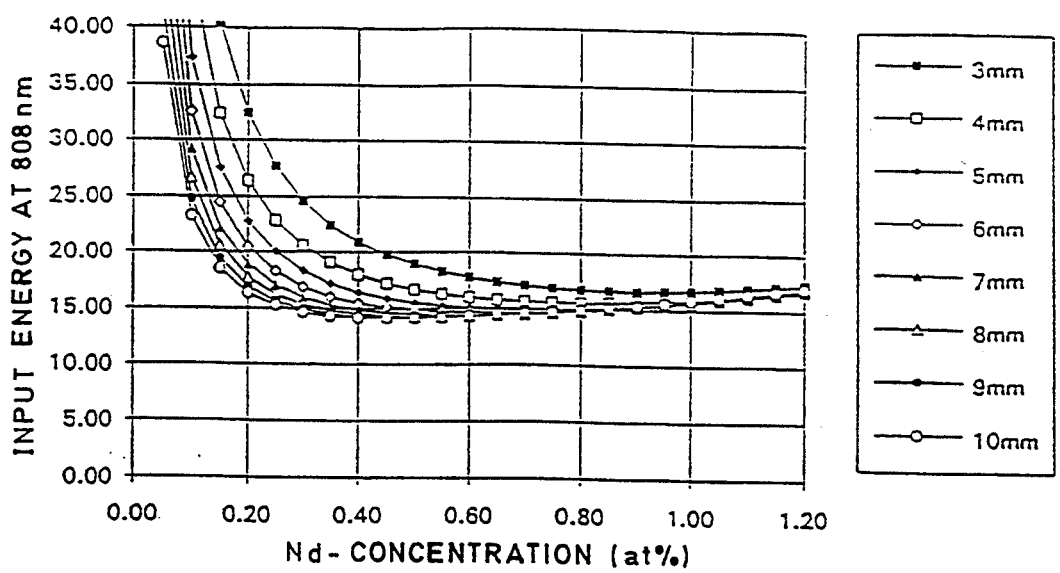
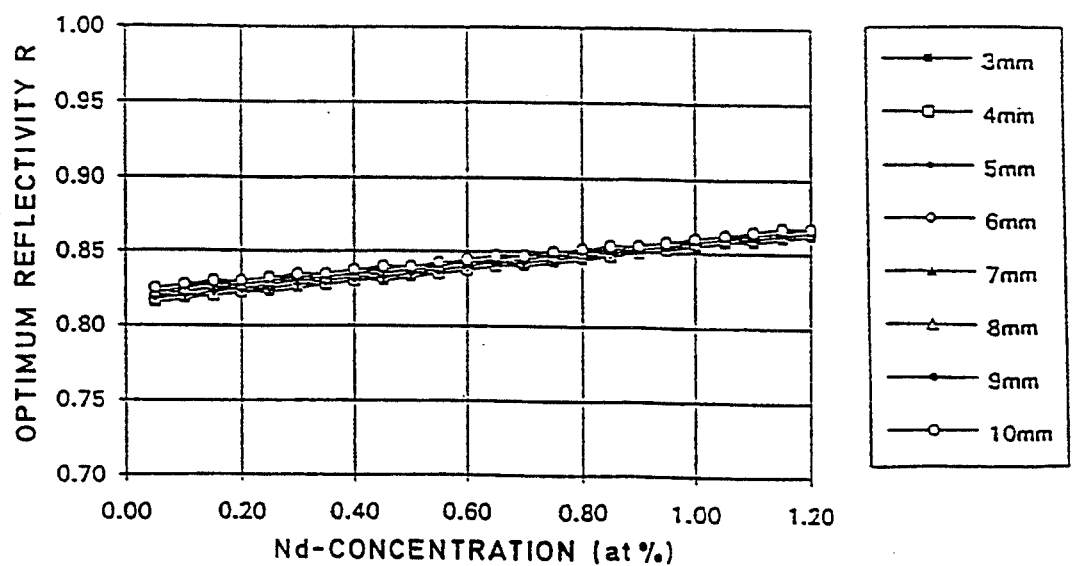

FIG. 36
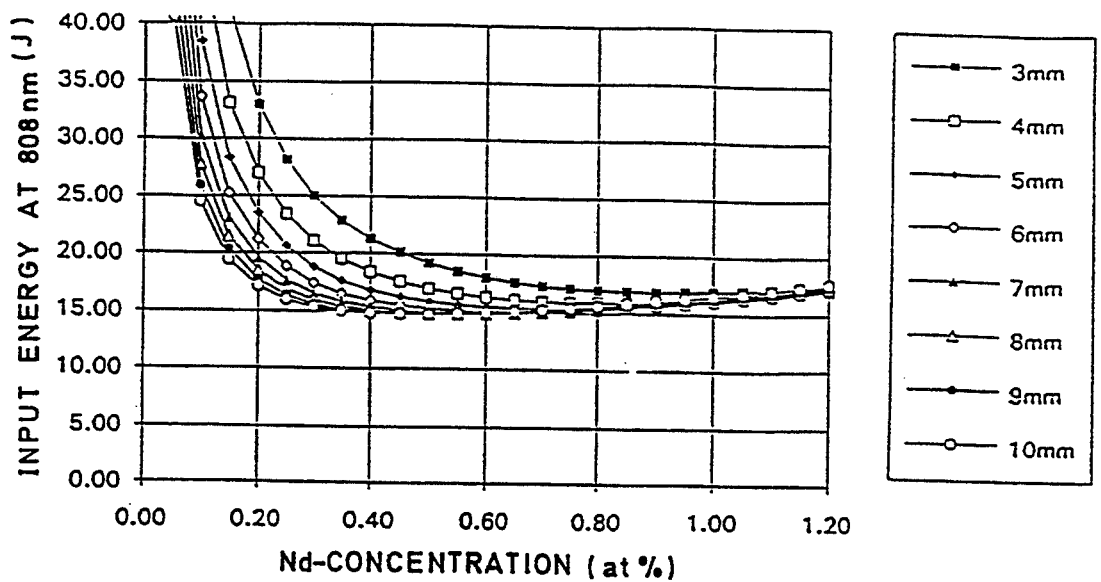
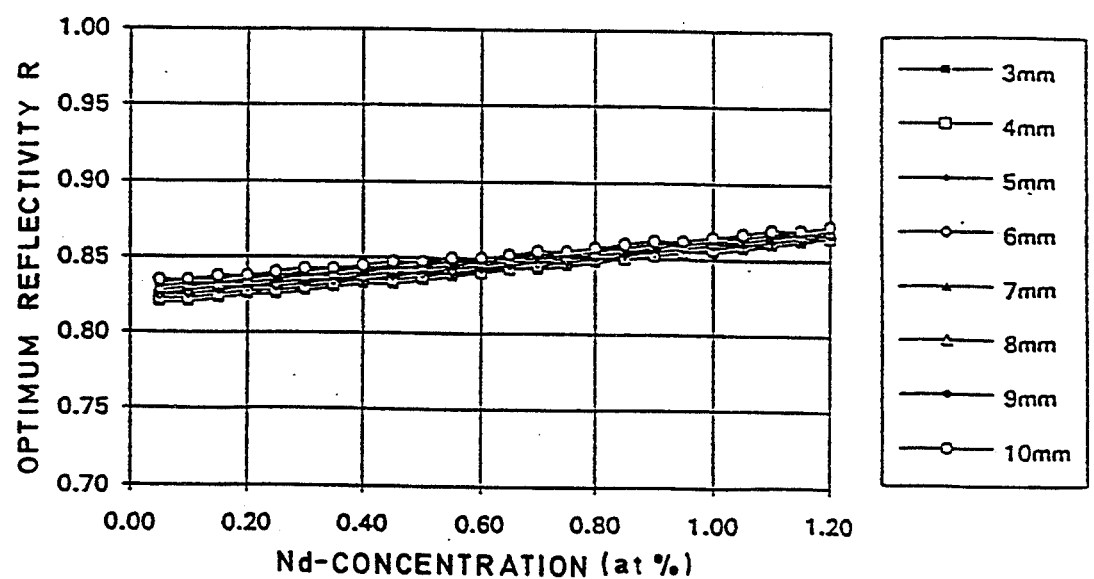

LASER APPARATUS

TECHNICAL FIELD OF THE INVENTION

The present invention pertains generally to the field of lasers and, in particular, to apparatus for producing laser radiation substantially at 1,444 $\mu$m.

BACKGROUND OF THE INVENTION

It is well known in the art that a need exists for a laser producing radiation substantially at 1,444 $\mu$m. This need exists because 1,444 $\mu$m radiation is eye-safe and because it offers many potential applications for military and civilian use such as, for example, rangefinding, surveying, telecommunications, laser radar, and medical applications. Embodiments of lasers in several different configurations have been disclosed in the prior art which appear, on the surface, capable of producing a laser having the desired output. In particular, the prior art discloses that such a laser can be fabricated as a solid state laser utilizing Nd:YAG as the active material as well as other materials which serve as a host for $Nd^{+++}$ ions. Several of the different configurations for the laser comprise a laser wherein an active material is configured as a rod, as a tube, or as a slab. In addition, the prior art has disclosed and suggested the use of specific apparatus for pumping the active material such as, for example, flashlamp pumping apparatus or diode pumping apparatus.

Neodymium lasers are typically comprised of $Nd^{+++}$ ions which are incorporated into a crystalline or glass host structure. The most common crystal host structure is yttrium aluminum garnet (YAG), a material having a garnet like structure and the chemical formula $Y_3Al_5O_{12}$. Alternatives to YAG that may be utilized to form a laser are, for example, yttrium lithium fluoride (YLF), and yttrium aluminate (YALO). Additionally, since crystal growth problems tend to limit the maximum length of YAG rods, glass may also be utilized as a host structure for discs or rods of laser material to provide higher output power and energy.

Rod Geometry

Several prior art references discuss fabricating a laser having output at 1.444 $\mu$m wherein the active material is formed as a rod.

The efficacy of a 1,444 $\mu$m laser for use in medical applications has been disclosed, among other places, in U.S. Pat. No. 5,048,034 entitled "Long Wavelength Nd:YAG Laser" which issued on Sep. 10, 1991 (the '034 patent). The '034 patent points out that a $CO_2$ laser radiates in a far infrared part of the spectrum which is strongly absorbed by tissue water and that when a $CO_2$ laser is focused onto tissue it causes tissue vaporization since the radiation is absorbed by water in the first few layers of cells which are heated to the point of explosive vaporization. Thus, a $CO_2$ focused beam "cuts" into the surface to make a scalpel-like incision until the beam is interrupted. Further, the $CO_2$ laser acts like a "blood free" knife since small vessels adjacent the incision are cauterized by the laser. Nd:YAG has a low gain laser transition around 1.444 $\mu$m which coincides with a strong water absorption band. As a result, radiation at 1,444 $\mu$m is absorbed by water after passing only about 0.3 mm thereinto (In contrast the penetration depth for 1.32 $\mu$m radiation in water is about 10 mm and the penetration depth for 1.064 $\mu$m radiation in water is about 8 cm). Thus, since animal tissue is mainly comprised of water, a powerful, focused laser beam at around 1.444 $\mu$m should provide a scalpel-like incision for such tissue in much the same way as is provided by a $CO_2$ laser beam.

One well recognized problem in fabricating a laser at 1.444 $\mu$m in Nd:YAG is that gain around 1.444 $\mu$m is very low and the 1.444 $\mu$m transition must compete for laser oscillation with a 1.064 $\mu$m transition which has ten times more gain. Another well recognized problem in fabricating a laser at 1.444 $\mu$m in Nd:YAG is that, although Nd:YAG is substantially transparent in a spectral region around 1.064 $\mu$m, $Nd^{+++}$ is absorbing in a spectral region around 1.444 $\mu$m due to an absorption on an electronic transition $^4I_{9/2} \rightarrow {}^4I_{15/2}$ which is centered about 1.485 $\mu$m. Such absorption may be minimized, although not eliminated, by using crystal material with an Nd concentration as low as one half percent of the total Nd:YAG weight. Further, self absorption by Nd at 1.444 $\mu$m could be reduced by cooling the laser crystal since self absorption only occurs because of thermal spreading of the absorption line.

The '034 patent discloses that it is possible to obtain a beam of 1.444 $\mu$m radiation from a Nd:YAG laser utilizing an active material formed into a rod if cavity mirrors are used to prevent laser action from occurring at 1.064 $\mu$m and 1.32 $\mu$m, and if the laser drive is repetitively pulsed at high transient power rather than being run continuously. Further, the '034 patent discloses that, using a repetitively pulsed drive, it was possible to achieve laser oscillation with an output transmission mirror which was 20% transmitting and 80% reflecting at 1.44 $\mu$m so that, where laser rod absorption for each cycle of light was 20%, laser power was divided equally between loss in the rod and useful output power.

An article entitled "Eye-safe Nd:YAG laser" by S. K. Wong, P. Mathieu, and P. Pace, *Appl. Phys. Lett.*, Vol. 57, No. 7, Aug. 13, 1990, pp. 650–652 discloses that long-wavelength, pulsed operation of a Nd:YAG laser at 1.444 $\mu$m was produced using mirrors in a simple linear configuration with low reflectivity at 1.064 $\mu$m to suppress the strong 1.064 $\mu$m transition. The Nd:YAG laser was comprised of a rod (6 mm in diameter and 10 cm long) which was: (a) antireflection coated at both 1.064 $\mu$m and 1.444 $\mu$m and (b) pulse-pumped in a dual flashlamp, closed coupled, diffuse cavity. For such a configuration, more than 1 J of energy was extracted at 1.444 $\mu$m and laser efficiency, the ratio of the laser output energy to the stored electrical input energy, was 0.5%. The article further disclosed that, at higher input pump energies, the 1.064 $\mu$m transition lased at the expense of the 1.444 $\mu$m transition.

Further, U.S. Pat. No. 5,091,911 entitled "Long Wavelength NdYAG Laser" which issued on Feb. 25, 1992 (the '911 patent) discloses that the power output of neodymium lasers having output in the wavelength range near 1.444 $\mu$m (corresponding to radiation resulting from the transition $^4I_{9/2} \rightarrow {}^4I_{15/2}$ where the wavelength varies between about 1.4–1.5 $\mu$m depending on the host medium) is affected by the following parameters: (a) the length (L) and diameter (D) of the host crystal; (b) the level of Nd doping (N) of the host crystal; (c) the intensity of the pump excitation; and (d) the reflectivity (R) of mirrors which define the optical cavity. Notwithstanding the fact that the prior art teaches the importance of these parameters, appropriate values for these parameters are not easily chosen. The difficulty can be understood when one considers, as an example, that increasing the intensity of pump excitation increases thermal lensing which, in turn, degrades the output beam. Further, although it is well known that gain is proportional to $e^L$: (a) it is difficult to grow longer crystals; (b) radiation at 1.064 μm is difficult to suppress with increasing L; and (c) increasing L increases self-absorption at 1.444 μm. Similarly, increasing diameter D of the crystal does not necessarily increase output power since increased D results in a lower gain and uneven pumping.

As was disclosed in the '034 patent, a reasonable output was achieved from a neodymium laser at 1.444 μm by pulsing the excitation applied to the host crystal having a neodymium doping of 1N (N, for Normal, is defined as a doping level of 1.1% neodymium by weight of the host crystal), using an output mirror having a reflectivity of about 80% at 1.44 μm, and using optics that discriminated against 1.064 μm radiation. However, the '911 patent discloses that operating the laser with a neodymium doping level between 0.3N and 0.7N yields higher output, particularly when the doping level is about 0.4N and the reflectivity of the output mirror is about 90%, rather than the value of 80% that is predicted by the Rigrod model. In fabricating such a laser, the active laser material was formed in the shape of a rod (about 10 cm long and about 0.7 cm in diameter) wherein opposite ends of the rod were polished and coated for minimum reflectivity at wavelengths of approximately 1.064 μm and 1.32 μm. Further, the laser cavity was formed within a reflective housing of elliptical cross section, which housing was formed of copper with a gold coating on its interior cavity surface to act as a lamp light reflector (the '911 patent also discloses that metal coated glass could also be used to form a laser cavity). Still further, the flashlamp used to pump the laser rod and the laser rod were disposed to lie along the two foci of the elliptical interior shape of the pump cavity, as was considered conventional. The '911 patent further teaches that the flashlamp could also be placed next to the laser rod in a "close coupling" configuration wherein the laser rod and the flashlamp are immediately adjacent each other in the center of a cylindrical reflective cavity or that two flashlamps and a laser rod could be disposed in a dual elliptical cavity, which in cross section looks like two overlapping ellipses wherein the flashlamps are disposed at the two foci of the housing and the laser rod is disposed at the focus they share. The '911 patent discloses that the laser rod and the flashlamp were cooled by flowing deionized water through tubes surrounding both the rod and the flashlamp 2 and that the flow tubes may be comprised of quartz or samarium doped glass.

The reference discloses that the flashlamp was a krypton lamp (arc and flash) having an internal diameter of 7 mm and a length of 10 cm which was operated in a pulse mode for laser operation at 1.44 μm with an applied voltage of about 600 volts for a period of 1 millisecond and at a repetition rate of 30 to 100 pulses per second. The '911 patent further discloses that other lamp sources such as a tungsten lamp or other arc lamp shining continuously, or a Xenon flash lamp producing pulses of light could also be utilized. The '911 patent still further disclosed that the laser cavity mirrors must be reflecting at 1.44 μm but be as transparent as possible at 1.064 μm and 1.32 μm, for example, the preferred embodiment disclosed the use of a mirror having 100% reflectivity at 1.44 μm, 50% reflectivity at 1.32 μm and 10% reflectivity at 1.064 μm. In addition, the '911 patent also discloses the use of a 1 cm thick, silicon window which was anti-reflection coated at 1.44 μm and which was placed inside the laser resonator, adjacent to the laser rod to suppress laser oscillation at 1.06 μm. Lastly, the '911 patent discloses that other elements such as prisms or diffraction gratings could be utilized to provide wavelength selection.

An article entitled "1.05–1.44 μm Tunability and Performance of the CW $Nd^{3+}$:YAG Laser" J. Marling, *IEEE Journal of Quantum Electronics*, Vol. QE-14, No. 1, January 1978, pp. 56–62 disclosed a Nd:YAG laser wherein Nd:YAG active material was pumped by a krypton arc-lamp in a flooded, single-ellipse pumping configuration and wherein laser cavity mirrors were coated with >99.5 percent R from 1.41–1.45 μm and less than 50 percent R from 1.32–1.36 μm. Further, an article entitled "1.05–1.44 μm Tunable High-Power Laser Emission on 18 CW Transitions in $Nd^{3+}$+YAG" by Jack B. Marling, *IEEE J. Quant. Elect.*, Vol. 13, No. 9, pp. 94D–95D discloses that introduction of polarization sensitive intracavity tuning elements, such as prisms, restricts high-power operation on lines other than 1.064 μm due to thermally reduced stress birefringence and that this problem was solved by use of very thin, solid fused silica intracavity etalons for tuning, which etalons provided low insertion loss and were polarization insensitive. In addition, the article suggests that closely spaced lines could be easily discriminated due to the higher effective dispersion of etalons.

An article entitled "A Long Wavelength Nd:YAG Laser", *DREV Report* 1990, S. Wong, P. Pace, P. Mathieu, and J. Tulip, pp. 501–509 teaches that, because of the relatively low gain of the 1,444 μm transition, strong optical pumping is required. However, the article discloses that such strong pumping causes a problem in that the 1.064 μm transition will then deplete the inverted population through amplified spontaneous emission and a large fraction of the pump energy will be wasted. The article further teaches that anti-reflection coatings are required if the laser is to operate satisfactorily at 1.444 μm or that the ends of the laser rod must be cut at Brewster's angle. Lastly, the article suggests the use of diode pumping of the active element.

Tube Geometry

Several prior art references discuss fabricating a laser wherein the active material is formed as a tube.

An article entitled "Emission characteristics of a tube-shaped laser oscillator" by David Milam and Howard Schlossberg, *J. Appl. Phys.*, Vol. 44, No. 5, May, 1973, pp. 2297–2299 discloses that several advantages result from the use of a tube-shaped active material in a laser: (a) placing a flashlamp in the bore of the tube provides symmetrical pumping; (b) flowing coolant along the inner and outer walls of the tube provides efficient cooling; and (c) a thin-walled tube of large outside diameter provides a large volume of active material in a configuration suitable for rapid cooling. Further, the article discloses a tube laser in which two separate cooling flows are provided, the first cools the inside wall of the rod as it passes between the inner tube wall and a Pyrex water jacket surrounding the flashlamp and the second flow cools the exterior of the tube (a bright nickel-plated wall of the exterior cooling jacket also serves as a pump reflector).

Further, an article entitled "Inside-pumped Nd:YAG tube laser" by U. Wittrock and H. Weber, *Optics Letters*, Vol. 16, No. 14, Jul. 15, 1991, pp. 1092–1094 discloses that active media with a tube geometry have favorable thermal properties in that a large volume of active material can be cooled efficiently through the large surface of the tube thereby reducing thermal stress and thermal lensing. Further, the article discloses that, for a Nd:YAG tube of 35 mm inner diameter and 9 mm wall thickness, the heating power per unit length can be 7.3 times higher than that for a rod. Still further, the article discloses that tubes can be excited with flashlamps from the inside in a configuration wherein a tubular reflector surrounds the laser tube closely, leaving only a narrow cooling channel. The article discloses that the advantage of this is that all pumping radiation is forced to go through the crystal and does so again on reflection at the reflector. Lastly, the article discloses that a laser was fabricated wherein: (a) a high-reflecting (HR) dielectric coating was applied to the rear tube surface to form one flat resonator mirror; (b) the second tube end surface was antireflection coated; (c) deionized cooling water was flown along the outer tube surface toward the HR-coated tube end, was redirected by an annular flow plate, and flown between the inner tube surface and the outside of the flow tube where it was redirected to flow back through the inside of the flow tube, thereby cooling four flash tubes; and (d) planar resonators were used since, even at low pulse repetition frequencies, a thermal lens in the tube wall was sufficient to make the planar resonator stable. This last point also appears in an article entitled "High Power Rod, Slab and Tube Lasers" by U. Wittrock, *NATO Summer School Elba* 1992, to be published in Plenum NATO ASI Series 1992 which discloses that a most straightforward resonator to use with a tube laser is a planar resonator that becomes a toric stable resonator due to the thermal lens in the tube wall.

Slab Geometry

Several prior art references discuss fabricating a laser wherein the active material is formed as a slab.

An article entitled "The Slab Laser Shows its Stuff" by W. P. Dobbins and H. von Arb, *Lasers & Optronics*, December, 1990, pp. 43–46 discloses that slab laser design offers advantages over a cylindrical rod geometry, a slab laser being a solid state laser that uses a rectangular-shaped crystal as a host for the lasing medium. A problem with the use of a rod geometry is the fact that, because of linear expansion differences, a laser rod becomes a thick lens having a temperature-dependent refractive index. This point is further amplified in an article entitled "Beam parameters, mode structure and diffraction losses of slab lasers with unstable resonators" by N. Hodgson and T. Haase, *Optical and Quantum Electronics*, Vol. 24, 1992, pp. S903–S926 which discloses that the main problem of solid-state laser engineering is the formation of a thermal lens in the active medium due to heat dissipation by the pumping process and that it is well known that this problem can be reduced by one order of magnitude with the slab geometry. In fabricating a laser using the slab geometry: (a) the side faces of the slab are pumped and cooled; (b) the top and bottom faces are thermally insulated; and (c) effects resulting from a parabolic temperature profile are compensated by zig-zag laser beam propagation. The article further discloses that certain restrictions on beam quality output can be overcome by using unstable resonators and that the advantage of these unstable resonators such as, for example, plane-unstable resonators (flat-flat), is that magnification can be chosen much higher to get optimum output coupling which, in turn, improves beam quality.

An article entitled "Slab lasers: concept and implementation" by J. R. Unternahrer, *SPIE Vol.* 1277 *High-Power Solid State Lasers and Applications*, pp. 86–89 discloses that, unlike rod lasers where typically a single rod and one or two lamps are surrounded by a single or double elliptical reflector, slab geometries have generated a more diverse variety of reflector structures. The article further discloses that typical cooling liquids are water or a water/ethylene glycol mixture since liquid cooling is efficient, but that sealing of the endfaces of the slab is required.

An article entitle "Performance of a 500 watt Nd:GGG zigzag slab oscillator" by L. E. Zapata, K. R. Manes, D. Christie, J. Davin, J. Blink, J. Penland, R. Demaret, and G. Dallum, *SPIE Vol.* 1223 *Solid State Lasers* (1990), pp. 259–273 discloses that an ideal source of upper level activation minimizes heat loading to the laser host and that such a situation could be realized by diode pumping of Nd:YAG but that the average power required for a proposed design was not yet available from diode lasers "although diode development is progressing rapidly." The article further discloses that one problem which occurs in fabricating a slab laser is sealing coolant flow without risking optical damage at the sealing surface and that the problem is solved by use of a one micrometer thick, evanescent wave, evaporated coating of $SiO_2$ which allows coolant and sealing O-rings to be in contact with the large pumping/cooling faces of the slab. The article teaches that an added benefit of such a coating is that it acts as an AR coating (at near normal incidence) for pump bands about 810 nm. This last point is also made in the above-identified article entitled "High Power Rod, Slab and Tube Lasers" by U. Wittrock, which discloses that a dielectric coating of 1 to 2 $\mu m$ $SiO_2$ is applied to the surfaces of the edges of a slab because it enables water seals to be placed anywhere without destroying the TIR of the laser beam.

An article entitled "High Average Power Slab Geometry Solid State Lasers" by H. P. von Arb, Ch. Lüchinger, F. Studer, U. Dürr, A. Gressli, T. Sidler, J. Steffen, and J. C. Poli, *SPIE Vol.* 1021 *High Power Solid State Lasers*, 1988, pp. 24–30 discloses that the crucial points of a slab-geometry laser design are: (a) pumping reflector geometry; (b) uniform cooling of the large surfaces; and (c) thermal insulation of the small surfaces to control the temperature distribution of the two ends, usually Brewster angled. In a typical arrangement: (a) the laser slab is held between two transparent cooling sheets which are sealed in a metallic frame; (b) the space between the cooling sheets and pumping reflectors containing linear flash lamps is circulated by the cooling water; and (c) the small slab surfaces are surrounded by air giving the required thermal insulation. The article further discloses that the transparent cooling sheets were fabricated of crystalline sapphire, polished to optical quality, and brought into contact with the slab-surfaces, which slab-surfaces were coated with a low refractive index film ($SiO_2$) in order to maintain total internal reflection (TIR) of the laser beam in the slab.

An article entitled "Performance of a Conduction Cooled Nd:glass Zigzag Slab Laser" by M. K. Reed and R. L. Byer, *SPIE Vol.* 1021 *High Power Solid State Lasers*, 1988, pp. 128–135 discloses a laser fabricated from a slab sandwiched between two polished sapphire windows in a clean environment, sealed in position with a silicone elastomer, and having ASE suppressing absorbers bonded with index matching adhesive to the slab edges. The slab was cooled by a linear transverse turbulent water flow that passed vertically across each sapphire plate in 2 mm wide flow channels. Further, the slab was pumped by four 300 mm arc-length xenon flashlamps which were coupled to the slab by a gold coated reflector structure.

Slab Geometry—Diode Pumping

Several of the above-identified prior art references as well as the following prior art reference discuss fabricating a laser wherein the active material is pumped utilizing a diode pumping apparatus.

An article entitled "High Average Power Diode Pumped Slab Laser" by B. J. Comaskey, R. Beach, G. Albrecht, W. J. Benett, B. L. Freitas, C. Petty, D. VanLue, D. Mundinger, and R. W. Solarz, *IEEE J. Quantum Electronics*, Vol. 28, No. 4, April, 1992, pp. 992-996 discloses that diode pumping of a solid state medium offers longer service intervals and reduced thermal optical distortions than lamp pumping and that diode pumping also offers higher system efficiency and more compact packaging. The article further discloses that a zigzag total internal reflection, face pumped, slab solid state laser utilizing diode pump arrays of high brightness and high average power can meet advanced industrial requirements and is realizable now. The article still further discloses that one strategy for use of diodes is to distribute the diodes over a large enough area to alleviate thermal concerns and that lens systems (such as a cylindrical glass rod) may then be used to concentrate diode output into the solid state material. Finally, the article teaches stacking of diodes close enough together to achieve high radiance for pumping and using thermal impedance submounts incorporating silicon microchannel coolers to extract waste heat.

Despite: (a) the many references above which disclose lasers producing 1.444 $\mu$m radiation wherein the laser active material is formed as a rod; (b) the many references above which disclose the fabrication of lasers wherein the laser active material is formed as a tube; (c) the many references above which disclose the fabrication of lasers wherein the laser active material is formed as a slab; and (d) the references above which suggest the fabrication of lasers utilizing diode pumping apparatus, there is no teaching in the art relating to apparatus for efficiently producing laser radiation substantially at 1.444 $\mu$m. Thus, there is a need in the art for improved apparatus for producing laser radiation substantially at 1.444 $\mu$m.

SUMMARY OF THE INVENTION

Embodiments of the present invention advantageously solve the above-identified need in the art by providing apparatus for producing laser radiation substantially at 1.444 $\mu$m.

In particular, embodiments of the present invention comprise improved structures for neodymium lasers wherein an active laser material is formed in the shape of a rod, a tube, and a slab, including embodiments of a slab laser wherein the slab is pumped by diode arrays.

In more particular, the improved designs relate to the reflectivities assigned to reflectors which comprise the laser resonator; the dimensions of active material; the structure of the pumping apparatus (including the shape and composition of the pumping cavity); the concentration of Nd; the structure of the laser resonator; and the pumping parameters such as pulse duration, pulse rate, and pump energy.

BRIEF DESCRIPTION OF THE DRAWING

A complete understanding of the present invention may be gained by considering the following detailed description in conjunction with the accompanying drawing in which:

FIGS. 14a and 14b show, in graphical form, calculated output energy per pulse as a function of electrical input energy $E_{electr}$ for two different pulse shapes: (a) Gaussian and b) rectangular, where the upper two graphs show the corresponding pump light distribution and the temporal laser emission at an input energy of 351 J (rod diameter rd=¼" rod length l=100 mm, Nd concentration $C_o$=0.45 at %, $V_s$=0.93, R=0.8, $\eta_o$=4%);

FIG. 27 shows, in graphical form, the minimum stored optical energy $\eta_{o11}E_{electr}$ required to obtain an output energy of 2 J from a slab having height 3 mm and length 100 mm plotted as a function of slab width w where the lower graph shows the optimum mirror reflectivities at which the minimum stored optical energies were obtained (pulse duration $\Delta t=0.65$ ms, $V_s=0.92$);

FIG. 28 shows, in graphical form, the minimum stored optical energy $\eta_{o11}E_{electr}$ required to obtain an output energy of 2 J from a slab having with height 6 mm and length 100 mm plotted as a function of slab width w where the lower graph shows the optimum mirror reflectivities at which the minimum stored optical energies were obtained (pulse duration $\Delta t=0.65$ ms, $V_s=0.92$);

FIG. 29 shows, in graphical form, the minimum stored optical energy $\eta_{o11}E_{electr}$ required to obtain an output energy of 2 J from a slab having with height 10 mm and length 100 mm plotted as a function of slab width w where the lower graph shows the optimum mirror reflectivities at which the minimum stored optical energies were obtained (pulse duration $\Delta t=0.65$ ms, $V_s=0.92$);

FIG. 35 shows, in graphical form, the pump energy $E_{pump}$ at 808 nm required to obtain an output energy of 2 J at 1.444 μm from a slab with a pumped height of 6 mm and length of 100 mm plotted as a function of slab width w, where the lower graph shows the corresponding optimum mirror reflectivities (pulse duration $\Delta t=0.25$ ms and $V_s=0.92$);

FIG. 36 shows, in graphical form, the pump energy $E_{pump}$ at 808 nm required to obtain an output energy of 2 J at 1.444 μm from a slab with a pumped height of 10 mm and length of 100 mm plotted as a function of slab width w, where the lower graph shows the corresponding optimum mirror reflectivities (pulse duration $\Delta t=0.25$ ms and $V_s=0.92$)

DETAILED DESCRIPTION

The present invention relates to apparatus for producing laser radiation substantially at 1.444 μm. The following describes method and apparatus for fabricating such lasers utilizing an active laser material formed in various geometries such as, for example, a rod geometry, a tube geometry, and a slab.

Rod Geometry

Figure 1:
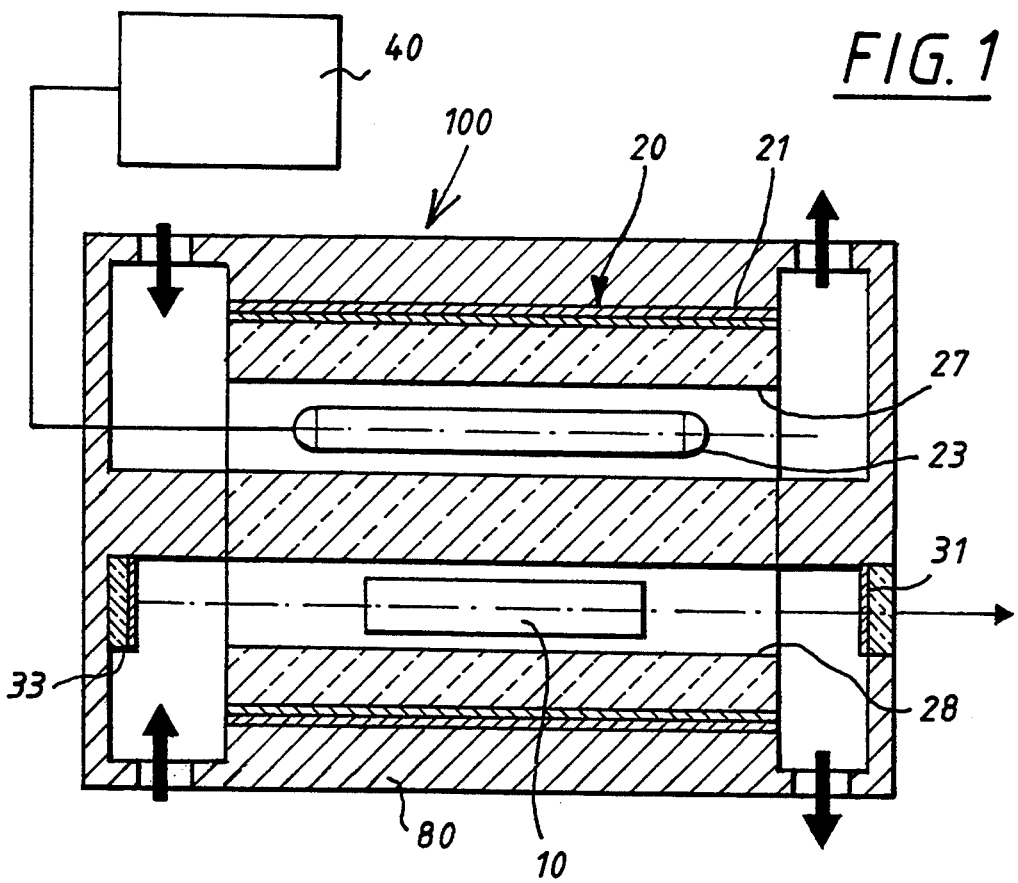
FIG. 1 shows, in pictorial form, a laser wherein an active material is formed in a rod geometry.

FIG. 1 shows, in pictorial form, laser 100 comprised of active material 10 formed in a rod geometry, i.e., rod 10. Rod 10 is comprised of a crystalline or glass host which is doped with neodymium. The doping which is utilized in preferred embodiments of the present invention will be described in detail below. As shown in FIG. 1, laser 100 comprises a housing 80 which contains a pumping apparatus 20. Pumping apparatus 20 is comprised of reflective optical cavity 21 in which is disposed radiation source 23. The shape of the reflective optical cavity 21, the materials of which it is fabricated, and the placement of radiation source 23 therein in preferred embodiments of the present invention will be described in detail below. Further, embodiments of radiation source 23 for use in preferred embodiments of the present invention will be described below.

As further shown in FIG. 1, radiation source 23 and rod 10 are surrounded by cooling apparatus 27 and 28 respectively. Embodiments of cooling apparatus for use in preferred embodiments of the present invention will be described in detail below. As still further shown in FIG. 1, rod 10 is disposed in a laser cavity 30 formed by resonators 31 and 33. Embodiments of resonators 31 and 33 for use in preferred embodiments of the present invention will be described in detail below. Finally, FIG. 1 shows power source 40 which provides pulse power to radiation source 23 so that radiation source, in turn, produces pulses of pump radiation for exciting active material 10. Embodiments of power source for use in preferred embodiments of the present invention will be described in detail below.

In a preferred embodiment of the present invention, rod 10 is comprised of Nd+++ ions which are incorporated into a crystalline or glass host structure. The most common crystal host structure, and the one preferred for use in fabricating rod 10, is yttrium aluminum garnet (YAG), a material having a garnet like structure and the chemical formula $Y_3Al_5O_{12}$. Alternatives to YAG that may be utilized to form a laser are, for example, yttrium lithium fluoride (YLF), and yttrium aluminate (YALO). Additionally, since crystal growth problems tend to limit the maximum length of YAG rods, glass may also be utilized as a host structure. The opposite ends of rod 10 are polished and coated in a manner which is well known to those of ordinary skill in the art for low reflectivity at wavelengths of approximately 1.064 $\mu$m and 1.32 $\mu$m. In the preferred embodiment of the present invention, the neodymium doping comprises a neodymium concentration substantially in a range from about 0.45 atomic percent (preferred for pump energies below 100 J) to about 0.8–0.90 atomic percent (preferred for pump energies from about 400 J to about 500 J). Further, in the preferred embodiment, rod 10 has a length substantially in a range from about 75 mm to about 180 mm and a diameter substantially in a range from about 4 mm to about 10 mm.

In a preferred embodiment of the present invention, power source 40 is fabricated in a manner which is well known to those of ordinary skill in the art to provide pulsed operation of flashlamp 23. For example, flashlamp 23 is driven by a D.C. power source (not shown) of conventional design to provide a simmer current to flashlamp 23. As is well known, the simmer current maintains flashlamp 23 in a conducting state between current pulses. Further, flashlamp 23 is also driven by pulsing power supply (not shown) of conventional design to provide current pulses having a variable duration in a range from about 0.3 ms to about 1 ms and having a variable repetition rate in a range from about 0 Hz to about 100 Hz. Still further, flashlamp 23 is started in a manner which is well known to those of ordinary skill in the art by a triggering transformer (not shown) which, in the most common arrangement, comprises a series high voltage pulse transformer having its own independent driving electronics. In the preferred embodiment of the present invention, power source 40 provides output power which is adjustable in a manner which is well known to those of ordinary skill in the art so that the peak power of radiation provided by pumping apparatus 23 is adjustable substantially in a range from about 50 kW to about 2.5 MW.

In a preferred embodiment of the present invention, reflective optical cavity 21 is formed to have an elliptical cross section, is fabricated from metal, for example, copper, and has a silver coating on its interior surface to act as a light reflector.

In a preferred embodiment of the present invention, radiation source 23 is preferably a a krypton flashlamp, i.e., a krypton arc lamp which is operated in a pulse mode. Further, flashlamp 23 and rod 10 are disposed to lie along the two foci of the elliptical interior shape of pump cavity 21. Several other types of cavity configurations may also be utilized in fabricating embodiments of the present invention. Another configuration comprises an arrangement wherein two flashlamps and rod 10 are disposed in a dual elliptical cavity, which cavity in cross section looks like two overlapping ellipses with the lamps being disposed at two outer foci of the cavity and rod 10 being disposed at the focus shared by the two ellipses. In an alternative embodiment, flashlamp 23 can also be placed next to rod 10 in a "close coupling" configuration wherein rod 10 and flashlamp 23 are immediately adjacent each other in the center of, for example, a cylindrical reflective cavity. In addition, other lamp sources may be used such as, for example, a tungsten lamp or other arc lamp shining continuously, or a Xenon flash lamp.

In a preferred embodiment of the present invention, cooling apparatus 27 and 28 are comprised of flowtubes through which is pumped, for example, deionized water. As shown in FIG. 1, flowtube 27 surrounds and provides cooling for flashlamp 23 and flowtube 28 surrounds and provides cooling for rod 10. Flowtubes 27 and 28 are fabricated of quartz doped with rare earth material, for example, europium, cerium, and samarium.

In a preferred embodiment of the present invention, resonators 31 and 33 are substantially flat mirrors and the reflectivity of output mirror 31 is relatively high for radiation in a range of wavelengths substantially between about 1.4 $\mu$m and about 1.5 $\mu$m and for producing relatively low reflection substantially at predetermined other ranges of wavelength. In particular, relatively the low reflection comprises having reflectivity: (a) less than about 0.076 for wavelengths substantially equal to 1.064 $\mu$m; (b) less than about 0.652 for wavelengths substantially equal to 1.338 $\mu$m; (c) less than about 0.797 for wavelengths substantially equal to 1.335 $\mu$m; (d) less than about 0.85 for wavelengths substantially equal to 1.33 $\mu$m; and (e) less than about 0.907 for wavelengths substantially equal to 1.321 $\mu$m. Further, the relatively high reflection comprises having reflectivity of about 0.85 for radiation having a wavelength of about 1.44 $\mu$m.

In accordance with the present invention, eqns. 1–4 are utilized to predict the performance of 1.444 $\mu$m lasers.

$$E_{out} = \frac{1-R}{1-R+\sqrt{R}\left(\frac{1}{V_s}-V_s\right)} \left[ 0.737\eta_o E_{electr}\left(1 - \frac{|\ln(\sqrt{R}\,V_s)|}{\sigma \ln_s}\right) - FI_s\Delta t |\ln(\sqrt{R}\,V_s)| \right] \quad (1)$$

where:
F: cross sectional area of the rod
l: rod length
$\eta_o$: excitation efficiency at 1.064 $\mu$m
$\sigma$: effective cross section ($=5\times 10^{-20}$ cm$^2$)
R: mirror reflectivity
$V_s$: loss factor/transit
$E_{electr}$: electrical input energy
$\Delta t$: pulse duration
$I_s$: saturation intensity ($=12104$ W/cm$^2$)
$n_s$: inversion density given by $n_s=(8.5-2.5C_o/1.2)10^{-17}$cm$^{-3}$ (with $C_o$ being the Nd concentration in at %)

The excitation efficiency $\eta_o$ is defined as the ratio of optical energy stored between the $^4F_{3/2}$ and $^4I_{11/2}$ levels, i.e., the 1.064 $\mu$m laser transition, per unit of electrical input energy. For pulsed flashlamps, the excitation efficiency $\eta_o$ can be calculated utilizing the following expression:

$$\eta_o = K\eta_{ge}R_c \frac{1 - \exp(-0.01 * C_o * rd)}{1 - R_c\exp(-0.01 * C_o * rd)} \quad (2)$$

where: $C_0$ is the Nd concentration in at %, rd is the rod diameter in mm, $R_c$ is the cavity wall reflectivity (0.94 for gold and 0.97 for silver), and $\eta_{ge}$ is a geometrical transfer efficiency. The constant K takes into account energy losses due to quantum defect, radiation efficiency of the lamps, and so forth. Although K cannot be calculated analytically, it can be calculated in a manner which is well known to those of ordinary skill in the art by using ray-tracing techniques. Typical values for optimized cavities are K=0.08 for silver and K=0.065 for gold.

The geometrical transfer efficiency $\eta_{ge}$ takes account of the imaging properties of the pump cavity. In a reasonably good approximation, the transfer efficiency can be calculated geometrically for single elliptical and double elliptical cavities (see a book entitled "Solid State Laser Engineering" by Walter Koechner, Springer-Verlag, 1986, pp. 323-327). For a single elliptical cavity with eccentricity e and lamp inner diameter ld, agreement with numerical ray-tracing is obtained by utilizing the relation:

$$\eta_{ge} = (\alpha + 0.9rd*\beta/ld)/\pi \quad (3)$$

where:

$\alpha = \arccos[(1 - 0.5(1-e^2)(1+rd/ld))/e]$ $\beta = \arcsin[ld*\sin(\alpha)/rd]$ However, the transfer efficiency $\eta_{ge}$ and the factor K are in general not known and must be determined experimentally by measuring the excitation efficiency for a Nd:YAG rod with known Nd concentration. If $\eta_{o11}$ denotes the measured excitation efficiency for a rod of diameter rd and Nd concentration 1.1 at % (this being the most commonly used Nd concentration), then the excitation efficiency $n_o$ at any other concentration is found according to eqn. 2 as:

$$\eta_o = \eta_{o11} \frac{R_c[1 - \exp(-0.01 * C_o * rd)]}{1 - R_c\exp(-0.01 * C_o * rd)} \frac{1 - R_c\exp(-0.011 * rd)}{R_c[1 - \exp(-0.011 * rd)]} \quad (4)$$

The output energy at 1.444 μm can now be written as a function of stored optical energy $\eta_{o11}E_{electr}$. An alternative way to calculate the output energy is to determine the unknown constant K in eqn. 2 by using the excitation efficiency measured at an arbitrary rod radius rd and Nd concentration $C_o$. The excitation efficiency as a function of rd and $C_o$ is then known and can be inserted into eqn. 1.

Figure 2:
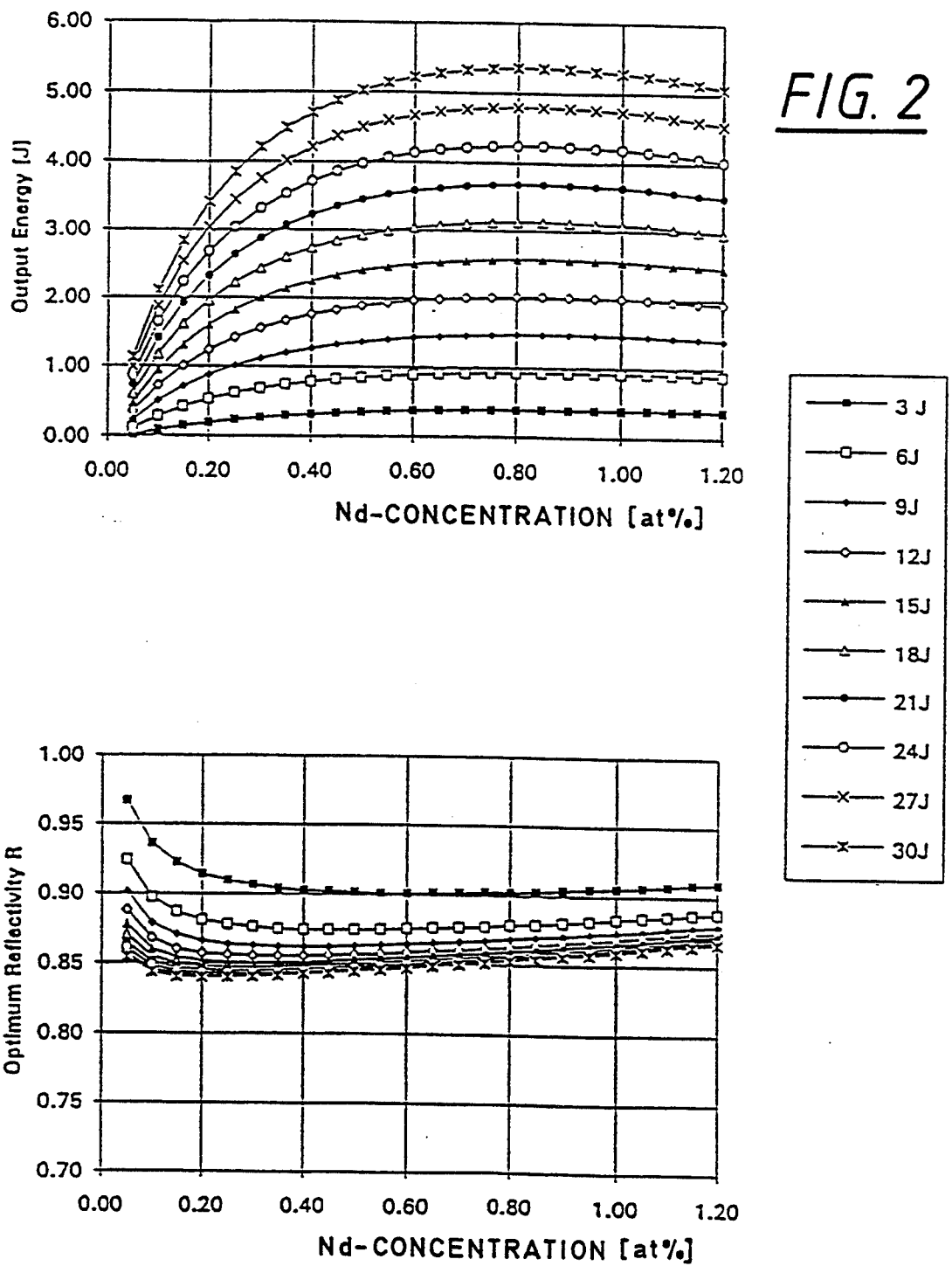
FIG. 2a, 2b and 2c show, in graphical form, calculated maximum output energy $E_{out,max}$ and optimum mirror reflectivity $R_{opt}$ as a function of Nd concentration utilizing eqn. 1 and 4, plotted as a function of stored optical energy $n_{o11}E_{electr}$ (rod diameter rd=6.35 mm, rod length l=100 mm, pulse duration $\Delta t$=0.65 ms, and cavity wall reflectivity $R_c$=0.97)
Figure 3:
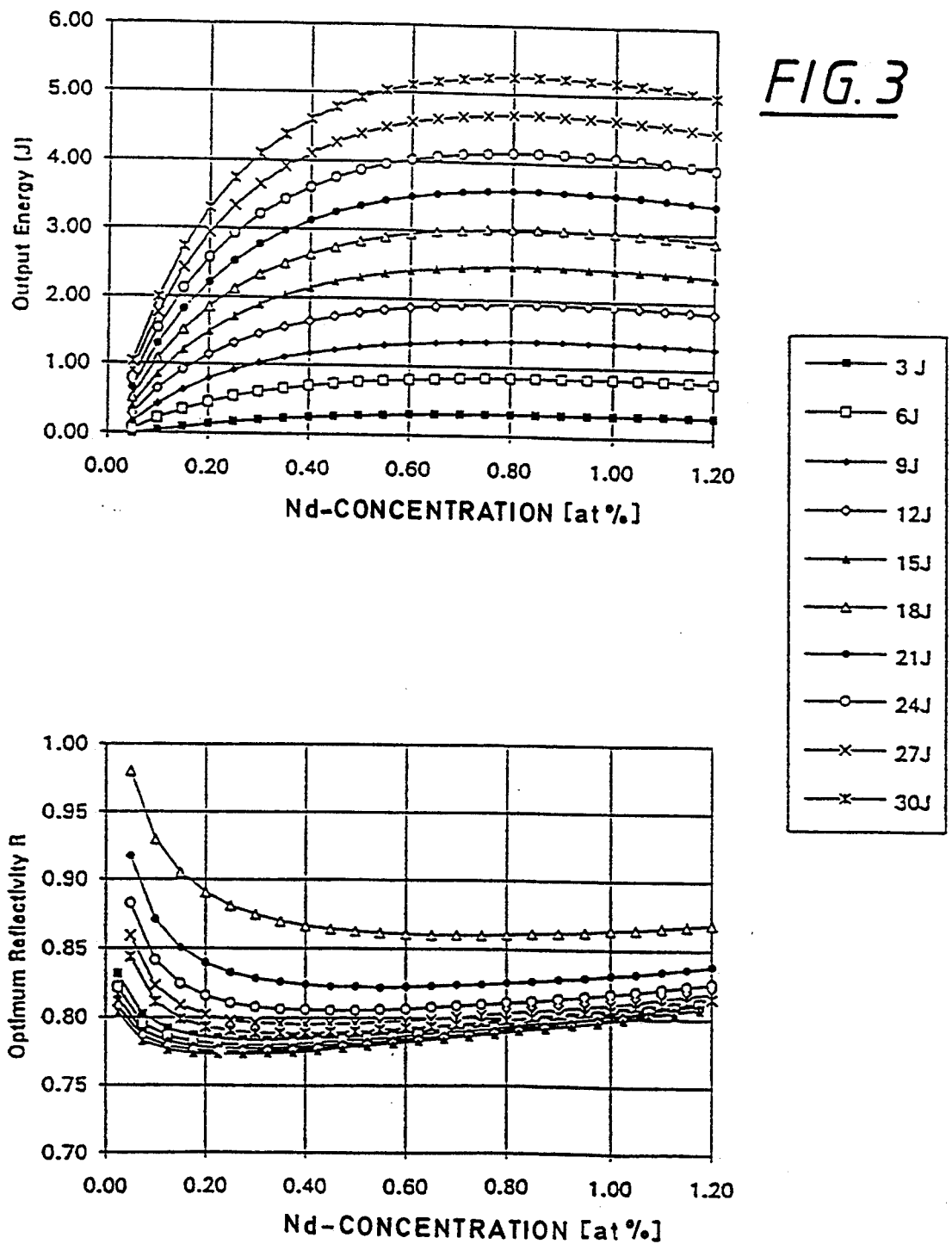
FIG. 3a, 3b and 3c show, in graphical form, calculated maximum output energy $E_{out,max}$ and optimum mirror reflectivity $R_{opt}$ as a function of Nd concentration utilizing eqn. 1 and 4, plotted as a function of stored optical energy $\eta_{o11}E_{electr}$ (rod diameter rd=6.35 mm, rod length l=150 mm, pulse duration $\Delta t$=0.65 ms, and cavity wall reflectivity $R_c$=0.97)
Figure 4:
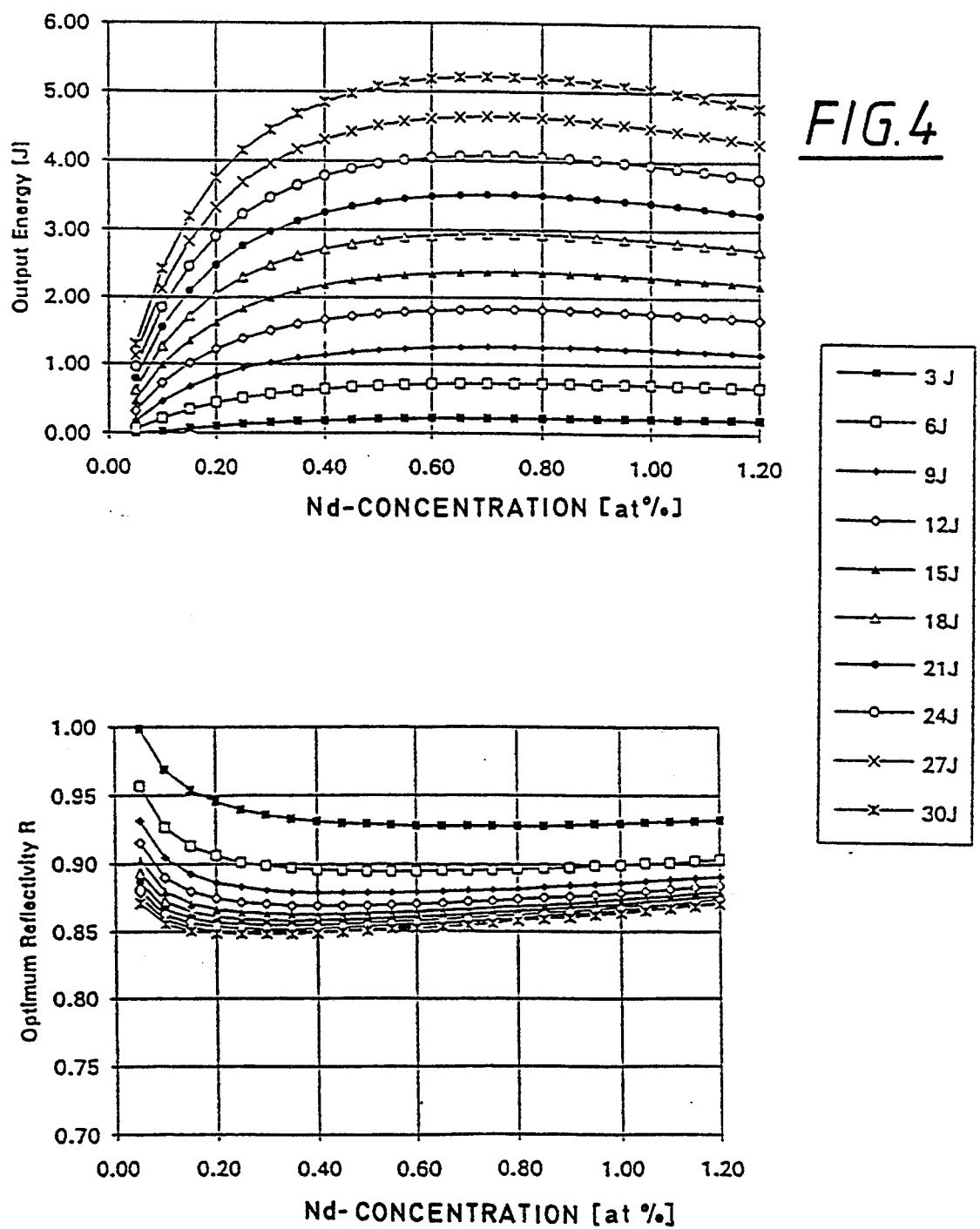
FIG. 4a, 4b and 4c show, in graphical form, calculated maximum output energy $E_{out,max}$ and optimum mirror reflectivity $R_{opt}$ as a function of Nd concentration utilizing eqn. 1 and 4, plotted as a function of stored optical energy $\eta_{o11}E_{electr}$ (rod diameter rd=10.0 mm, rod length l=100 mm, pulse duration $\Delta t$=0.65 ms, and cavity wall reflectivity $R_c$=0.97)

FIGS. 2–4 show, in graphical form, calculated maximum output energy $E_{out,max}$ and optimum mirror reflectivity $R_{opt}$ as a function of Nd concentration utilizing eqns. 1 and 4, plotted as a function of stored optical energy $\eta_{o11}E_{electr}$. In order to obtain these optimum values, reflectivity in eqn. 1 was varied from 0.0 to 1.0 for each value of doping concentration and optical energy. It has been discovered that the optimum mirror reflectivity is around 85–90%, depending on rod dimensions, and is in excellent agreement with experimental observations that have been made.

Figure 5:
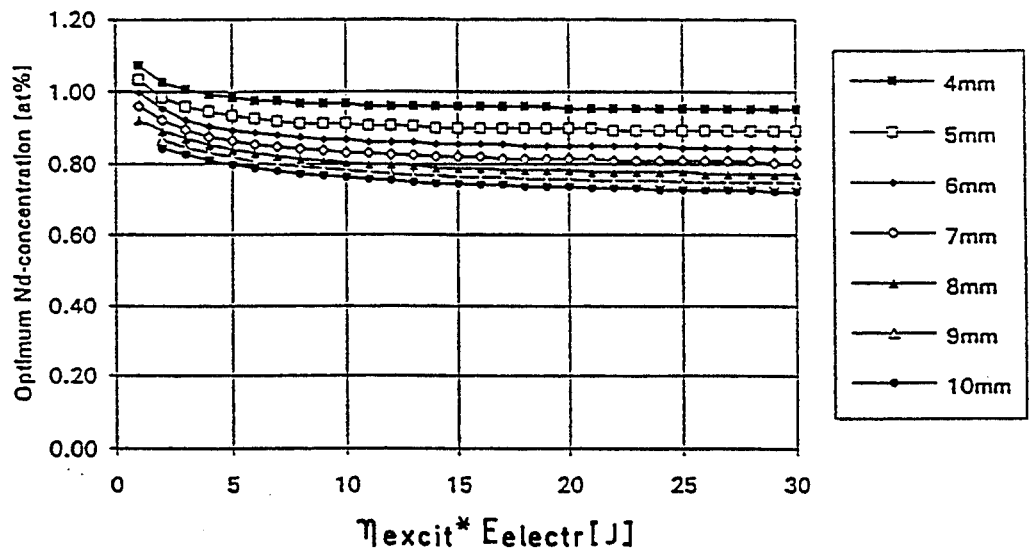
FIG. 5a, and 5b show, in graphical form, the optimum Nd concentration plotted as a function of stored optical energy $\eta_{o11}E_{electr}$ with rod diameter rd as a parameter.

Further, it has been discovered that the optimum doping concentration is always higher than 0.8 at %, no matter which pumping conditions are chosen. FIG. 5 shows, in graphical form, optimum Nd concentration plotted as a function of stored optical energy $\eta_{o11}E_{electr}$ with rod diameter rd as a parameter ($R_c=0.97$).

Figure 6:
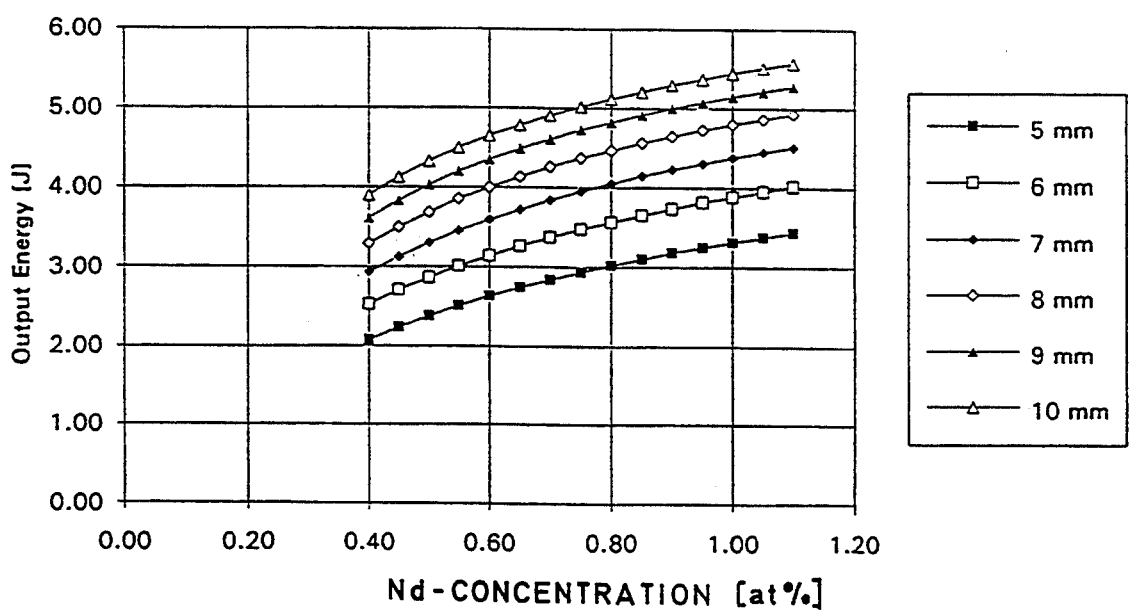
FIG. 6a and 6b show, in graphical form, calculated output energy per pulse as a function of Nd concentration, utilizing eqn. 1-3, for an electrical pump energy of 500 J with rod diameter in mm as a parameter (a single elliptical silver cavity with eccentricity e=0.39, K=0.08, lamp diameter ld=6 mm, cavity wall reflectivity $R_c$=0.97, mirror reflectivity R=0.85, rod length l=100 mm, and pulse duration $\Delta t$=0.65 ms)

The following discusses how to utilize the model described in Appendix 1 to design a 1.444 μm laser. In a first use of the model, assume that one begins with a configuration wherein rod 10 is a Nd:YAG rod having: (a) rod diameter rd; (b) rod length l; and (c) Nd doping concentration $C_o$. Using this information, one measures the threshold pump energy for 1.064 μm laser emission with different mirror reflectivities at a predetermined pulse width having a magnitude close to the pulse width one desires to provide for the 1.444 μm laser. From a Findlay-Clay-plot, one can read off the excitation efficiency $\eta_o$. With this measurement, the unknown constant K in eqn. 2 can be determined in combination with eqn. 3. The dependence of $\eta_o$ on rod diameter and Nd concentration is then known. Using this information and a loss factor of $V_s=\exp(-0.008 \text{ cm}^{-1}*1)$ one can utilize eqns. 1 and 2 to determine output energy $E_{out}$ as a function of pump energy $E_{electr}$ while varying rod diameter, Nd concentration, mirror reflectivity, and pulse width. This procedure provides the optimum design of the laser. FIG. 6 shows, in graphical form, calculated output energy per pulse as a function of Nd concentration, utilizing eqn. 1–3, for an electrical pump energy of 500 J with rod diameter in mm as a parameter (a single elliptical silver cavity with eccentricity e=0.39, lamp diameter ld=6 mm, a constant K=0.08, cavity wall reflectivity $R_c=0.97$, mirror reflectivity R=0.85, rod length l=100 mm, and pulse duration Δt=0.65 ms).

In a second use of the model, assume that one does not have a specification of a pump cavity or a rod and that the only specification is that one has to fabricate a 1.444 μm laser having a predetermined output energy and pulse duration. In such a case, one uses eqns. 1 and 4 to calculate stored optical energy $\eta_{o11}E_{electr}$ according to the following eqn. 5:

$$\eta_{o11}E_{electr} = \frac{\eta_{o11}}{\eta_o} \frac{1.357}{1 - \frac{|\ln(\sqrt{R}\ V_s)|}{\sigma \ln_s}} \left[ \frac{1 - R + \sqrt{R}\left(\frac{1}{V_s} - V_s\right)}{1 - R} E_{out} + FI_s\Delta t |\ln(\sqrt{R}\ V_s)| \right] \quad (5)$$

Figure 7:
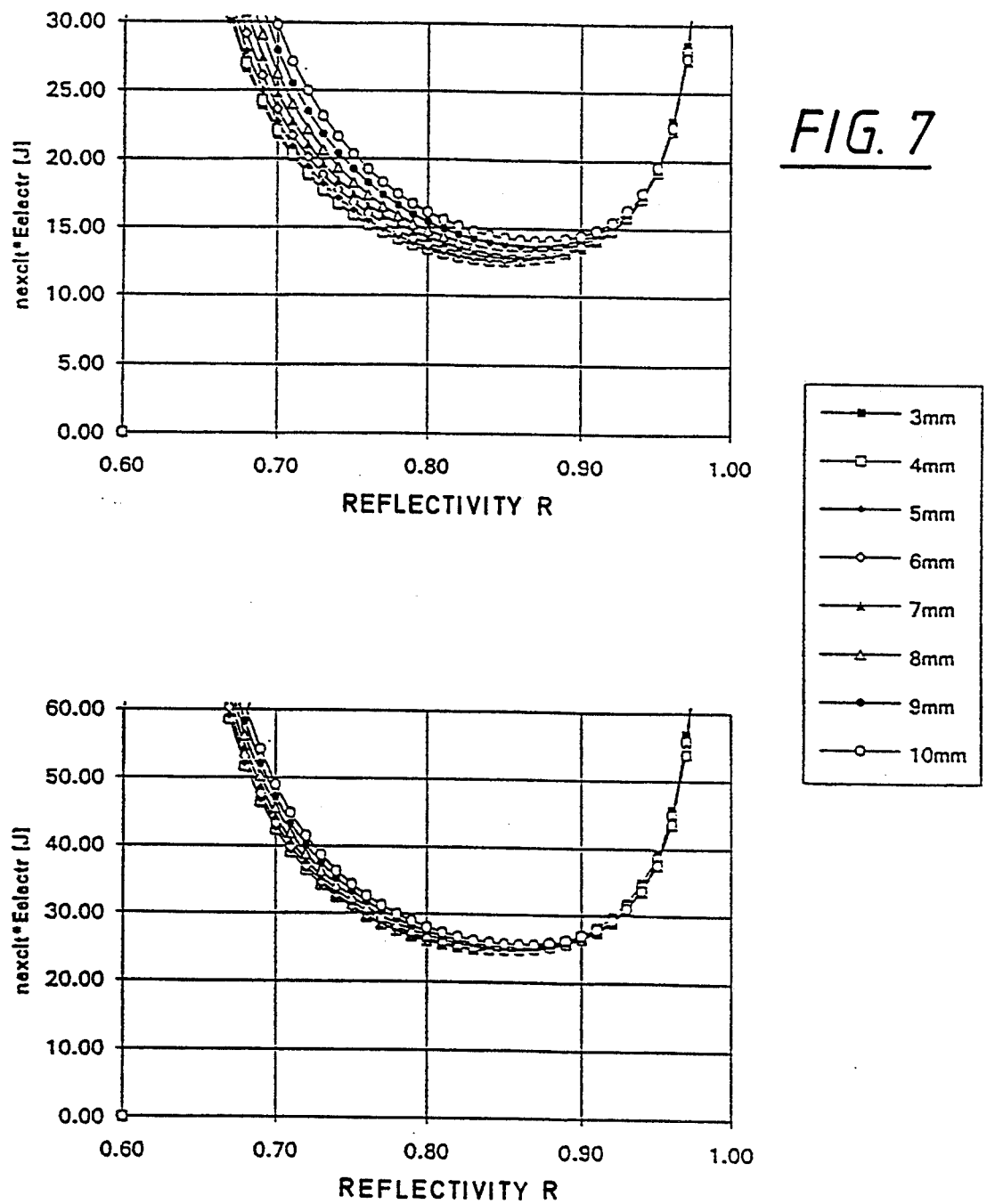
FIG. 7a, 7b, and 7c show, in graphical form, stored optical energy $\eta_{o11}E_{electr}$ needed to obtain an output energy of (a) 2J and (b) 4J as a function of mirror reflectivity R plotted as a function of rod diameter rd (pulse duration $\Delta t$=0.65 ms, Nd concentration $C_o$=0.8 at %, and cavity wall reflectivity $R_c$=0.97)

The ratio $\eta_{o11}/\eta_o$ is determined using eqn. 4. FIG. 7 shows, in graphical form, stored optical energy $\eta_{o11}E_{electr}$ needed to obtain an output energy of (a) 2 J and (b) 4 J as a function of mirror reflectivity R plotted as a function of rod diameter rd (pulse duration Δt=0.65 ms, Nd concentration $C_o=0.8$ at %, and cavity wall reflectivity $R_c=0.97$). The graph shown in FIG. 7 provides the optimum mirror reflectivity and the optical energy required. Utilizing this information, one can determine the amount of input electrical energy to utilize since it is well known to those of ordinary skill in the art how to design a pump cavity having an excitation efficiency of at least 4%. For this purpose eqn. 2 and 3 can be used with reasonable numbers for the constant K, i.e., K=0.06–0.07. For the example disclosed in FIG. 7, electrical pump energies of 330 J and 625 J are required, respectively.

Figure 8A:
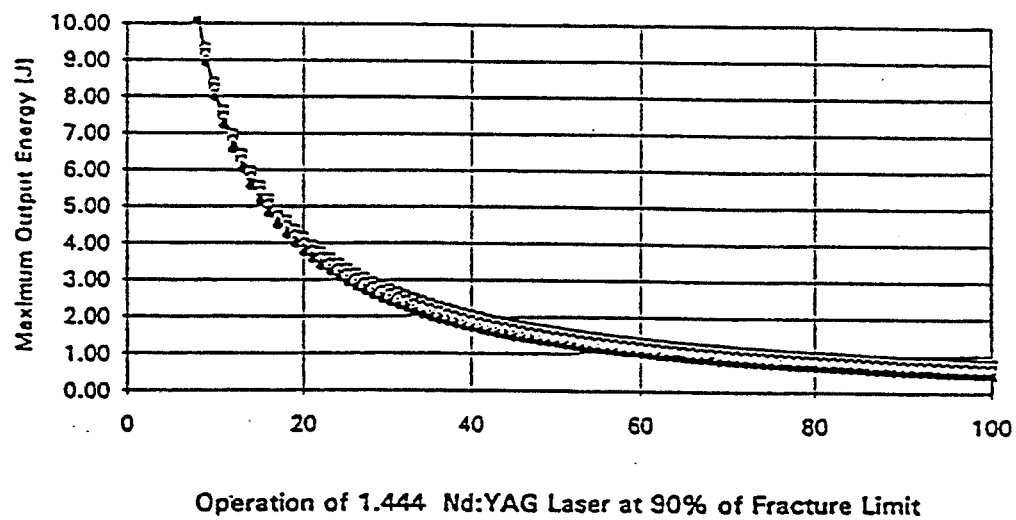
FIGS. 8a and 8b show, in graphical form, calculated maximum output energy per pulse at 1.444 $\mu$m as a function of repetition rate f using eqn. 1 in combination with eqn. 6 as a function of rod diameter (3-10 mm) for two different rod lengths: (a) l=4 inch and (b) l=6 inch.
Figure 8B:
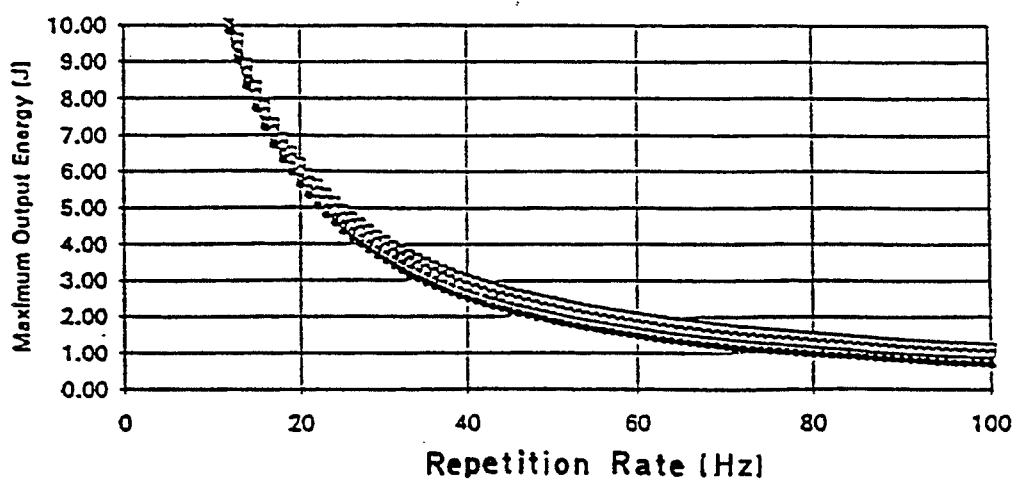

As is well known to those of ordinary skill in the art, a Nd:YAG rod will fracture whenever electrical pump power exceeds a certain amount. This must be considered when designing a 1.444 μm laser. In particular, for each value of output energy per pulse, the repetition rate should remain below an upper bound to avoid fracture. The following calculates the maximum output energy as a function of repetition rate f by using eqn. 1 and the following eqn. 6:

$$\eta_o E_{electr} = \text{klP}_F/f \tag{6}$$

where $P_F$=50 W/cm, f=repetition rate in Hz, and l=rod length in cm. Factor k is a safety factor which is chosen to be k=0.9. This safety factor ensures reliable laser performance since a sufficiently large distance is maintained from the fracture limit, i.e., k=1. By inserting eqn. 6 into eqn. 1 and by varying mirror reflectivity, one obtains a maximum output energy $E_{out}$ for each value of repetition rate f. FIG. 8 shows, in graphical form, calculated maximum output energy per pulse at 1.444 μm as a function of repetition rate f using eqn. 1 in combination with eqn. 6 plotted as a function of rod diameter for two different rod lengths: (a) l=4 inch and (b) l=6 inch. As shown in FIG. 8, one obtains a maximum average output power of 80 W at 1.444 μm with a four inch long rod and increasing the rod length to 6 inches results in an upper bound for the output power of 120 W.

Figure 9:
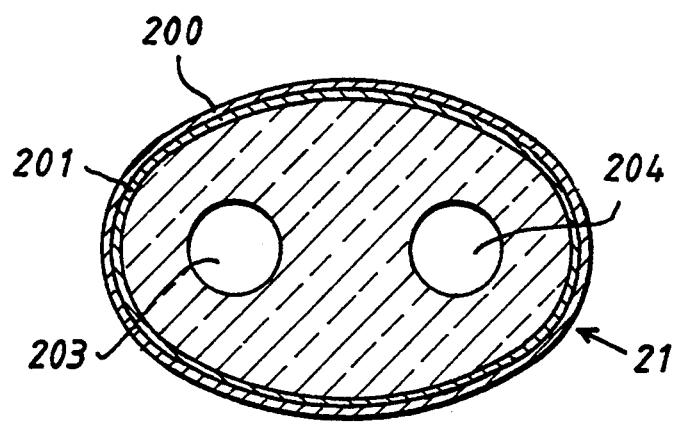
FIGS. 9, 10, 11, 12 and 13 show, in pictorial form, various embodiments and configurations of a rod, a reflective optical cavity, and a pumping apparatus for use in the laser shown in FIG. 1.

FIGS. 9–13 show, in pictorial form, various embodiments and configurations of rod 10, reflective optical cavity 21, and pumping apparatus 23 for use in laser 100 shown in FIG. 1. FIG. 9 shows a preferred embodiment wherein reflective optical cavity 21 has an elliptical cross section and outer layer 200 is fabricated from metal or plastic. Inner, light reflective layer 201 is affixed to the interior surface of outer layer 200. Layer 201 may be fabricated silver, gold, aluminum, or BaSO$_4$ or may be comprised of a mixture of these materials or may even be comprised of dielectric materials. As shown in FIG. 9, the inside of optical cavity 21 is filled with quartz or glass and, in a preferred embodiment, the quartz or glass is doped with rare earth materials such as europium, samarium, or cerium. Lastly, as also shown in FIG. 9, rod hole 203 in which rod 10 is disposed and flashtube hole 204 in which flashtube 23 is disposed are placed substantially at the foci of the ellipse formed by the cross section of layer 201.

Figure 10:
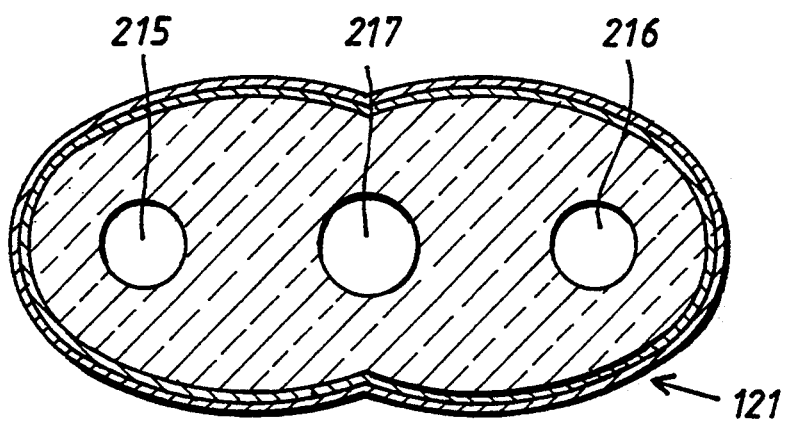

As shown in FIG. 10, reflective optical cavity 121 is substantially the same as cavity 21 shown in FIG. 9 except that the cross section of cavity 121 shown in FIG. 10 is comprised of intersecting ellipses. As shown in FIG. 10, flashtube holes 215 and 216 are disposed at the outer foci of the two ellipses and rod hole 217 is disposed at the common focus of the two ellipses. The other details of the interior of cavity 121 are the same as was described above with respect to cavity 21.

Figure 11:
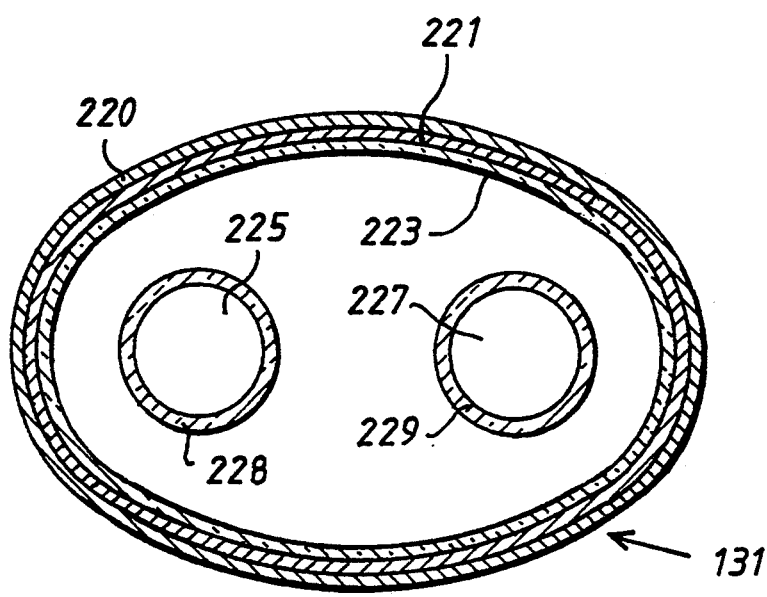

As shown in FIG. 11, reflective optical cavity 131 has an elliptical cross section and outer layer 220 is fabricated in the same manner as was layer 200 shown in FIG. 9. Inner, light reflective layer 221 is fabricated in the same manner as was layer 201 shown in FIG. 9. Further, as shown in FIG. 11, an additional layer 223 is affixed to the interior surface of reflective layer 221. Layer 223 may be fabricated from quartz or glass and, in a preferred embodiment, the quartz or glass is doped with rare earth materials such as europium, samarium, or cerium. As also shown in FIG. 11, rod hole 225 in which rod 10 is disposed and flashtube hole 227 in which flashtube 23 is disposed are placed substantially at the foci of the ellipse formed by the cross section of layer 221. Lastly, rod hole 225 is surrounded by flowtube 228 and flashtube hole 227 is surrounded by flowtube 229. Flowtubes 228 and 229 provide channels wherein coolants may circulate to cool rod 10 and flashtube 23 and are fabricated from quartz or glass which is undoped or which is doped with rare earth materials such as europium, samarium, or cerium.

Figure 12:
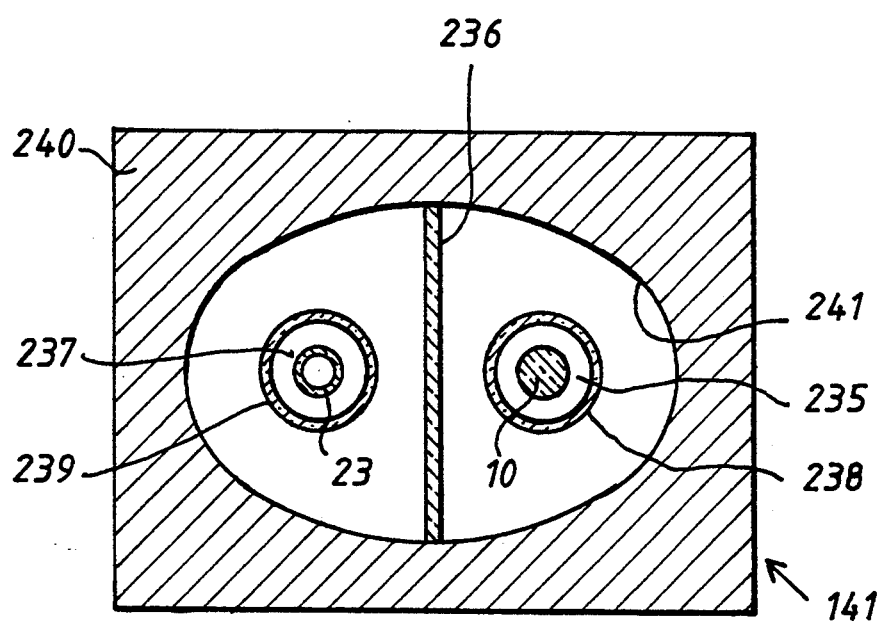

As shown in FIG. 12, reflective optical cavity 141 comprises outer structure 240 which has an elliptical inner cross section, outer structure 240 is fabricated from metal or plastic. Inner, light reflective layer 241 is affixed to the interior surface of outer layer 240. Layer 241 may be fabricated silver, gold, aluminum, or BaSO$_4$ or may be comprised of a mixture of these materials or may even be comprised of dielectric materials. As also shown in FIG. 12, rod hole 235 in which rod 10 is disposed and flashtube hole 237 in which flashtube 23 is disposed are placed substantially at the foci of the ellipse formed by the cross section of the interior of structure 240. Rod 10 is surrounded by flowtube 238 and flashtube 23 is surrounded by flowtube 239. Flowtubes 228 and 229 provide channels wherein coolants may circulate to cool rod 10 and flashtube 23 and are fabricated from quartz or glass which is undoped or which is doped with rare earth materials such as europium, samarium, or cerium. Lastly, as shown in FIG. 12, quartz or glass window 236 which is doped with rare earth material is disposed between rod 10 and flashlamp 23.

Figure 13:
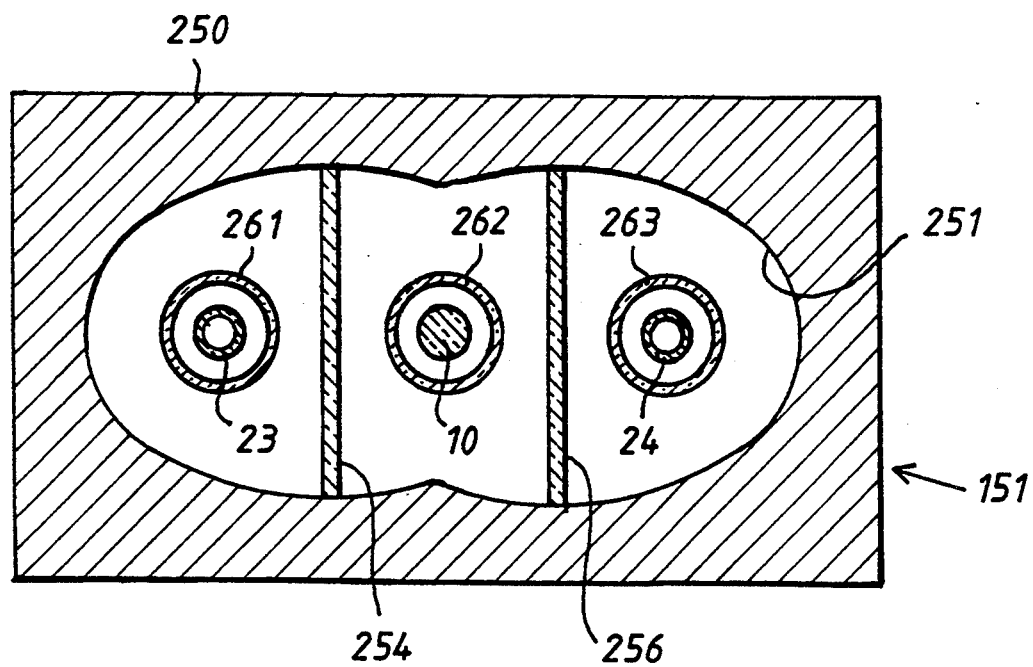

FIG. 13 shows reflective optical cavity 151 which is fabricated in the same manner as reflective cavity 141 shown in FIG. 11 except that a cross section of the interior of structure 250 is a double, intersecting ellipse and there are doped window 254 and 256 disposed between rod 10 and flashtubes 23 and 24, respectively. As shown in FIG. 13, reflective layer 251 is affixed to the interior of structure 250, and flowtubes 261, 262, and 263 surround flashtube 23, rod 10, and flashtube 24, respectively.

In accordance with a preferred embodiment of the present invention, a pump cavity for a 1.444 μm laser ought to fabricated using a silver reflector. Further, this is the case for single or double ellipse pump cavities. This was determined by comparing experimental results for cw operation at 1.064 μm and for pulsed operation at 1.444 μm with a gold cavity reflector and a Sm-doped quartz flowtube around the rod and with a silver cavity reflector and a Eu-doped quartz flowtube around the rod, both with Ce-doped flowtubes around the flashlamps. In 1.444 μm operation utilizing a double elliptical cavity, the overall efficiency is improved by 40% at an input energy of 250 J and by 25% at an input energy of 500 J. This indicates that the excitation efficiency is increased by about 20% by using silver cavities. A similar improvement was obtained with a single ellipse in cw operation at 1.064 μm. In addition, in a preferred embodiment, the efficiency can be further improved by choosing a cavity length which is about 10–15% greater than the arc length of the flashlamps. This is believed to occur because the amount of radiation leaving the cavity through holes is thereby decreased.

Several further improvements to laser 100 are now described, each of which improvements will increase the overall efficiency by about 5-10%, and, when taken together should provide an improvement in a range between 30 and 50%.

In a preferred embodiment of the present invention, power source 40 is configured in a manner which is well known to those of ordinary skill in the art to output drive signals so that pumping apparatus 23 outputs a rectangular temporal pump pulse profile. One method is to switch the discharge with an insulated gate bipolar transistor (IGBT) where the switching rate is controlled by the discharge current. In accordance with the present invention, the use of a rectangular pump pulse profile increases the peak pump power over that produced by a Gaussian pump pulse profile by 10% for the same pulse duration and the same input energy and, this is expected to produce a similar increase of small signal gain and an improved extraction efficiency. FIG. 14 shows, in graphical form, calculated output energy per pulse as a function of electrical input energy $E_{electr}$ for two different temporal pulse shapes: (a) Gaussian and b) rectangular, where the upper two graphs show the corresponding pump light distribution and the temporal laser emission at an input energy of 351 J (rod diameter $rd=\frac{1}{4}''$ rod length $l=100$ mm, Nd concentration $C_o=0.45$ at %, $V_s=0.93$, $R=0.8, \eta_o=4\%$). At high input energy, i.e., at energies in the range 400-600 J, efficiency is increased by 10% and at lower input energies the efficiency is increased by 15%-20%.

As was discussed above, output power can be increased by choosing an optimum Nd concentration of 0.8-0.9 at %. Further improvements to efficiency can be obtained by changing the active material. First, a larger rod diameter should be used because the absorption length for the pump light, as well as the geometrical transfer efficiency (eqn. 3), is increased. Unfortunately, the beam quality and the extraction efficiency get worse if the rod diameter is chosen to large. It is expected that a rod having an 8 mm diameter is preferred.

In accordance with a preferred embodiment of the present invention, it is expected that the efficiency can be improved by pumping a rod with one flashlamp in a single elliptical cavity over that achieved by pumping the rod with two flashlamps in a double elliptical cavity. However, a single flashlamp cannot produce the high pumping required for some applications. In such a case, a preferred embodiment comprises the use of two flashlamps in a double elliptical, silver lined cavity.

In a preferred embodiment of the present invention, an improvement in beam quality can be achieved by using symmetric flat/flat mirrors for resonators 31 and 33 with increased resonator length l. Beam quality includes the effects of diffraction, thermal lensing, and spherical aberration. Calculations of beam quality have been made at 1.444 μm as a function of average input power for different resonators. These results show that beam quality improves when utilizing a flat/flat cavity resonator over that achieved utilizing a concave mirror/flat resonator and that beam quality further improves for the flat/flat configuration as the resonator length increases. However, one disadvantage which occurs when using a longer resonator is that slope efficiency is slightly decreased by a longer resonator, for example, by about 10%, since longer resonators are more sensitive to spherical aberration.

In accordance with the present invention, a preferred embodiment of the laser resonator comprises the two mirror flat/flat mirror resonator described above. Further, suppression of radiation at wavelengths other than 1.444 μm is achieved in a preferred embodiment by use of two external 45° HR mirrors (highly reflecting substantially at 1.444 μm) as described in a patent application entitled "Dual Laser Resonator and Beam Combiner" Ser. No. 07/973,160 filed Nov. 6, 1992, and assigned to the assignee of the present application. This was discovered when a laser was fabricated wherein reflectivities R of the mirrors were below 5% for 1.064 μm and less than 50% for 1.32 μm. Although it was expected that wavelengths other than 1.444 μm would not be able to oscillate, radiation at 1.064 μm was detected and, at high Nd concentrations, radiation at 1.32 μm was detected. In fact, it was discovered that, typically, 10% of the total output power occurred at these spurious wavelengths. An analysis of the corresponding mode structure showed it to be an annular ring, indicating that the other wavelengths only made use of an inversion in the outer area of the rod. As a result, it was determined that it is not possible to transfer power emitted in other wavelengths to power at 1.444 μm power by choosing mirrors having a lower reflectivity at these wavelengths or by using three or four mirror resonators (one or two internal 45° HR mirrors). An analysis showed that, although the spurious wavelengths are suppressed thereby, output power in the 1.444 μm line is not increased. The reason for this is that the 1.444 μm line does not oscillate near the rim of the rod due to spherical aberration of a thermally induced lens. As a result, such spherical aberration causes the mode structure to have a decreased beam diameter inside the active medium. The inversion left in these areas can now be used by other wavelengths. Thus, no matter how low the reflectivities are chosen for the other wavelengths, the 1.444 μm line will never have access to these areas of the rod. Hence, in accordance with the present invention, a simple two mirror resonator in combination with two external 45° HR mirrors is the preferred embodiment for a 1.444 μm resonator.

Figure 15:
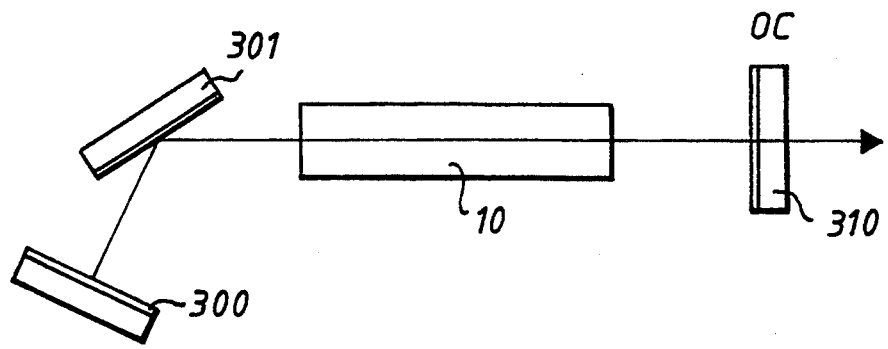
FIGS. 15, 16, and 17 show, in pictorial form, multiple mirror laser resonator configurations for use in helping to suppress lasing at wavelengths other than substantially at 1.444 μm.
Figure 16:
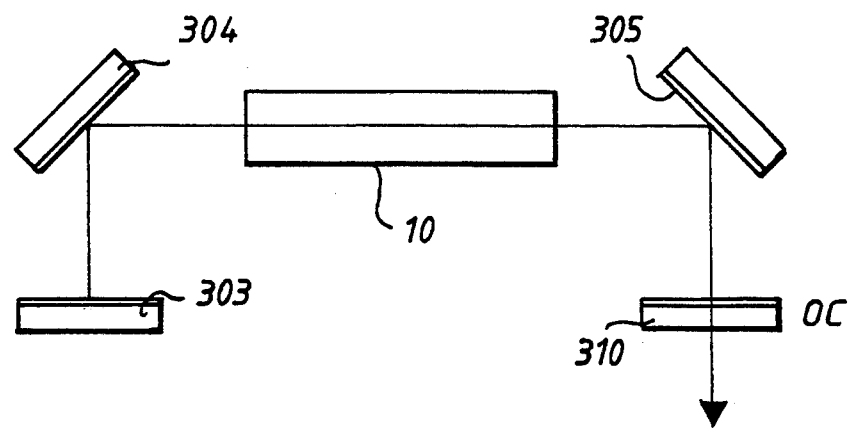
Figure 17:
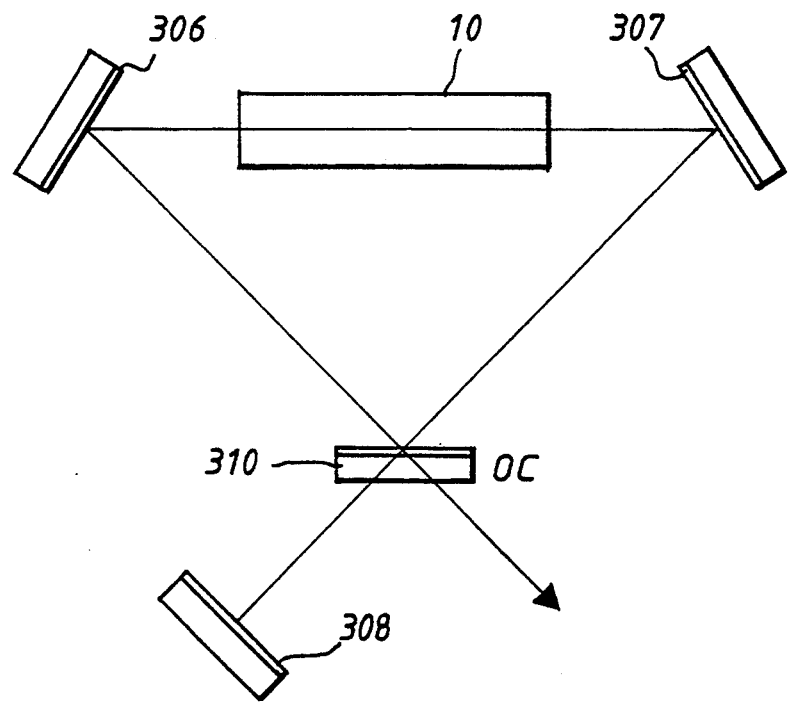

However, FIGS. 15–17 show, in pictorial form, multiple mirror laser resonator configurations for use in helping to suppress lasing at wavelengths other than substantially at 1.444 μm. As shown in FIGS. 15–17, mirrors 300–301, 303–305, and 306–308 are highly reflective (HR) substantially at 1.444 μm and are highly transmissive (HT) at other wavelengths such as, for example, at 1.064 μm and 1.32 μm. The manner in which such mirrors may be fabricated are well known to those of ordinary skill in the art and the manner in which they operate to exclude radiation at, for example, 1.064 μm and 1.32 μm should be readily appreciated by those of ordinary skill in the art. Output coupler mirror 310 shown in FIGS. 15–17 is fabricated in accordance with the teachings described above.

Figure 18:
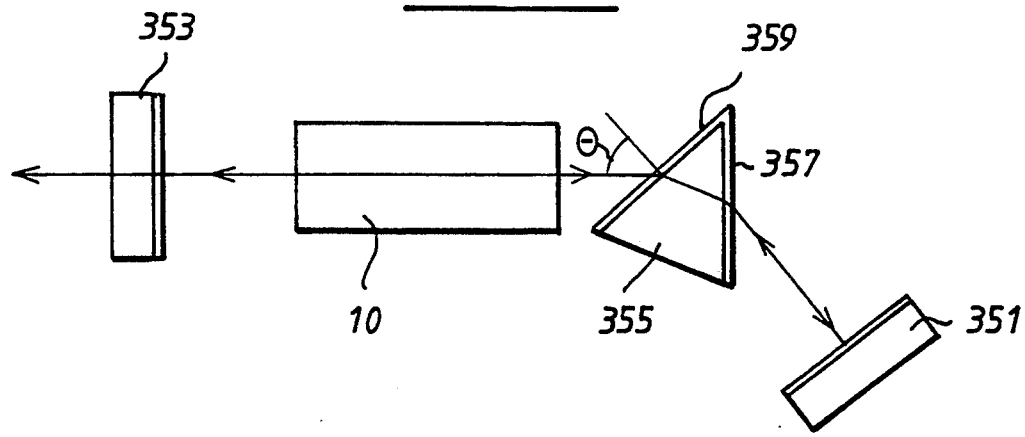
FIG. 18 shows, in pictorial form, a laser cavity in which a prism is disposed to help provide wavelength selectivity.

FIG. 18 shows, in pictorial form, a laser cavity in which laser rod 10 is disposed. The laser cavity comprises mirror 351 which is a HR reflector substantially at 1.444 μm and is a HT reflector substantially at 1.064 μm and substantially at 1.32 μm, output coupler mirror 353 which is fabricated in accordance with the teaching described above, and prism 355. Prism 355 is fabricated from quartz, glass or $SF_6$ and so forth and is coated with layers 357 and 359. Layers 357 and 359 are fabricated in a manner which is well known to those of ordinary skill in the art to be anti-reflecting in a relatively broad band substantially at 1.444 μm and at the angle theta. As such, prism 355 prevents radiation at wavelengths other than in the broad band to resonate and, as a result, serves to suppress the other wavelengths.

Figure 19:
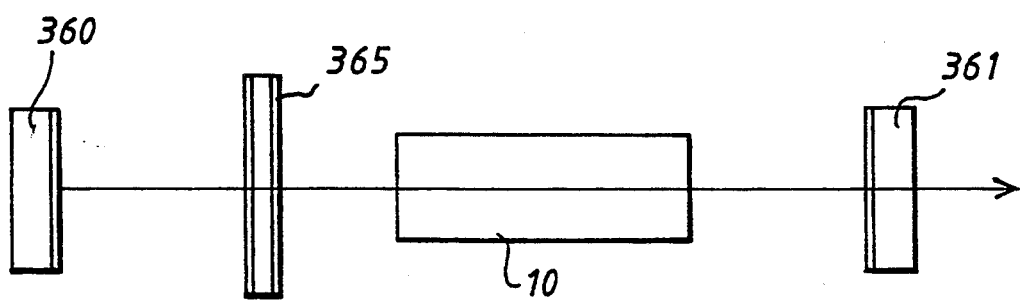
FIG. 19 shows, in pictorial form, a laser cavity in which an etalon is disposed to help provide wavelength selectivity.

FIG. 19 shows, in pictorial form, a laser cavity in which laser rod 10 is disposed. The laser cavity comprises mirror 360 which is a HR reflector substantially at 1.444 μm and is a HT reflector substantially at 1.064 μm and substantially at 1.32 μm, output coupler mirror 361 which is fabricated in accordance with the teaching described above, and etalon 365. Etalon 365 is fabricated in a manner which is well known to those of ordinary skill in the art and, its insertion in the laser cavity suppresses radiation at wavelengths other than radiation substantially at 1.444 μm. As is well known, an etalon is comprised of two plane-parallel, dielectrically coated surfaces between which multiple reflection occurs. The transmission of an etalon is a function of width and wavelength and maximum transmission occurs when path length differences between transmitted beams are multiple numbers of the wavelength.

Figure 20A:
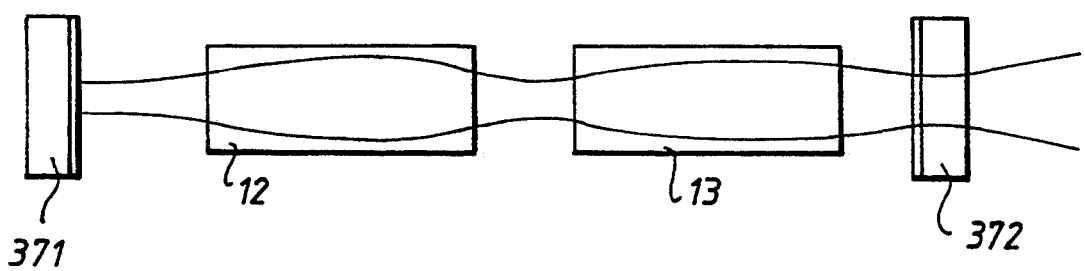
FIGS. 20a and 20b show, in pictorial form, various arrangements for utilizing double rods in a lens guide configuration.
Figure 20B:
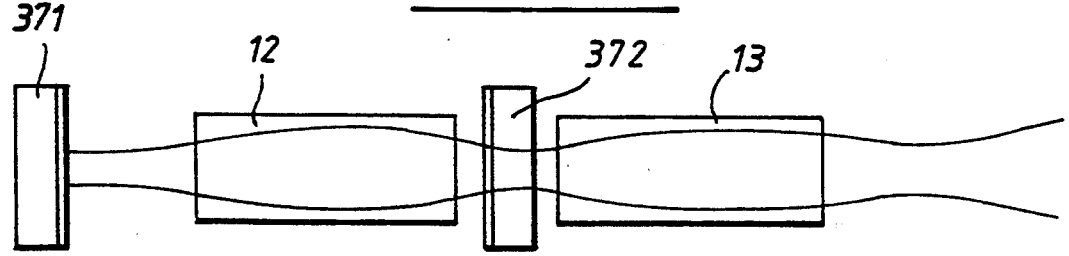

In accordance with the present invention, a dual rod design is advantageous because one can double output power while maintaining beam quality, or one can improve beam quality at the same output power. FIG. 20 shows, in pictorial form, various arrangements for utilizing double rods in a lens guide configuration. For the configurations shown in FIG. 20, the beam quality parameter product remains the same if additional rods are arranged in a lens guide like manner. As shown in FIG. 20(a) Nd:YAG rods 12 and 13 are disposed in a lens guide configuration inside a laser resonator formed by mirror 371 (HR substantially at 1.444 μm and HT substantially at 1.064 μm and 1.32 μm) and output coupler mirror 372 which is fabricated in accordance with the teaching described above. As shown in FIG. 20(b), rod 13 is located outside the laser resonator where it acts as an amplifier. This configuration of FIG. 20(b) provides for periodical extension of an intracavity beam, which means that the beam quality parameter product remains the same, but the output power is doubled. For a 1.444 μm laser, the oscillator-amplifier configuration of FIG. 20(b) is less optimal because the saturation intensity is higher than the intensity of the incident laser beam, and the energy extraction of the amplifier is not large. Further, amplifier gain for the 1.064 μm line is so high that most of the stored energy will be depleted by laser oscillation at 1.064 μm between rod endfaces or by amplified spontaneous emission (ASE). As a result, a preferred embodiment comprises a dual, intracavity rod system shown in FIG. 20(a).

Figure 21:
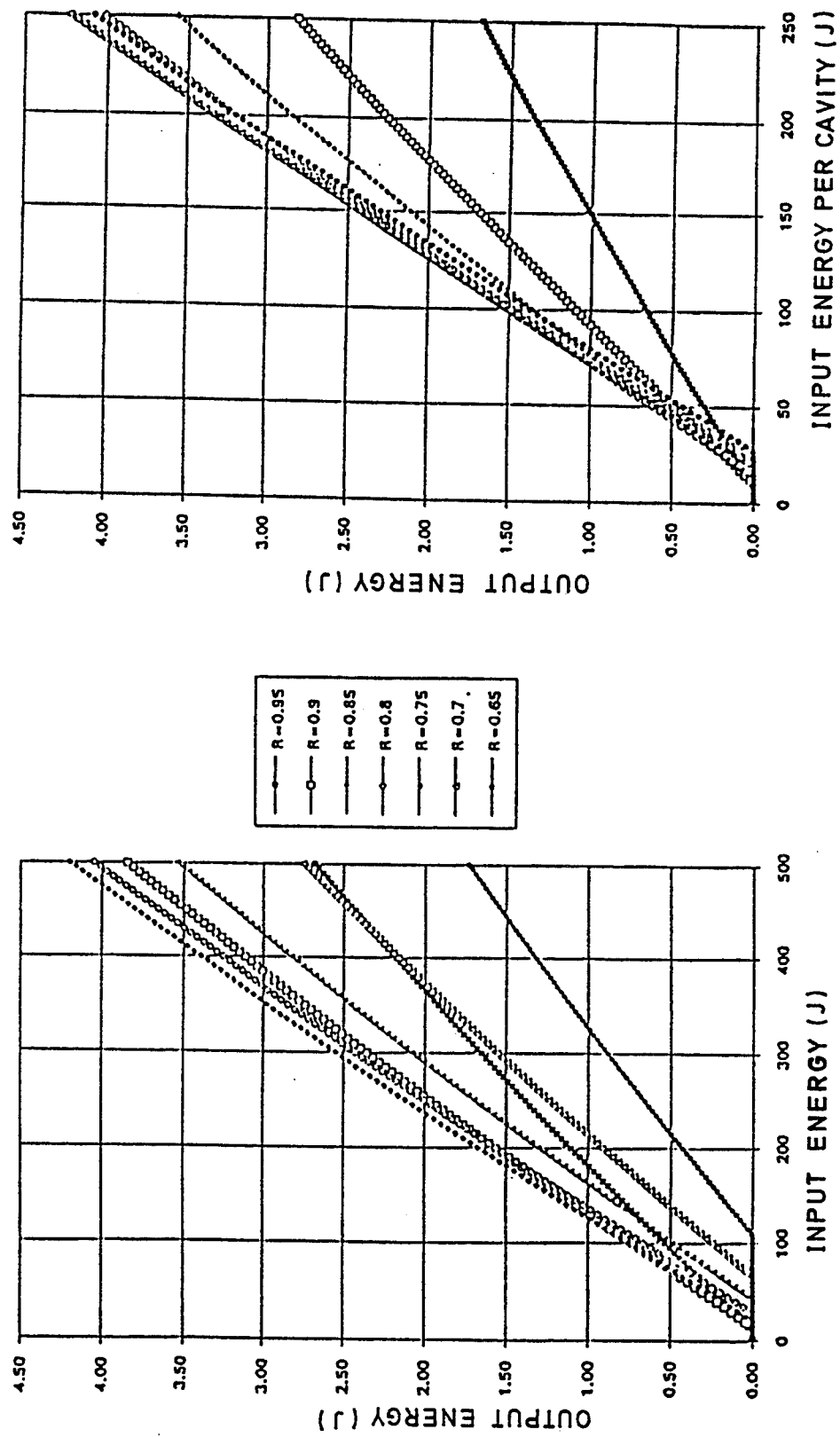
FIG. 21 shows, in graphical form, calculated output energy per pulse obtained using eqn. 1 as a function of input energy per rod for a single rod and a dual rod system, plotted as a function of mirror reflectivity R ($\eta_o=0.044$, $V_s=0.92$ per rod, rod diameter rd=6.35 mm, and rod length l=100 mm)

No difference would be observed as far as output energy per pulse is concerned if one uses two rods pumped at half the input power, for example, 3.75 kW, instead of one rod pumped at full power of 7.5 kW. This is shown by FIG. 21 which displays, in graphical form, calculated output energy per pulse obtained using eqn. 1 as a function of input energy per rod for a single rod and a dual rod system, plotted as a function of mirror reflectivity R ($\eta_o$=0.044, $V_s$=0.92 per rod, rod diameter rd=6.35 mm, and rod length l=100 mm). The optimum mirror reflectivity is now higher, since the active volume is doubled (threshold inversion density is halved) and, as a result, the influence of concentration quenching is less pronounced. Compared to a single rod resonator, the two rod system (now with a doubled resonator length of 80 cm) shows a 20% lower maximum beam quality parameter product. In order to get a still greater improvement one can choose a longer resonator, however, note that a single rod system of equal resonator length would provide the same output power and a better beam quality. Yet, if one wants to increase output power, the dual rod system is the better design choice. For example, with two rods in a 1 m long, symmetric, flat-flat resonator, each rod being pumped at 7.5 kW, one could obtain output powers in excess of 120 W with beam parameter products (radius×half angle of divergence) below 16 mm mrad.

Tube Geometry

Figure 22:
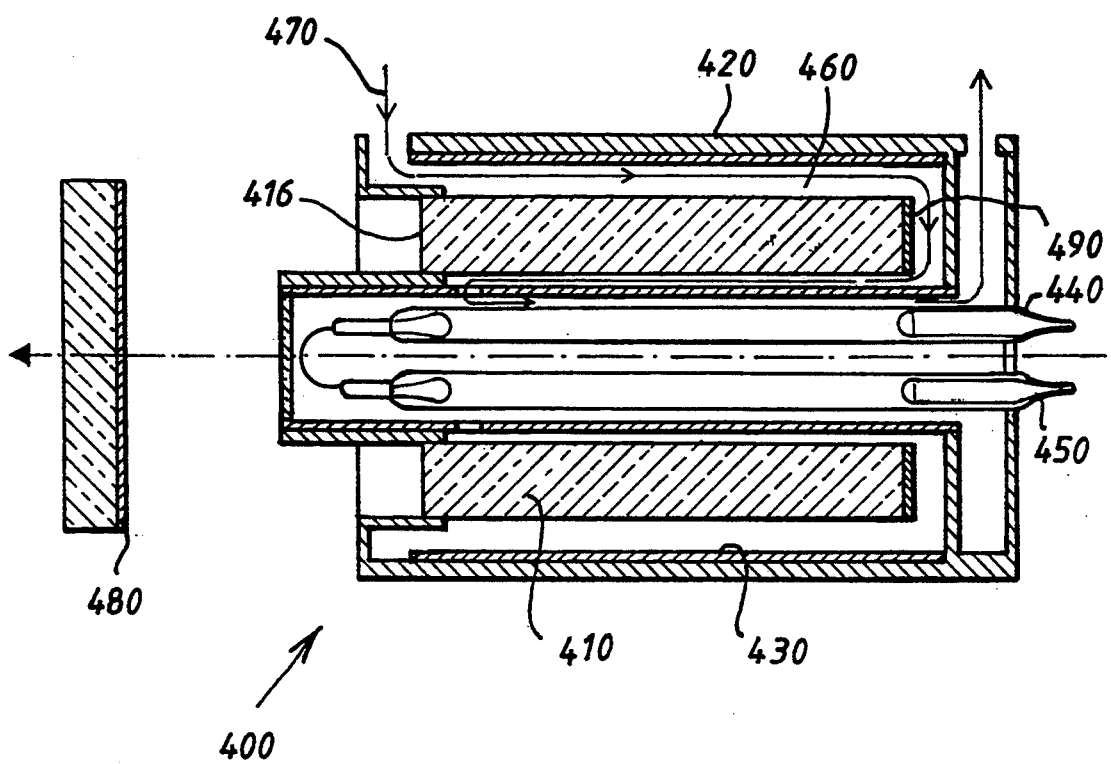
FIG. 22 shows, in pictorial form, a laser wherein an active material is formed in a tube geometry.

FIG. 22 shows, in pictorial form, laser 400 comprised of active material 410 formed in a tube geometry, i.e., tube 410. In the preferred embodiment, tube 410 is comprised of Nd:YAG. The interior of housing 420 is coated with reflector 430. Reflector 430 may be fabricated from silver, gold, Spectralon, ceramics and so forth. As shown in FIG. 22, flashlamps 440 and 450 are disposed inside tube 410 and are connected in series. Flashtubes 440 and 450 are also disposed inside flowtube 460 and arrow 470 shows the direction of flow of coolant within flowtube 460. Flowtube 460 is fabricated from quartz or glass and the quartz or glass may be undoped or it may be doped with rare earth materials such as, for example, europium, samarium, or cerium. Further, the coolant may be deionized water. A laser resonator for laser 400 is formed by output coupler 480 (output coupler 480 is fabricated in accordance with the teaching set forth above, i.e., it has a reflectivity at 1.444 μm as taught above and is substantially antireflecting substantially at 1.064 μm and 1.32 μm) and dielectric coating 490 which is applied to the surface of an end of tube 410 which is opposite output coupler 480 (dielectric coating 490 is HR substantially at 1.444 μm and is AR substantially at 1.064 μm and 1.32 μm).

The fracture limit of a tube is increased over that of a rod. This means that the average output power can exceed that of a rod of equal length by a factor of 10, depending on tube dimensions. If $d_1$ and $d_2$ denote the inner and outer diameter of a tube, respectively, the ratio of maximum output power $P_{out,max}$ of the tube and rod both having equal length l is given by:

$$P_{out,max}^{tube}/P_{out,max}^{rod} = (\pi/2)(d_2+d_1)/(d_2-d_1) \qquad (7)$$

Thus, for an inner diameter of 20 mm and a wall thickness of 6 mm, the maximum output power of a tube is 4.2 times higher than that of a rod of equal length. Further, for the 1.444 μm line, in particular, this means that repetition rates in excess of 100 Hz with pulse energies of 4 J can be realized.

The tube geometry is further advantageous in that pump light is much better absorbed by the crystal because flashlamps can be placed inside the tube. The efficiency of the pump process is commonly characterized by the excitation efficiency which is defined by the ratio of optical energy stored to electrical input energy. For a Nd:YAG rod operated at 1.444 μm, typical excitation efficiencies at 1.444 μm are between 3% and 4%. By using a tube with a wall thickness of 5 mm or more, these values can be doubled.

Since the cooled surface of the tube is large compared to the volume, heat removal is very efficient in a tube laser. This results in a lower temperature in the material and this, in turn, reduces thermal lensing and spherical aberration. Aberration in pumped Nd:YAG stems from the temperature dependence of the thermal conductivity. The less pronounced temperature profile of the tube geometry will, therefore, result in a better laser performance. The reduction of spherical aberration is important in order to get rid of spurious wavelengths and to have access to the entire active volume for the 1.444 μm line. A decreased refractive power is linked to an improvement of beam quality.

For a comparison of thermal effects in rod and tube geometry at equal length, the following relations hold. For refractive power:

$$D_{tube} = 2 * D_{rod} * d_r^2 / (d_2^2 - d_1^2) \qquad (8)$$

where: dr is the rod diameter, $d_1$ is the inner tube diameter, and $d_2$ is the outer tube diameter. For temperature Difference (center-to-surface):

$$\Delta T_{tube} = 0.5 * \Delta T_{rod}(d_2 - d_1)/(d_2 + d_1) \qquad (9)$$

Thus, a tube with a 20 mm inner diameter and a wall thickness of 6 mm exhibits a 7.5 times lower refractive power and a 9 times lower temperature difference than a ¼ inch diameter rod. In deriving the above equations, equal crystal length and equal heat generation were assumed.

Figure 23:
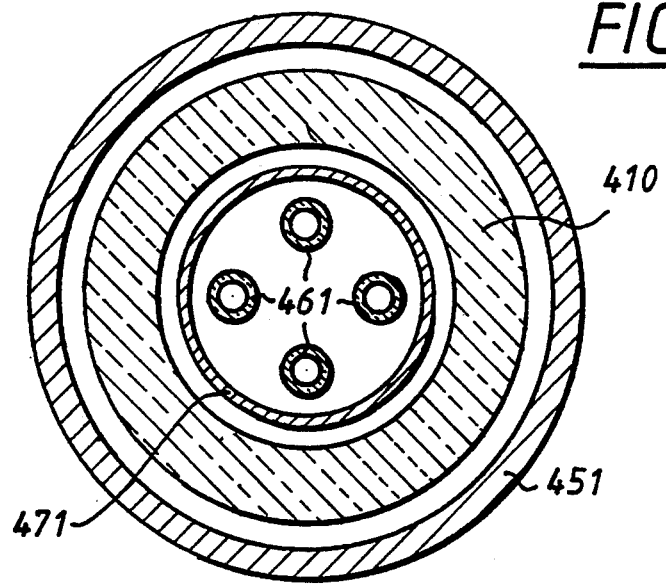
FIG. 23 shows, in pictorial form, a cross section of a tube geometry laser having multiple flashlamp pumping from inside of tube.
Figure 24:
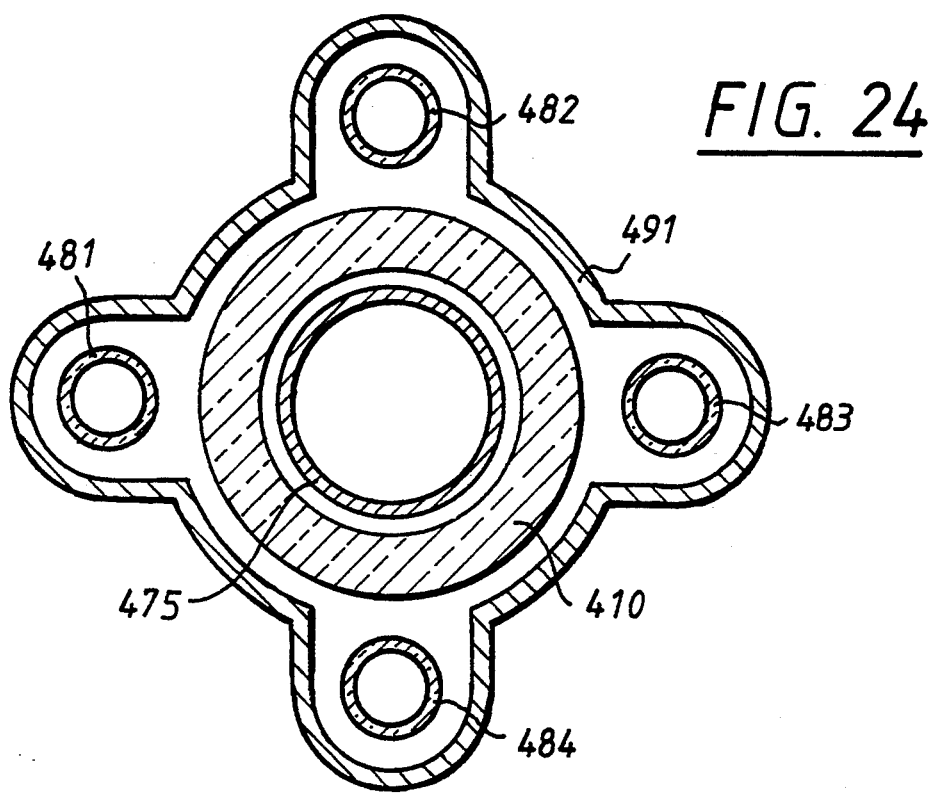
FIG. 24 shows, in pictorial form, a cross section of a tube geometry laser having multiple flashlamp pumping from outside of tube.

FIG. 23 shows, in pictorial form, a cross section of a tube geometry laser having multiple flashlamp pumping from inside the tube and FIG. 24 shows, in pictorial form, a cross section of a tube geometry laser having multiple flashlamp pumping from outside the tube. As shown in FIG. 23, flashlamps 461 are disposed within flowtube 471 and flowtube 471 is disposed inside Nd:YAG tube 410. Flowtube 471 is fabricated from quartz or glass and can be undoped or doped with rare earth materials such as, for example, europium, samarium, or cerium. As further shown in FIG. 23, laser tube 410 is surrounded by reflector 451 which may be a reflective coating as described above for layer 430 of FIG. 22. As shown in FIG. 24, flashlamps 481–484 are disposed outside Nd:YAG tube 410 and flowtube 475 is disposed inside Nd:YAG tube 410. Flowtube 471 is fabricated from quartz or glass and can be undoped or doped with rare earth materials such as, for example, europium, samarium, or cerium. As further shown in FIG. 24, laser tube 410 is surrounded by reflector 491 which may be a reflective coating as described above for layer 430 of FIG. 22. Further, alternative embodiments exist wherein up to 8 flashlamps are disposed outside the tube.

In fabricating lasers using a tube geometry, in accordance with the present invention, inner tube diameter is fabricated in a range from about 5 mm to about 40 mm, wall thickness is fabricated in a range from about 2 mm to about 15 mm, tube length is fabricated in a range from about 50 mm to about 180 mm, Nd concentration in a range from about 0.3 at % to about 1.1 at %, electrical input energy is applied in a range from about 50 J to about 1000 J, pulses of electrical energy are applied having a duration in a range from about 0.2 ms to about 1.5 ms, and the pulse repetition rate is in a range from about 0.1 Hz to about 100 Hz. The mirror reflectivities of the laser cavity are the same for the tube geometry as for the rod. Further, in a preferred embodiment of the present invention, the following coatings are utilized on the tube endfaces: (a) face 417 shown in FIG. 22, HR for 1.444 μm and high transmission for 1.064 μm and 1.32 μm (this endface acts as a high reflecting flat resonator mirror) and (b) face 416 shown in FIG. 22, AR for all three wavelengths (high transmission for 1.064 μm, 1.444 μm, and 1.32 μm).

Slab Laser–Flashlamp Pumped

Figure 25A:
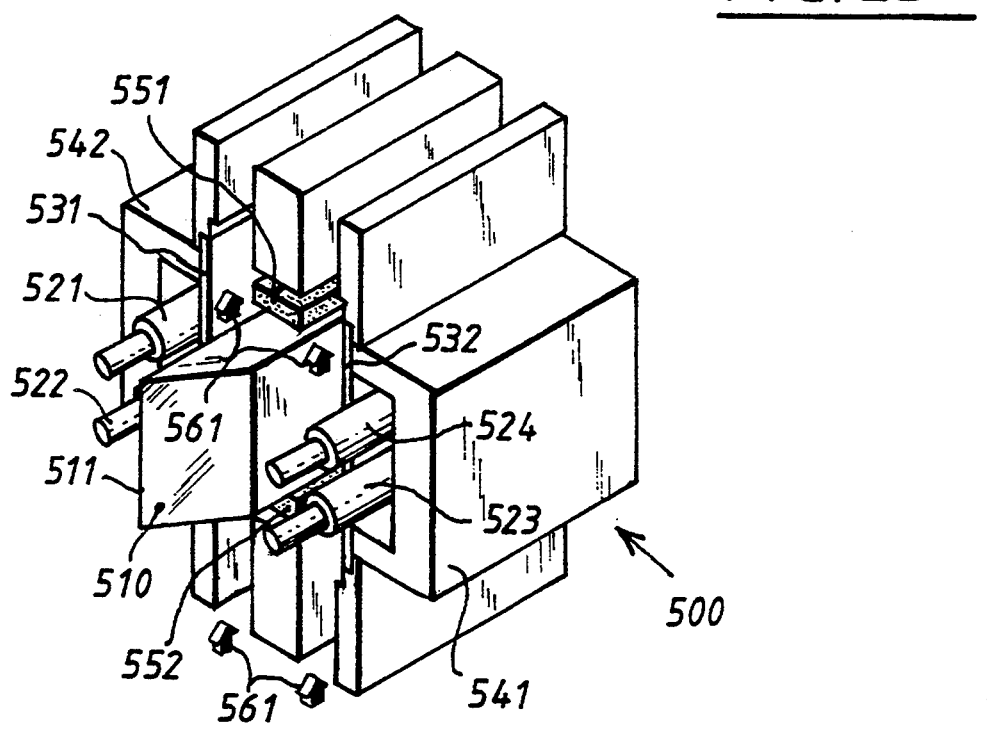
FIGS. 25a and 25b show, in pictorial form, (a) a flashlamp pumped slab laser head, the slab end faces being cut under the Brewster angle and (b) zig-zag beam propagation in a slab.
Figure 25B:
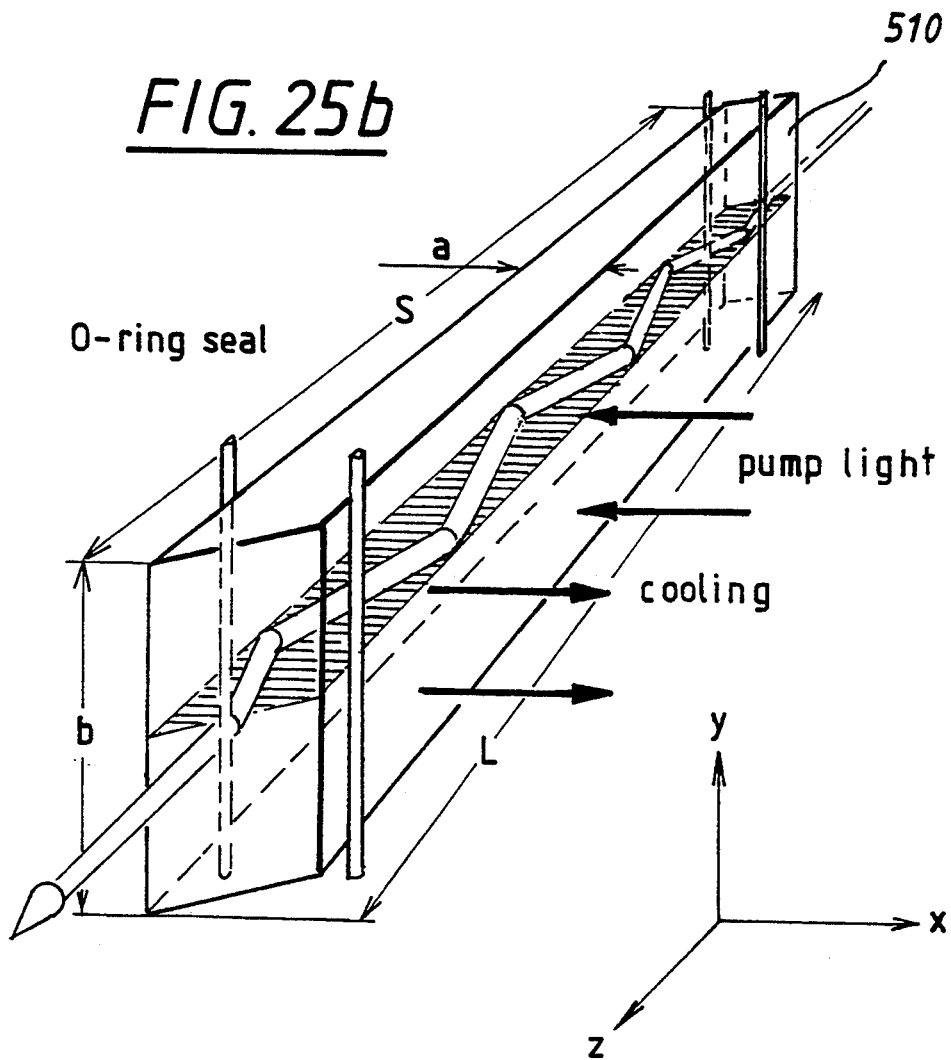

FIG. 25 shows, in pictorial form, (a) a flashlamp pumped, slab laser head 510, slab end face 511 being cut at a Brewster angle and (b) zig-zag beam propagation in a slab of active laser material 510. As shown in FIG. 25(a), slab 510 is pumped from the side by flashlamps 521–522 through quartz or glass window 531 (doped or undoped as described above) and by flashlamps 523—524 through quartz or glass window 532 (doped or undoped as described above). Flashlamps 521–522 are disposed within reflector 542 and flashlamps 523–524 are disposed within 541 (reflectors 541 and 542 being reflective layers as was discussed above). The top and bottom surfaces of slab 510 are thermally insulated by insulators 551 and 552, respectively. Finally, arrows 561 show the direction of coolant flow in laser head 500.

A slab geometry provides several advantages in comparison to a rod geometry. First, as is well known, thermal lensing is at least a factor of 20 lower in a slab compared with that in a rod. This occurs when a zig-zag beam is propagated in the x-direction in combination with thermal insulation in the y-direction, see FIG. 25(a). For an infinite slab, no thermal effects should be observable at all. Unfortunately, a finite slab exhibits stress bending of the side and endfaces and this generates a negative refractive power in the y-direction and a small positive one in the perpendicular direction. Second, a consequence of low thermal effects is a considerable improvement in beam quality. With a common stable resonator it is possible to get beam parameter products, i.e., radius x half angle of divergence, below 5 mm mrad, even in high power operation with output power in excess of 400 W. Beam quality parameter products below 2 mm mrad have been reported in the art for a Nd:YAG slab with 850 W average output power with the use of an unstable resonator. Third, a further advantage of the slab is the high fracture limit which scales with the ratio of height to twice the width. Thus, a slab twice as high as thick has the same fracture limit as a rod. Since it is common to use Nd:YAG slabs which are four times higher than they are wide, this means that twice the output power can be extracted from a slab as compared with a rod of the same length. Fourth, for the 1.444 μm line, in particular, a further advantage of the slab is the fact that the beam always covers all areas of the crystal. Although beam diameter reduction due to spherical aberration might be present, the active volume filled by the mode remains constant. This means that all of the population inversion is used by the 1.444 μm line and no other wavelengths will be observed. As a result, the total efficiency will be increased by the 10-15% which is the fractional power belonging to other wavelengths when a rod is used. Fifth, the slab geometry is especially suitable for diode pumping, since two dimensional diode arrays can be placed close to the large side faces of a slab. If high pump power is required, and this is definitely the case for a 1.444 μm laser, the rod geometry is not as useful for diode pumping.

Figure 26:
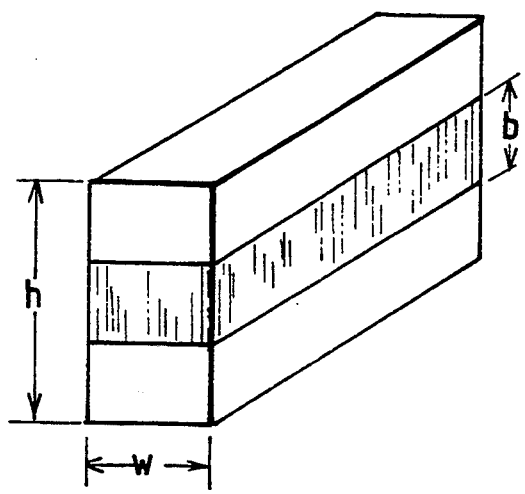
FIG. 26 shows, in pictorial form, the pumped area of a Nd:YAG slab crystal.

The following describes a calculation of the required input energy for a slab laser. Consider a slab of width w and height h which is pumped through one or both sidefaces. The pumped volume has a height b, which means that the cross sectional area is given by F=b*w, see FIG. 26 which shows, in pictorial form, the pumped area of a Nd:YAG slab crystal. Eqn. 5 is utilized (with rd replaced by w) to calculate the optical energy necessary for a 1.1 at % doped Nd:YAG slab and the ratio $\eta_{o11}/\eta_o$ is given by eqn. 4. FIGS. 27–29 show the minimum optical energy required to obtain an output energy of 2 J from a 100 mm long slab as a function of Nd concentration with slab width as parameter. For these graphs the mirror reflectivity R was varied. The optimum mirror reflectivities related to the minimum optical energies are shown in figures discussed below. Since the same formula was used for the rod, similar results are obtained. Note that slab performance is fairly insensitive to changes in Nd concentration and pumped area F. Since one is interested in a squared output beam, i.e., substantially the same beam quality in the x-direction and y-direction, pumped height b and width w were chosen to be equal. A reasonable choice is b=w=6-7 mm and a Nd concentration of 0.8 at %. For a 7 mm thick Nd:YAG slab, it is possible to obtain an excitation efficiency $\eta_{o11}$ of 6.5% and more, which means that for an output energy of 2 J about 200 J of electrical input energy is necessary. In order to get at least the same fracture limit as for a rod, the height h of the slab should be 12–15 mm. Again, eqn. 2 and 3 can be used to determine the excitation efficiency as a function of slab width (w=rd) and Nd concentration $C_o$. For a slab laser head, the transfer efficiency can be set to one since all rays leaving the lamp are captured by the active material.

Figure 30A:
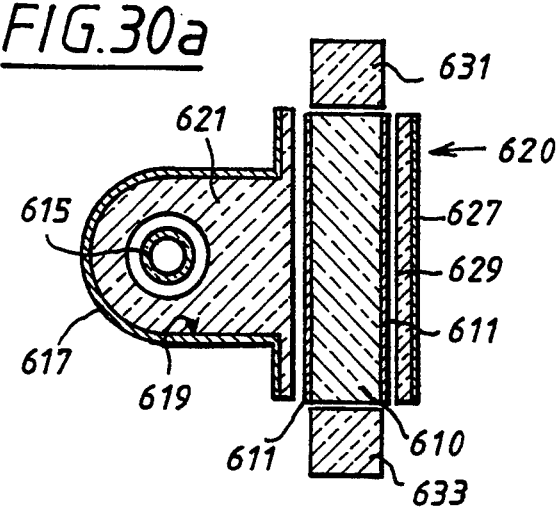
FIGS. 30a, 30b, and 30c show, in pictorial form various designs of a flashlamp pumped slab laser head.

Attention is now turned to the design of the laser head. Similar to a rod, the highest excitation efficiency is achieved if only one flashlamp is used. Thus, a preferred design is a single elliptical quartz cavity which images a flashlamp into the slab center, see FIG. 30 which shows, in pictorial form various designs of a flashlamp pumped slab laser head. As shown in FIG. 30, since it is necessary to optically isolate gaskets from an intracavity beam, the side faces of laser slab 610 are coated with a 2 μm thick quartz layer which acts as an antireflection (AR) coating at about 808 nm. As shown in FIG. 30(a), flashlamp 615 is disposed within housing 617 and the interior of housing 617 is coating with reflective layer 619, reflective layer 619 comprising a layer of materials such as, for example, silver, gold, or BaSO4. Flashlamp 615 is surrounded by material 621 where material 621 is quartz or glass (undoped or doped with rare earth material such as, for example, europium, samarium, or cerium). Further, on the opposite side of slab 610 from flashlamp 610 is relatively flat housing 620 whose interior surface is coated with reflective layer 627 which is fabricated, for example, from silver, gold, or BaSO4. Lastly, quartz of glass window 629 is disposed adjacent reflective layer 627. As a result of this structure, pumplight emitted by flashlamp 615 which passes through slab 610 will be reflected back by, for example, a silver coated glass window. Further, cooling water flows longitudinally or transversely through gaps of size 1 mm to 1.5 mm in width which are formed by one side face and the window on one side of slab 610 and by housing 617 and the side face on the other side of slab 610. In order to minimize thermal effects due to stress bulging, it is important that the upper and lower parts of the slab remain unpumped. Additionally, thermal insulation 631 and 633 must be applied to the slab as shown in FIG. 30.

Figure 30B:
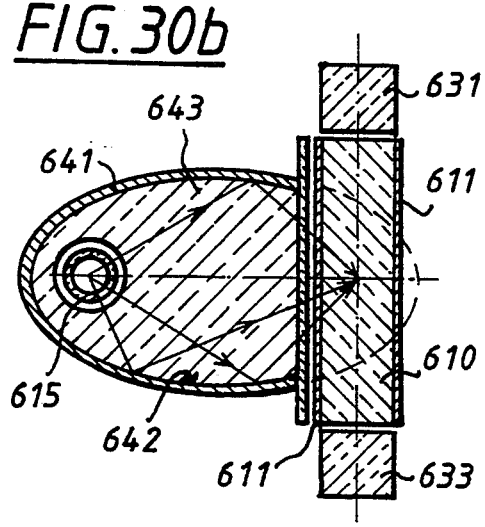
Figure 30C:
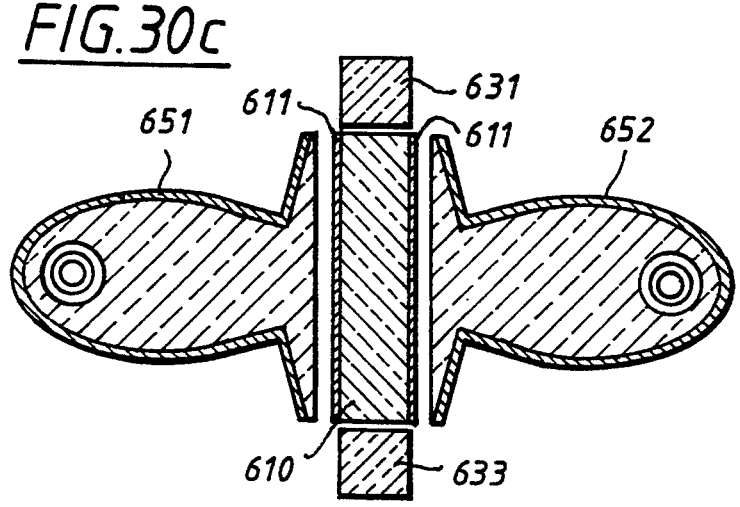
Figure 31A:
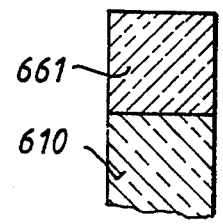
FIGS. 31a, 31b, 31c, and 31d show, in pictorial form, various embodiments of thermal insulation for use with a slab laser.
Figure 31B:
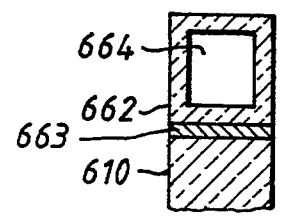
Figure 31C:
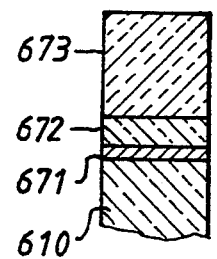
Figure 31D:
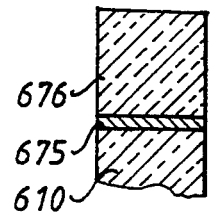

As shown in FIG. 30(b), flashlamp 615 is disposed within housing 641. Housing 641 has an ellipsoidal cross section and the interior of housing 617 is coated with reflective layer 642 (reflective layer 619 comprising a layer of materials such as, for example, silver, gold, or BaSO4). Flashlamp 641 is disposed substantially at one focus of the ellipsoidal cross section of housing 641 and the center of slab 610 is substantially at the other focus of the ellipsoidal cross section of housing 641. The interior of housing 641 is substantially filled with material 643, material 643 being undoped or doped with rare earth material such as, for example, europium, samarium, or cerium. Lastly, as shown in FIG. 30(c), the pumping configuration comprises two ellipsoidal cavities which are fabricated in the same manner and which are disposed in the same manner as was housing 641 and flashlamp 615 shown in FIG. 30(b).

FIG. 31 shows, in pictorial form, various embodiments of thermal insulation 631 and 632 shown in FIG. 30. As shown in FIG. 31(a), insulation 661 is a silicone rubber like Sylgard 186, plastic, ceramic, glass, or metal. As shown in FIG. 31(b), strip 663 is a gold or silver layer, insulation 662 is a metal or ceramic, and channel 664 is a cooling channel through which a coolant such, for example, deionized water is pumped. As shown in FIG. 31(c), strip 671 is a gold or silver layer, layer 672 is glass or quartz, and layer 673 is a layer of Sylgard, plastic, or rubber. Lastly, as shown in FIG. 31(d), layer 675 is a metal foil and layer 676 is a layer of Sylgard, plastic, or rubber. Metal coated thermal insulators are advantageous because pump light is reflected.

Figure 32A:
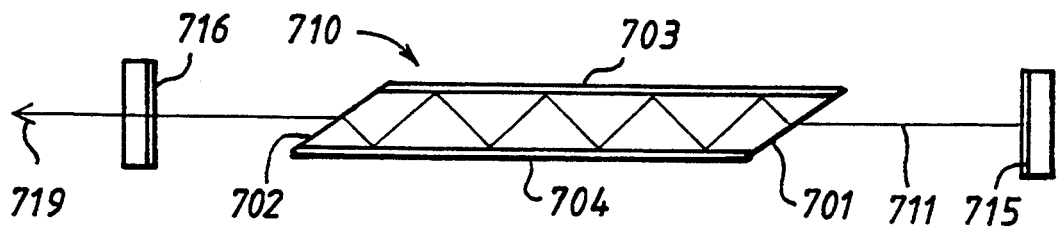
FIGS. 32a, 32b, and 32c show, in pictorial form, beam propagation in slab lasers in various designs: (a) a two mirror design wherein the slab has Brewster endfaces, (b) a three mirror design with flat endfaces, one of which is HR-coated at 1.444 μm, and (c) a design utilizing two AR coated endfaces and an HR mirror at the other end of the slab.

There are several ways to propagate a beam through a slab which differ as a result of the angle at which the slab endfaces are cut. It is common to use the Brewster angle of 61°, see FIG. 32(a) which shows beam propagation in a slab laser in a two mirror design wherein slab 710 has Brewster endfaces 701 and 702. Coatings 703 and 704 are applied to the sidefaces of slab 710 and coatings 703 and 704 are fabricated from, for example, quartz so as to maintain total internal reflection for beam 711. Mirrors 715 and 716 are designed in accordance with the teaching set forth above wherein mirror 715 is HR substantially at 1.444 μm and HT substantially at 1.064 μm and substantially at 1.32 μm. Further, mirror 716 is HT substantially at 1.064 μm and substantially at 1.32 μm and has the above-described reflectivity substantially at 1.444 μm. For the embodiment shown in FIG. 32(a), no AR-coating is necessary and output beam 719 is linearly polarized since the p-polarization experiences no reflection losses. However, cooling an entire slab from tip to tip is a problem as far as sealing is concerned. If the tips are not cooled (in this case sealing of the slab is straightforward, see FIG. 25), additional losses due to stress induced birefringence occur at higher pump power which limit the efficiency.

Figure 32B:
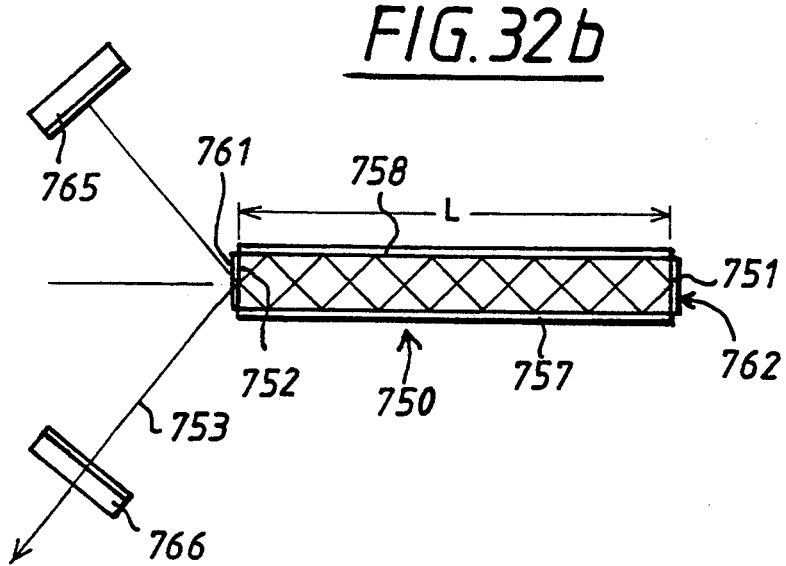

FIG. 32(b) shows a preferred embodiment of the present invention, and entails use of slab 750 having flat endfaces 751 and 752 and choosing an appropriate angle of incidence (α) for beam 753. As shown in FIG. 32(b), coatings 757 and 758 are applied to the sidefaces of slab 750 and coatings 757 and 758 are fabricated from, for example, quartz so as to maintain total internal reflection for beam 753. The laser resonator for the embodiment shown in FIG. 32(b) comprises mirror 765 (mirror 765 is HR substantially at 1.444 μm and HT substantially at 1.064 μm and substantially at 1.32 μm), coating 762 on endface 751 of slab 750 (coating 762 is HR substantially at 1.444 μm and HT substantially at 1.064 μm and substantially at 1.32 μm), and output coupler 766 (output coupler 766 is HT substantially at 1.064 μm and substantially at 1.32 μm and has the above-described reflectivity substantially at 1.444 μm). Front endface 752 of slab 750 is AR-coated at 1.444 μm and has a low reflectivity at 1.064 μm and 1.320 μm. This embodiment is advantageous in that, even if spurious wavelengths were possible, they would be completely suppressed by the three mirror design.

The calculation of the angle of incidence ($\alpha$) shown in FIG. 32(b) is straight-forward once slab length L, width w, and the number m of "diamonds" formed by the beam are fixed:

$$\sin\alpha = n \frac{[2mw/L]^2}{1 + [2mw/L]^2} \tag{10}$$

where n is the refractive index of Nd:YAG at 1.444 μm, 1.82. Table 1 shows calculated angles of incidence $\alpha$ for various slab dimensions and number of diamonds.

TABLE 1

| length L [mm] | width w [mm] | diamond no. m | angle $\alpha$ [degs] |
|---|---|---|---|
| 100 | 5 | 6 | 15.34 |
| 100 | 5 | 10 | 30.00 |
| 100 | 7 | 6 | 24.45 |
| 100 | 7 | 10 | 41.46 |
| 150 | 5 | 6 | 7.93 |
| 150 | 5 | 10 | 17.92 |
| 150 | 7 | 6 | 13.81 |
| 150 | 7 | 10 | 27.76 |

Figure 32C:
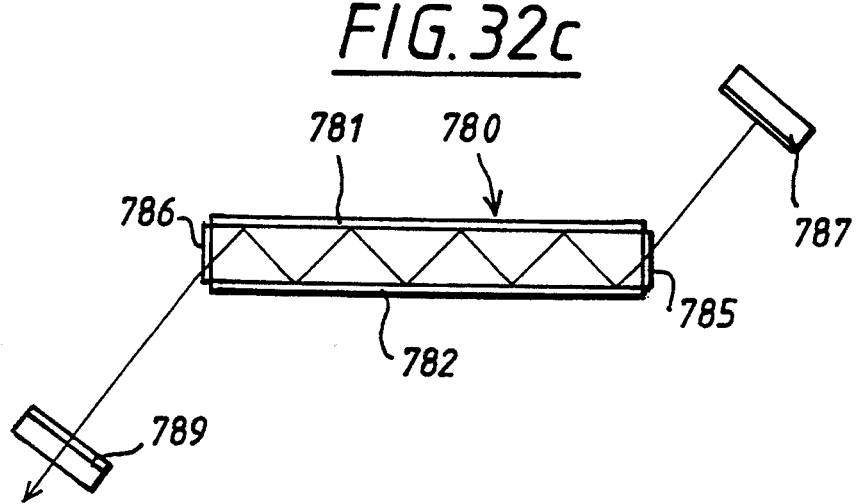

FIG. 32(c) shows an alternate embodiment of the slab laser wherein slab 780 has flat endfaces. As shown in FIG. 32(c), coatings 781 and 782 are the same as coatings 757 and 758 shown in FIG. 32(b) and resonator mirrors 787 and 789 are the same as resonator mirrors 715 and 719 shown in FIG. 32(a). Lastly, the endfaces of slab 780 are coated with layers 785 and 786 which are AR substantially at 1.444 μm and are HT substantially at 1.064 μm and substantially at 1.32 μm.

Slab Laser-Diode Laser Pumped

Figure 33:
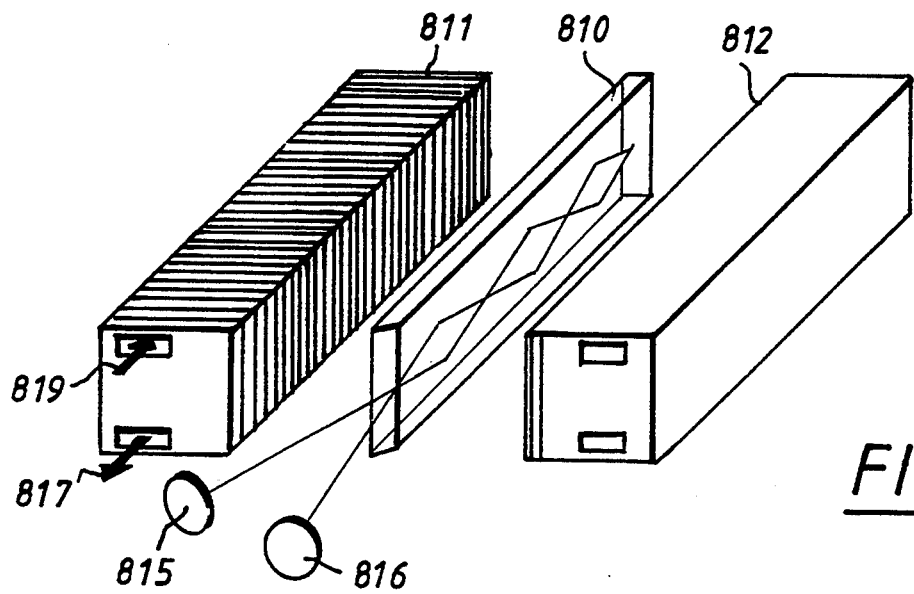
FIG. 33 shows, in pictorial form, a slab crystal pumped by two two-dimensional diode arrays in a prior art configuration.

By using diode arrays emitting substantially at 808 nm, instead of flashlamps, overall efficiency for a neodymium laser at 1.444 μm can be increased by a factor of 5. In accordance with the present invention, a preferred pumping scheme for a slab is transverse excitation through the large side faces by two-dimensional diode arrays 811 and 812 as shown in the prior art configuration of FIG. 33 (see the above-identified article entitled "High Average Power Diode Pumped Slab Laser"). As shown in FIG. 33, slab 810 is pumped by diode arrays 811 and 812 and a laser resonator is formed by mirrors 815 and 816 and a coating on the back surface of slab 810, all as previously described above with reference to FIG. 32(b). Lastly, cooling for diode array 811 is provided by passing coolant in through channel 819 and out through channel 817. Diode array 812 is similarly cooled. In accordance with the present invention, arrays 811 and 812 are driven in pulsed operation with pulse durations of 200-300 μsec, peak powers of 2-3 kW/cm², and duty cycles up to 2% (higher duty cycles up to 40% are possible by utilizing micro-channel cooling of the diodes).

The following calculates diode performance required to build a diode-pumped 1.444 μm laser with output energies in excess of 2 J.

For the case of diode pumping, the excitation efficiency can be directly calculated through the 808 nm absorption coefficient. The absorption of 808 nm radiation in a Nd:YAG crystal is fairly strong, resulting in a penetration depth of 2.3 mm for a 1.1 at % doped crystal. If w is the slab width in mm and $C_o$ is the Nd concentration in at %, the absorbed power fraction after one transit is given by:

$$P_{abs}/P_o = 1 - exp[-0.4 * C_o * w] \tag{11}$$

where $P_o$ is the incident power and $P_{abs}$ is the absorbed power.

If one assumes that the slab is pumped from one side only and that the transmitted light is reflected back by a HR coating on the other side of the slab, the absorbed power fraction is given by:

$$P_{abs}/P_o = 1 - exp[-0.8 * C_o * w] \tag{12}$$

Owing to the quantum defect, only 56% of the absorbed energy is available for the 1.444 μm line. By using eqn. 1 again, and taking the absorption of 808 nm radiation into account according to eqn. 12, the required pump energy $E_{pump}$ is given by:

$$E_{pump} = \frac{P_o}{P_{abs}} \frac{1.787}{1 - \frac{|\ln(\sqrt{R}\ V_s)|}{\sigma \ln_s}} \left[ \frac{1 - R + \sqrt{R}\left(\frac{1}{V_s} - V_s\right)}{1 - R} E_{out} + F I_s \Delta t |\ln(\sqrt{R}\ V_s)| \right]$$

where $P_o/P_{abs}$ is given by eqn. 12.

Figure 34:
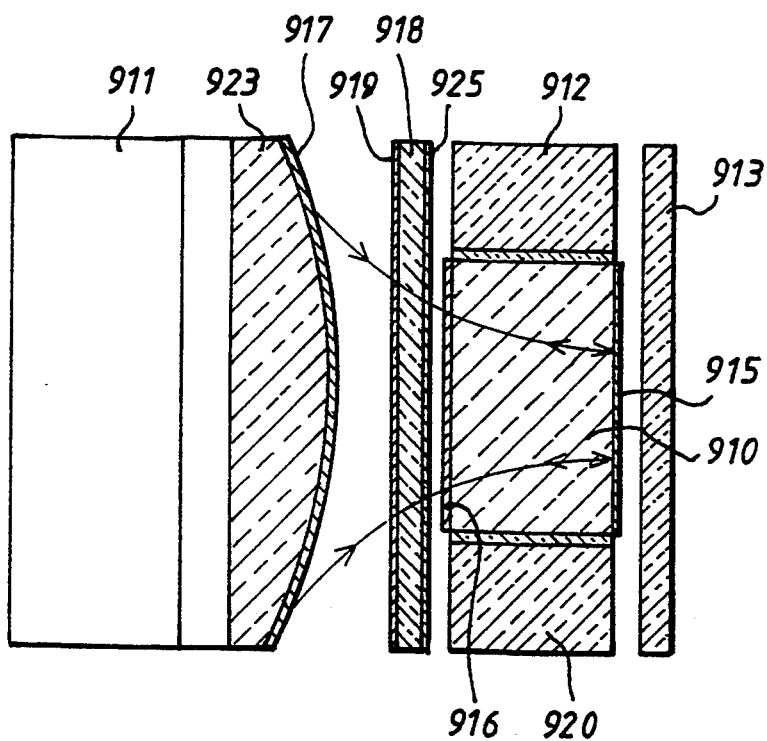
FIG. 34 shows, in pictorial form, a Nd:YAG slab pumped from one side by a 60 kW diode array having a pulse duration of 250 μsec, the output energy of the slab being 2 J at 1.444 μm.

FIG. 34 shows, in pictorial form, Nd:YAG slab 910 pumped from one side by a 60 kW diode array 911 having a pulse duration of 250 μsec, the output energy of the slab being 2 J at 1.444 μm. As shown in FIG. 34, the pump radiation output by diode array 911 is focussed to a line by cylindrical lens 923. Cylindrical lens 923 is coated with 808 nm, AR coating 917 and glass window 918 is coated with 808 nm, AR coatings 919 and 925. Quartz window 916 at the front side of slab 910 is AR coated at 808 nm and the back side of slab 910 is HR coated at 808 nm. Lastly, structure 913 is a glass window and thermal insulation 912 and 920 have been described above.

FIGS. 35-36 show, in graphical form, the pump energy $E_{pump}$ at 808 nm and mirror reflectivity required to obtain 2 J output energy at 1.444 μm as a function of Nd concentration plotted as a function of slab width. A pulse duration of 250 μsec was used for this calculation. The results indicate that a diode array capable of 60 kW of peak power and pump energies of 15 J is required and the cross sectional area of such an array would be 30 cm². This means that a 20 mm high × 150 mm long diode array is needed to pump a 150 mm long slab. Since the pumped height of the slab is less than 20 mm, the pump light must be focussed to a line by means of a cylindrical lens as shown in FIG. 34.

In general, a two-dimensional (2D) diode array comprises 50-100 bars, each bar being 10 mm long and 0.1 mm thick, see FIG. 32. The bars are sandwiched in a jig between heat sink material comprised of, for example, a 0.1 mm thick tungsten/copper composite. Bars and heat sink are then soldered together in one step to form an 2D array of length 10 mm and height 10-20 mm. Such a segment provides a peak power of 2-4 kW. One can package 15 of these segments in a row, to obtain the required peak power of 60 kW.

Those skilled in the art recognize that further embodiments of the present invention may be made without departing from its teachings.

Appendix 1

As is well known to those of ordinary skill in the art, laser transitions observable for $Nd^{3+}$ ions in Nd:YAG share the same upper laser level, which laser level is designated as the $^4F_{3/2}$ level. This level is split into Stark levels referred to as $R_1$ and $R_2$, which Stark levels are populated by a pump process via fast, non-radiative relaxation from pump bands. Since a strong interaction between these Stark levels takes place by means of phonon interactions having a lifetime on the order of 100 fsec, their relative populations are always in thermal equilibrium. Where $n_1$ and $n_2$ denote population densities of Stark levels $R_1$ and $R_2$, respectively, in units of number of excited ions per unit volume, the following relationships define $n_1$ and $n_2$:

$$n_1 = n/(1+B) \text{ and } n_2 = nB/(1+B) \quad (A1)$$

where: $n = n_1 + n_2$; $B = \exp(-(\Delta E)/(kT))$; $(\Delta E) = 80$ cm$^{-1}$ is the energy gap between Stark levels $R_1$ and $R_2$; and kT is the thermal energy.

Thus, at room temperature, 59% of excited ions are in the $R_1$ level and 41% in the $R_2$ level. This distribution of excited ions over the two Stark levels impacts laser performance, because most laser transitions only have direct access to one of those levels and only the 1.0641 μm line has direct access to both. Thus, for most laser transitions, only one Stark level is an upper laser level, and ions in the other Stark level are constantly transferred to the laser level by phonon interaction. It is well known that this transfer can be taken into account by using the effective cross section of the laser line.

As is well known to those of ordinary skill in the art, the lower laser levels of all laser transitions belong to one of four manifolds, $^4I_{9/2}$, $^4I_{11/2}$, $^4I_{13/2}$, and $^4I_{15/2}$. Transitions with wavelengths between 1.05 and 1.12 μm have one sublevel of the $^4I_{11/2}$ manifold as the lower laser level and transitions with wavelengths between 1.32 μm and 1.444 μm have one sublevel of the $^4I_{13/2}$ manifold as the lower laser level.

In laser operation, the relative strength of a line i is determined by its effective cross section of induced emission $\sigma_i$, absorption loss $\alpha_i$ per transit of a laser cavity, and reflectivity $R_i$ of an output coupler of the laser cavity. Laser oscillation starts at a line i, if the population density $n = n_1 + n_2$ has reached a threshold value $n_{th}^i$:

$$n_{th}^i = -\frac{[\ln(\sqrt{R_i}) - \alpha_i l]}{\sigma_i l} \quad (A2)$$

As is well known to those of ordinary skill in the art, in order to suppress laser action at other wavelengths, it is necessary that the threshold inversion for the desired wavelength be the lowest one. If this is the case, wavelength lam$_i$ starts oscillating first and keeps the population n of the upper laser level at its threshold value $n_{th}^i$ no matter how high the pump power is. Thus, other wavelengths cannot reach threshold anymore and will not oscillate.

However, if the laser oscillation mode at the desired wavelength does not fill the entire active medium, any inversion that remains in uncovered areas can be used to cause laser action at other wavelengths. Spherical aberration in Nd:YAG rods causes the mode diameter to be decreased and resulting inversion in outer areas of a rod can amplify other wavelengths. This explains how 1.064 μm emission occurs in an annular ring in 1.444 μm lasers.

Table App-1 presents: (a) effective cross sections of the five strongest laser lines in Nd:YAG, (b) corresponding threshold inversions nthi for an output coupler reflectivity of R=0.85 and a rod length of 100 mm, and (c) Rmax, the maximally allowed reflectivity for suppression of all other wavelengths except the 1.444 μm line at R=0.85. As will be shown later, a reflectivity substantially equal to 0.85 is always optimum for 1.444 μm lasers. Note that Table App-1 shows that reflectivities at other wavelengths should be lower than the reflectivities set forth under the heading of $R_{max}$. As is known in the art, the reflectivities referred to here are the square root of the product of the reflectivities of the laser resonator.

TABLE App-1

| wavelength [μm] | $\sigma$ [$10^{-20}$ cm$^2$] | $n_{th}$ [$10^{17}$ cm$^{-3}$] | $R_{max}$ |
|---|---|---|---|
| 1.0641 | 41 | 0.393 | 0.076 |
| 1.3381 | 9 | 1.790 | 0.652 |
| 1.3351 | 6 | 2.685 | 0.797 |
| 1.3335 | 5 | 3.223 | 0.850 |
| 1.4444 | 5 | 3.223 | 0.850 |
| 1.3208 | 4 | 4.028 | 0.907 |

The following examines in more detail the group of transitions which end in the $^4I_{13/2}$ manifold to which group of transitions the 1.444 μm line belongs. When a Nd:YAG crystal is pumped the population n in the $^4F_{3/2}$ level decays with a lifetime t of 230 μsec due to radiative transitions into the four lower manifolds $^4I_{9/2}$, $^4I_{11/2}$, $^4I_{13/2}$, and $^4I_{15/2}$. In any time interval, about 30% of excited ions relax into the ground state, 56% into the $^4I_{11/2}$ manifold 14% into the $^4I_{13/2}$ manifold and about 1% into the $^4I_{15/2}$ manifold The lifetimes $o_{ij}$ with which the $^4I_{13/2}$ levels are filled and depleted by transitions to the ground state define the lower laser level population of the 1.444 μm line. Considering the lifetimes for all possible transitions from $R_1$ and $R_2$ to Stark levels $Y_1-Y_6$ of the $^4I_{13/2}$ manifold the effective lifetime of the transition from Stark level $R_1 \rightarrow ^4I_{13/2}$ is $o_1 = 2.142$ ms and the effective lifetime of the transition from Stark level $R_2 \rightarrow ^4I_{13/2}$ is $o_2 = 1.257$ ms. Table App-2 shows the lifetimes and branching ratios of transitions from the Stark levels $R_1$ and $R_2$ and ending in the $^4I_{13/2}$ manifold As shown in Table App-2 the transition $R_1-Y_6$ produces the 1.444 μm line.

TABLE App-2

| transition | wavelength [μm] | branching ratio | lifetime [ms] |
|---|---|---|---|
| $R_1-Y_6$ | 1.444 | 0.0128 | 10.760 |
| $R_2-Y_6$ | 1.427 | 0.0028 | 32.956 |
| $R_1-Y_5$ | 1.432 | 0.0066 | 20.867 |
| $R_2-Y_5$ | 1.415 | 0.0099 | 9.331 |
| $R_1-Y_4$ | 1.357 | 0.0214 | 6.436 |
| $R_2-Y_4$ | 1.342 | 0.0120 | 7.689 |
| $R_1-Y_3$ | 1.353 | 0.0062 | 22.214 |
| $R_2-Y_3$ | 1.338 | 0.0243 | 3.797 |

TABLE App-2-continued

| transition | wavelength [μm] | branching ratio | lifetime [ms] |
|---|---|---|---|
| R$_1$-Y$_2$ | 1.335 | 0.0100 | 13.773 |
| R$_2$-Y$_2$ | 1.320 | 0.0061 | 15.127 |
| R$_1$-Y$_1$ | 1.334 | 0.0073 | 18.867 |
| R$_2$-Y$_1$ | 1.319 | 0.0183 | 5.042 |

By taking population densities n$_1$ and n$_2$ into account, the effective decay lifetime from the $^4$F$_{3/2}$ to the $^4$I$_{13/2}$ manifold is given by o=(1+B)/(1/o$_1$+B/o$_2$)=1.67 ms. This is the lifetime with which the $^4$I$_{13/2}$ level is filled Further, as was the case for the Stark levels R$_1$ and R$_2$ of the $^4$F$_{3/2}$ line, the six Stark levels Y$_1$-Y$_6$ of the $^4$I$_{13/2}$ line are in thermal equilibrium. This means that at room temperature only a fraction f=0.0176 of relaxed ions are in the lower laser level of the 1.444 μm line. The relaxation time from the $^4$I$_{13/2}$ manifold to the ground state is not known, but it is believed that this time is much less than 10 μsec due to nonradiative decay via phonon interaction. Since the relative population of the Y$_6$ level is low, even a relaxation time of more than 10 μsec would not have an influence on laser performance. The lower laser level population of the 1.444 μm line can, therefore, be set to zero. This is important, because, as a result, the same model for calculating output power can be applied to the 1.064 μm line, the 1.32 μm line, and the 1.444 μm line.

The following outlines a derivation of a model for calculating output power at different wavelengths. Since all wavelengths "see" an upper level population density n and a negligible population of the lower laser level, the inversion Δn is set=n.

Note that the different populations n$_1$ and n$_2$ are already taken into account by the effective cross section of each transition shown in Table App-1. The 1.444 μm line, for instance, has access to the lower level population n$_1$=n/(1+B) and exhibits a cross section σ$_1$. All laser properties, however, depend only on the product n$_1$σ$_1$. This means that this transition can be described by assuming direct access to the whole population density n, but with an effective cross section of σ=σ$_1$/(1+B). A similar result holds for the effective lifetime t of 230 μsec, which is the sum of the lifetimes of the two levels weighed with the thermal population probabilities.

Using the well known differential equation for light amplification in an oscillator, in combination with resonator boundary conditions, a formula for output energy per pulse at a given wavelength E$_{out}$ is given as (see an article entitled "Optical Resonators for High Power Lasers" by N. Hodgson, SPIE Proc. 1021, 1988, p. 89-100:

$$E_{out} = FI_s\Delta t \frac{1-R}{1-R+\sqrt{R}\left(\frac{1}{V_s}-V_s\right)} [\Delta n\sigma l - |\ln(\sqrt{R}\ V_s)|]$$

where:
R=reflectivity of the output coupler
V$_2$=exp(−α$_o$l), i.e., the loss factor per transit
F=cross sectional area of the rod
l=rod length
I$_s$=hν/((σ)$_{eff}$o), i.e., the saturation intensity
σ=effective cross section
Δt=pulse duration The quantity Δnσl is more commonly denoted as the small-signal gain g$_o$l and the small-signal gain can be related to the electrical pump energy E$_{electr}$ by the following:

$$g_o l = \eta_{excit} E_{electr}/(FI_s) \quad (A4)$$

Excitation efficiency η$_{excit}$ is defined as the ratio of optical energy stored to electrical input energy. However, η$_{excit}$ depends in a complicated way on pump cavity characteristics and increases linearly with photon energy hν. Let us define an excitation efficiency η$_o$ for the wavelength λ$_o$=1.064 μm. Excitation efficiencies at this wavelength are well known, typical values being in a range between 3.5% and 6% depending on the effectiveness of the pumping process. Using this, the expression for output energy E$_{out}$ can be transformed into:

$$E_{out} = \frac{1-R}{1-R+\sqrt{R}\left(\frac{1}{V_s}-V_s\right)}\left[\eta_o \frac{\lambda_o}{\lambda} E_{electr} - FI_s\Delta t|\ln(\sqrt{R}\ V_s)|\right] \quad (A5)$$

where λ$_o$=1.064 μm and λ=1.444 μm. Saturation intensities I$_s$ used in eqn. (A5) are: I$_s$=2,000 W/cm$^2$ for λ$_o$=1.064 μm; I$_s$=7,345 W/cm$^2$ for λ$_o$=1.320 μm; and I$_s$=12,104 W/cm$^2$ for λ$_o$=1.444 μm. The only unknown quantities in eqn. (A5) are excitation efficiency η$_o$ and loss factor per transit V$_s$, both of which can be measured by determining threshold pump energy E$_{electr,th}$ as a function of mirror reflectivity R for the 1.064 μm line. At threshold, the term in brackets equals zero. This means that a straight line is obtained if the threshold pump energy is plotted against −0.5*ln(R). This plot, commonly referred to as a Findlay-Clay-Plot, is used to determine V$_s$ and, using this, η$_o$ can be determined. Typical values of V$_s$ are between 0.93 and 0.95 for a four inch long rod and a good pump cavity will exhibit excitation efficiencies of 4-7%, depending on rod radius and pumping conditions.

Figure 37:
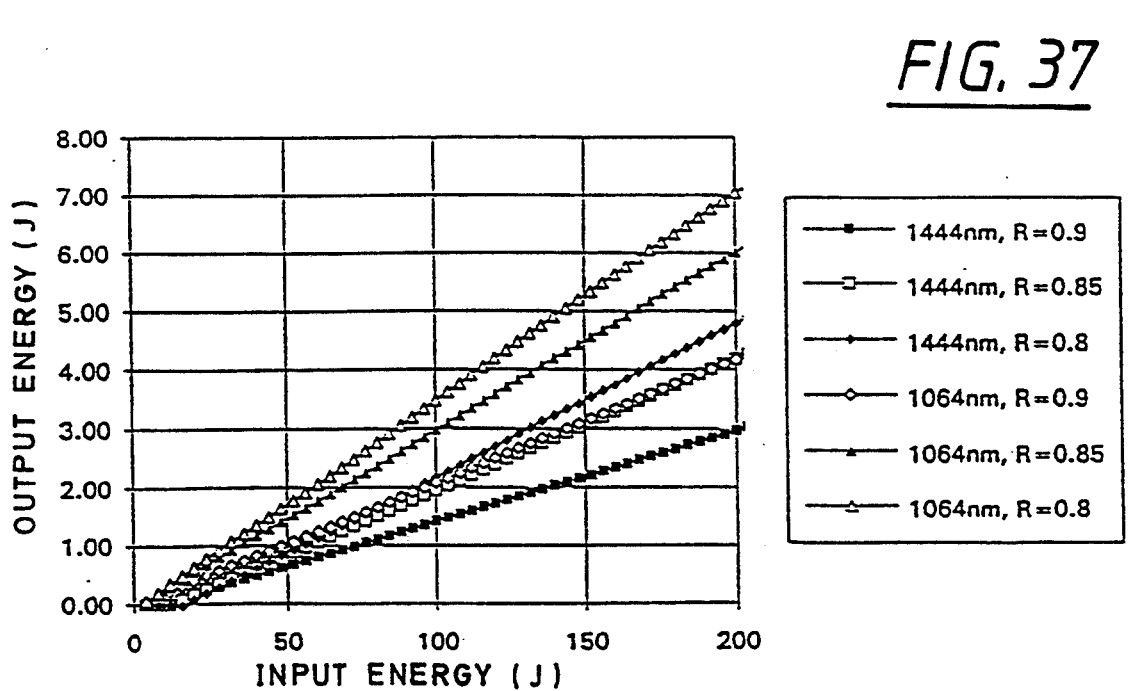
FIG. 37 shows, in graphical form, calculated output energy per pulse at 1.064 μm and 1.444 μm using eqn. A5 as a function of electrical input energy $E_{electr}$ assuming an excitation efficiency $\eta_o$ of 5% and a loss factor of 0.93 for both wavelengths.

FIG. 37 shows, in graphical form, calculated output energy per pulse at 1.064 μm and 1.444 μm using eqn. (A5) as a function of electrical input energy E$_{electr}$ assuming an excitation efficiency η$_o$ of 5% and a loss factor of 0.93 for both wavelengths. FIG. 37 shows E$_{out}$ for three different reflectivities R (0.8, 0.85, and 0.9); Δt=0.65 ms; V$_s$=0.93; η$_o$=0.05; and rod diameter=0.25 inch. The slope efficiency n$_{slope}$ is defined as ΔE$_{out}$/ΔE$_{electr}$. Note that, for the same reflectivity, n$_{slope}$ at wavelength λ is lower than n$_{slope}$ at 1.064 μm by a factor of λ$_o$/λ and that threshold input energy E$_{electr,th}$ is increased by a factor σ$_o$/σ. In particular, for the 1.444 μm line this means that the slopes are 0.737 times lower and the threshold is 8.2 times higher.

It was discovered that this model cannot explain the measured output energies. To try to understand this, the output power of four Nd:YAG rods was measured for the wavelengths 1.064 μm, 1.33 μm and 1.444 μm. The rods had dimensions of 6.35 mm×111 mm and had Nd concentrations of 0.45%, 0.6%, 0.8%, and 1.1%. The pump cavity was an Eu:doped quartz and silver coated double ellipse, the flashlamps were 100% Kr, the pulse duration was 0.65 ms, the resonator length was 35 cm, and the pulse repetition rate was 10 Hz. The measurements were made as a function of output mirror reflectivity. The results indicated that the slope efficiencies were much lower for the greater wavelengths than those predicted by the model discussed above.

Insight into this problem was developed by examining measured slope efficiencies for these rods having different doping concentrations for three different wavelengths as a function of mirror reflectivity. This examination showed that the difference between theoretical and experimental slope becomes larger for higher output coupling. Then, the ratio of experimental slope to theoretical slope was examined, plotted as a function of threshold inversion density $n_{th}= -0.5 \ln(RV_s^2)$ for the four rods over three wavelengths. It was discovered that, for all three wavelengths, the ratio of experimental slope to theoretical slope decreases linearly with threshold inversion density $n_{th}$.

This result indicated that stored energy in the upper laser level is depleted by interactions between excited Nd ions or between excited Nd ions and impurities. The probabilities for such physical processes become higher when more ions are in the upper laser level, i.e., higher threshold density. The result of such physical processes is typically called concentration quenching and is produced by energy migration. For example, when an ion is excited, the energy is not constantly located at that single ion, but starts migrating among ions. Within the lifetime of 230 μsec this hopping from one ion to another ion takes place about a thousand times. Unfortunately, the energy sometimes gets lost as heat if the energy is transferred to an impurity ion or to another excited ion. Another process resulting in energy loss is cross relaxation by which half of the energy of an ion is transferred to a non-excited ion and two ions are left in the $^4I_{15/2}$ level this physical process is responsible for the well-known lifetime shortening with increasing Nd concentration. Thus, it has been determined that the three main processes by which optical energy (excitation into the $^4F_{3/2}$ level) is transferred into heat are: (a) absorption by an impurity ion, (b) interaction between two excited ions, and (c) cross relaxation. Effectively, these quenching processes result in an inversion density that is reduced with respect to the density calculated using a standard four level laser model. As will be described below, in accordance with the present invention, concentration quenching is taken into account by assuming that the small signal gain $g_0l$ or inversion ($\Delta n$), respectively, is lower by a factor $C=1-n_{th}/n_s$, where $n_s$ is determined from plots of the ratio of experimental slope and theoretical slope as a function of inversion density as the value of inversion density at which the ratio crosses the x-axis. Further, density $n_s$ depends on Nd concentration and can be calculated by using the expression $n_s=[8.5-2.5C_0/1.2]10^{17}$ cm$^{-3}$ where $C_o$ is the Nd concentration in atomic percent.

The maximum output energy per pulse as a function of Nd concentration has been measured. The rods had dimensions of 6.35 mm×111 mm and had Nd concentrations of 0.45%, 0.6%, 0.8%, and 1.1%. The pump cavity was an Eu:doped quartz and silver coated double ellipse, the flashlamps were 100% Kr, the pulse duration was 0.65 ms, the resonator length was 35 cm, and the pulse repetition rate was 10 Hz. The output energy per pulse as a function of Nd concentration using electrical input energy as a parameter was examined and it was discovered that the concentration of 0.45 at % is the best choice only at pump energies below 100 J. With increasing input energies, the maximum is shifted to higher concentrations and, for input energies of 400–500 J, the optimum concentration would be around 0.8–0.9 at %. However, the dependence of output energy on concentration is relatively slight and choosing a wrong concentration results only in a decrease of efficiency by maximally 10%.

Further, it has been discovered that optimum mirror reflectivity does not depend on input energy. This is in contrast to expected behavior. In general, mirror reflectivity must be chosen lower at higher input energies. However, it has been discovered that concentration quenching is the reason the optimum mirror reflectivity is always around 85–90%.

In a laser rod, radial temperature gradients are caused by a combination of heat generation due to absorption of pumplight and heat flow due to cooling of the outer surface. These temperature gradients generate mechanical stresses in the rod and the highest stress occurs at the surface of the rod. The maximum surface stress that can be tolerated prior to fracture depends on the mechanical properties of the host material and on the heat $P_h$ dissipated by the rod, but not on the rod radius.

For Nd:YAG, in particular, the heat $P_h$ at which fracture occurs is about 120 W per cm of rod length. It is convenient to relate this maximally tolerated heat to optical energy stored in the $^4F_{3/2}$ level For the 1.064 μm line experiments with 6 inch long Nd:YAG rods indicate that the average electrical pump power at which fracture occurs is 14 kW (the excitation efficiency of the cavity was 0.053, pulse length was 2 ms, and pulse energy was 250 J). This means that the highest stored energy $E_{st}$ was 13.3 J at a repetition rate f=56 Hz. This corresponds to an average stored power $P_{st}=E_{st}*f$ of 754 W. This value agrees with the thermal load $P_h$ of 120 W/cm as confirmed by an interferometric measurement of the heat.

Using this above-identified empirical limit, a general formula for the maximum optical energy $E_{st}$ stored in the $^4F_{3/2}$ level was obtained as a function of repetition rate f (in Hz) and rod length l (in cm): $E_{st}=P_F/f$ where $P_F=50$ W cm$^{-1}$. The maximum average electrical pumping power is given by $P_{electr}=P_F/\eta_{excit}$ where $P_F=50$ W cm$^{-1}$.

For medium to high pump energies, i.e., 200–1000 J, about 70–80% of the stored energy is available for the 1.064 μm line and not more than 50% can be extracted in a 1.444 μm beam. As an example, in a 4 inch long rod pumped at a repetition rate of 30 Hz, a maximum optical energy of 16.55 J can be tolerated prior to fracture. This results in a maximum output energy of about 12 J at 1.064 μm and 8 J at 1.444 μm. Assuming an excitation efficiency of 4%, the average electrical pump power would be 12.5 kW.

To modify eqn. A5 to take account of concentration quenching, the small-signal gain is multiplied by C, where $C=1-n_{th}/n_s$. This gives the following for $E_{out}$ at 1.444 μm:

$$E_{out} = \frac{1-R}{1-R+\sqrt{R}\left(\frac{1}{V_s}-V_s\right)}\left[0.737\eta_0 E_{electr}\left(1- \right.\right. \quad \text{(A6)}$$

$$\left. \frac{|\ln(\sqrt{R}\ V_s)|}{\sigma \ln_s} \right) - FI_s\Delta t|\ln(\sqrt{R}\ V_s)| \right]$$

where:
F: cross sectional area of the rod
l: rod length
$\eta_o$: excitation efficiency at 1.064 μm
$\sigma$: effective cross section $(=5\times 10^{-20}\ cm^2)$
R: mirror reflectivity
$V_s$: loss factor/transit
$E_{electr}$: electrical input energy
$\Delta t$: pulse duration
$I_s$: saturation intensity $(=12,104\ W/cm^2)$
$n_s$: inversion density given by $P_{electr}=P_F/\eta_{excit}$ However, before this model can be used, one must know loss factor $V_s = \exp(-\alpha_o l)$ and how these losses depend on Nd concentration. This information is not easily obtained because different rods might have different losses resulting from a property other than different doping concentration. Measurements have been made in which a linear increase of loss with concentration was observed without there being a significant difference in such loss. The loss factor was determined to be 0.92 for a rod length of 111 mm. Thus, the value $V_s = \exp(-0.008\ cm^{-1}*l)$ is utilized.

The main problem with eqn. A6 is that excitation efficiency $\eta_o$ is not known in general and depends on dopant concentration, rod diameter, and pump cavity design. As a result, the excitation efficiency $\eta_{o11}$ at the most commonly used doping concentration of 1.1 at % is used as a free parameter and the dependence on concentration is taken into account by using the following expression:

$$\eta_o = \eta_{o11} \frac{R_c[1 - \exp(-0.01 * C_o * rd)]}{1 - R_c\exp(-0.01 * C_o * rd)} \frac{1 - R_c\exp(-0.011 * rd)}{R_c[1 - \exp(-0.011 * rd)]} \quad (A7)$$

where: $C_O$ is the Nd concentration in at %, rd is the rod diameter in mm, and $R_c$ is the reflectivity of the pump cavity (0.94 for gold and 0.97 for silver). Eqn. A7 for $\eta_o$ was derived by considering a medium absorbing light according to Beer's law, which medium is placed between two mirrors with reflectivity $R_c$. The absorption coefficient of 0.01 per mm and at % represents the spectrally averaged absorption coefficient of pulsed flashlamp light in Nd:YAG. The first ratio in eqn. A7 represents an absorbed power fraction after an infinite number of bounces, i.e., the sum of a geometrical series, and the second ratio is a normalization constant.

In accordance with the present invention, eqns. A6 and A7 represent a model which can be utilized to predict the performance of 1.444 μm lasers.

The advantage of eqn. A7 is that the theoretical description of 1.444 μm laser performance does not depend on the efficacy of the pumping process. The output energy is always related to the optical energy stored between the $^4F_{3/2}$ level and the $^4I_{11/2}$ level in a rod with a 1.1 at % Nd concentration. However, in order to obtain a more convenient model, the imaging properties of the pump cavity were incorporated into the theoretical description. This was accomplished by calculating the excitation numerically with a ray tracing algorithm. It was found that the excitation efficiency $\eta_o$ can be written as follows:

$$\eta = K\eta_{ge}R_c \frac{1 - \exp(-0.01 * C_o * rd)}{1 - R_c\exp(-0.01 * C_o * rd)} \quad (A8)$$

where: K is a constant which takes account of losses due to quantum defect, radiation efficiency of lamps, and so forth and $\eta_{ge}$ is a geometrical transfer efficiency. For a single elliptical cavity with eccentricity e and lamp inner diameter ld, the transfer efficiency can be calculated by utilizing the relation:

$$\eta_{ge} = (\alpha + 0.9 * rd * \beta/ld)/\pi \quad (A9)$$

where:
$\alpha = \arccos[(1-0.5(1-e^2)(1+rd/ld))/e]$
$\beta = \arcsin[ld * \sin(\alpha)/rd]$, and $\pi = 3.1416\ldots$ Eqn. A9 is similar to an expression given in the above-referenced book entitled "Solid State Laser Engineering" by Walter Koechner, Springer-Verlag, 1986, pp. 323-327. For a double elliptical cavity, the transfer efficiency given in this reference can be used:

$$\eta_{ge} = ((\alpha - \gamma) + rd * \beta/ld)/\pi \quad (A10)$$

where:
$\gamma = \arccos[2e/(1+e^2)]$ and $\pi = 3.1416\ldots$

A comparison of the excitation efficiency given by eqn. A8 with that measured with different pump cavities and different rods was made to determine the constant K. It was discovered that: (a) for silver as a reflective material, K is about 0.07-0.08, depending on the polish quality, and (b) for gold as a reflective material, K is about 20% less.

By inserting eqn. A9 and A10 into eqn. A6, a theoretical model for the output energy at 1.444 μm is obtained as a function of rod diameter, Nd concentration, pulse duration, pump energy, pump cavity design, and resonator output coupling. This model was determined to be in excellent agreement with experimental results.

What is claimed is:

1. A long wavelength neodymium laser which comprises:
   a housing comprising a reflective optical cavity;
   an active laser material disposed in the optical cavity, the active laser material being comprised of a crystalline or glass host being doped with neodymium;
   pumping means, disposed in the housing, for pumping the active laser material with radiation;
   drive means for adjustably driving the pumping means to produce pulses of the radiation;
   wavelength selective resonator means for producing relatively high reflection in a range of wavelengths substantially between about 1.4 μm and about 1.5 μm and for producing relatively low reflection substantially at predetermined other ranges of wavelength;
   wherein the wavelength selective resonator means for producing relatively low reflection comprises means having reflectivity: (a) less than about 0.076 for wavelengths substantially equal to 1.064 μm; (b) less than about 0.652 for wavelengths substantially equal to 1.338 μm; (c) less than about 0.797 for wavelengths substantially equal to 1.335 μm;

(d) less than about 0.85 for wavelengths substantially equal to 1.33 μm; and (e) less than about 0.907 for wavelengths substantially equal to 1.321 μm.

2. A long wavelength neodymium laser which comprises:
a housing comprising a reflective optical cavity;
an active laser material disposed in the optical cavity, the active laser material being comprised of a crystalline or glass host being doped with neodymium;
pumping means, disposed in the housing, for pumping the active laser material with radiation;
drive means for adjustably driving the pumping means to produce pulses of the radiation;
wavelength selective resonator means for producing relatively high reflection in a range of wavelengths substantially between about 1.4 μm and about 1.5 μm and for producing relatively low reflection substantially at predetermined other ranges of wavelength;
wherein the wavelength selective resonator means for producing relatively low reflection comprises means having reflectivity: (a) less than about 0.076 for wavelengths substantially equal to 1.064 μm and (b) less than about 0.652 for wavelengths substantially equal to 1.32 μm.

3. The long wavelength neodymium laser of claim 2 wherein the neodymium doping comprises a neodymium concentration substantially in a range from about 0.45 atomic percent to about 1.0 atomic percent.

4. The long wavelength neodymium laser of claim 2 wherein the active laser material is formed as a rod having a length substantially in a range from about 50 mm to about 180 mm.

5. The long wavelength neodymium laser of claim 4 wherein the rod has a diameter substantially in a range from about 4 mm to about 10 mm.

6. The long wavelength neodymium laser of claim 2 wherein the pumping means comprises means for adjusting the energy of the radiation substantially in a range from about 50 kW to about 2.5 MW.

7. The long wavelength neodymium laser of claim 2 wherein the drive means comprised means for adjusting the repetition rate of the pulses substantially in a range from about 0 to about 100 Hz.

8. The long wavelength neodymium laser of claim 2 wherein the drive means comprises means for adjusting pulse duration substantially in a range from about 0.3 ms to about 1.5 ms.

9. The long wavelength neodymium laser of claim 2 wherein the wavelength selective resonator means comprises a reflector having a reflectivity of about 0.85 for radiation having a wavelength of about 1.44 μm.

10. The long wavelength neodymium laser of claim 2 wherein the cavity comprises an etalon means for suppressing oscillation of wavelengths other than wavelengths substantially equal to 1.44 μm.

11. The long wavelength neodymium laser of claim 2 wherein the cavity comprises a prism means for suppressing oscillation of wavelengths other than wavelengths substantially equal to about 1.44 μm.

12. The long wavelength neodymium laser of claim 2 wherein the wavelength selective resonator means for producing relatively high reflection comprises three mirrors which are highly reflective at wavelengths substantially in a range from about 1.4 μm to about 1.5 μm.

13. The long wavelength neodymium laser of claim 2 wherein the active material comprises a first and a second rod, the first and second rods being disposed to substantially form a lens guide for radiation substantially equal to 1.44 μm.

14. The long wavelength neodymium laser of claim 2 wherein the active laser material is formed as a rod, the rod being coated with a radiation absorber for absorbing radiation at predetermined ranges of wavelengths other than wavelengths substantially in a range from about 1.4 μm to about 1.5 μm.

15. The long wavelength neodymium laser of claim 2 wherein: (a) the reflective optical cavity comprises an ellipsoidal cavity; (b) the pumping means comprises lamp means disposed in the cavity substantially at a focus of the ellipsoid; (c) the active laser material being disposed at another focus of the ellipsoid; and (d) the cavity being coated with relatively highly reflective material.

16. The long wavelength neodymium laser of claim 15 wherein the reflective material comprises a material chosen from silver, gold, aluminum, BASO4, and Spectralon.

17. The long wavelength neodymium laser of claim 15 wherein the active material and the lamp means are substantially surrounded by quartz.

18. The long wavelength neodymium laser of claim 17 wherein the quartz is doped with a rare earth material.

19. The long wavelength neodymium laser of claim 15 wherein the active material and the lamp means are substantially surrounded by glass.

20. The long wavelength neodymium laser of claim 19 wherein the glass is doped with a rare earth material.

21. The long wavelength neodymium laser of claim 15 wherein the cavity coating is coated with a layer of quartz.

22. The long wavelength neodymium laser of claim 21 wherein the quartz is doped with a rare earth material.

23. The long wavelength neodymium laser of claim 15 wherein the cavity coating is coated with a layer of glass.

24. The long wavelength neodymium laser of claim 23 wherein the glass is doped with a rare earth material.

25. The long wavelength neodymium laser of claim 15 wherein the active material and the lamp means are surrounded by flowtubes for transporting coolants.

26. The long wavelength neodymium laser of claim 25 wherein the flowtubes are fabricated from quartz.

27. The long wavelength neodymium laser of claim 26 wherein the quartz is doped with a rare earth material.

28. The long wavelength neodymium laser of claim 25 wherein the flowtubes are fabricated from glass.

29. The long wavelength neodymium laser of claim 28 wherein the glass is doped with a rare earth material.

30. The long wavelength neodymium laser of claim 15 wherein the active material and the lamp means are substantially surrounded by a material doped with a rare earth material chosen from europium, cerium, and samarium.

31. The long wavelength neodymium laser of claim 30 wherein the material is doped at a concentration substantially in a range from about 0.1% to about 20%.

32. The long wavelength neodymium laser of claim 2 wherein: (a) the reflective optical cavity comprises a double ellipsoidal cavity, wherein one portion of the cavity is a first ellipsoidal cavity having a first focus and a second focus and another portion of the cavity is a second ellipsoidal cavity having a third focus and a fourth focus, the fourth focus being substantially the same as the second focus; (b) the pumping means comprises lamp means disposed in the cavity substantially at the first focus and the third focus; (c) the active laser material being disposed at the second focus; and (d) the cavity being coated with relatively highly reflective material.

33. The long wavelength neodymium laser of claim 32 wherein the reflective material is a material chosen from silver, gold, BASO4, and Spectralon.

34. The long wavelength neodymium laser of claim 32 wherein the active material and the lamp means are substantially surrounded by quartz.

35. The long wavelength neodymium laser of claim 34 wherein the quartz is doped with a rare earth material.

36. The long wavelength neodymium laser of claim 2 which further comprises absorbing means disposed in the cavity for absorbing radiation substantially in the uv region of the spectrum.

37. The long wavelength neodymium laser of claim 1 wherein the pumping means is means for producing a substantially rectangular temporal pump pulse shape.

38. The long wavelength neodymium laser of claim 2 wherein: (a) the pumping means comprises lamp means and (b) the lamp means is surrounded by flowtubes for transporting coolants.

39. The long wavelength neodymium laser of claim 38 wherein the flowtubes are fabricated from a material doped with a rare earth material.

40. The long wavelength neodymium laser of claim 39 wherein the rare earth is chosen from europium, cerium, and samarium.

41. The long wavelength neodymium laser of claim 2 wherein:
the active laser material is formed into a tube having:
(a) an inner tube diameter substantially in a range from about 5 mm to about 40 mm, (b) a wall thickness substantially in a range from about 2 mm to about 15 mm, and (c) a tube length substantially in a range from about 50 mm to about 180 mm;
the drive means comprises means for: (a) applying electrical energy to the pumping means substantially in a range from about 50 J to about 1000 J, (b) adjusting the repetition rate of the pulses substantially in a range from about 0.1 Hz to about 100 Hz, and (c) adjusting pulse duration substantially in a range from about 0.2 ms to about 1.5 ms; and
the neodymium doping comprises a neodymium concentration substantially in a range from about 0.3 at % to about 1.1 at %.

42. The long wavelength neodymium laser of claim 41 wherein the wavelength selective resonator means comprises means disposed on one end of the tube.

43. The long wavelength neodymium laser of claim 2 wherein:
the active laser material is formed as a slab.

44. The long wavelength neodymium laser of claim 43 wherein:
the reflective optical cavity comprises an ellipsoidal cavity;
the pumping means comprises a lamp means disposed in the cavity substantially at a focus of the ellipsoid; and
the slab being disposed so that at least a portion thereof is substantially at another focus of the ellipsoid; and the cavity being coated with relatively highly reflective material.

45. The long wavelength neodymium laser of claim 44 wherein the slab has endfaces which are cut substantially at Brewster's angle.

46. The long wavelength neodymium laser of claim 44 wherein the slab has endfaces which are substantially perpendicular to the sides and wherein the wavelength selective resonator means for producing relatively high reflection comprises three mirrors which are highly reflective at wavelengths substantially in a range from about 1.4 $\mu$m to about 1.5 $\mu$m, one of the mirrors comprising a coating affixed to an endface of the slab.

47. The long wavelength neodymium laser of claim 43 wherein thermal insulating means is affixed to at least one side of the slab.

48. The long wavelength neodymium laser of claim 47 wherein the thermal insulation means comprises a material chosen from silicone, plastic, ceramic, rubber, and glass.

49. The long wavelength neodymium laser of claim 47 wherein the thermal insulating means comprises a metal affixed to the at least one side of the slab and a material chosen from silicone, plastic, ceramic, and glass which is affixed to the metal.

50. The long wavelength neodymium laser of claim 49 wherein the material comprises a channel for transporting coolant.

51. A long wavelength neodymium laser which comprises:
a housing;
an active laser material disposed in the housing, the active laser material being comprised of a slab of a crystalline or glass host being doped with neodymium;
diode pumping means, disposed in the housing, for pumping the active laser material with radiation;
drive means for adjustably driving the pumping means to produce pulses of the radiation;
wavelength selective resonator means for producing relatively high reflection in a range of wavelengths substantially between about 1.4 $\mu$m and about 1.5 $\mu$m and for producing relatively low reflection substantially at predetermined other ranges of wavelength;
wherein the wavelength selective resonator means for producing relatively low reflection comprises means having reflectivity: (a) less than about 0.076 for wavelengths substantially equal to 1.064 $\mu$m and (b) less than about 0.652 for wavelengths substantially equal to 1.32 $\mu$m.

52. The long wavelength neodymium laser of claim 51 which further comprises lens means for focusing the radiation produced by the diode pumping means.

53. The long wavelength neodymium laser of claim 53 wherein the drive means comprises means for adjusting the pulse durations of the diode pumping means substantially in a range from about 200 $\mu$sec to about 300 $\mu$sec and for driving the diode pumping means to output peak power substantially in a range from about 2 kW/cm$^2$ to about 3 kW/cm$^2$.

54. A long wavelength neodymium laser which comprises:
a housing;
an active laser material disposed in the housing, the active laser material being comprised of a slab of a crystalline or glass host being doped with neodymium;

diode pumping means, disposed in the housing, for pumping the active laser material with radiation;

drive means for adjustably driving the pumping means to produce pulses of the radiation;

wavelength selective resonator means for producing relatively high reflection in a range of wavelengths substantially between about 1.4 μm and about 1.5 μm and for producing relatively low reflection substantially at predetermined other ranges of wavelength;

wherein the wavelength selective resonator means for producing relatively low reflection comprises means having reflectivity: (a) less than about 0.076 for wavelengths substantially equal to 1.064 μm; (b) less than about 0.652 for wavelengths substantially equal to 1.338 μm; (c) less than about 0.797 for wavelengths substantially equal to 1.335 μm; (d) less than about 0.85 for wavelengths substantially equal to 1.33 μm; and (e) less than about 0.907 for wavelengths substantially equal to 1.321 μm.

* * * * *